(12) United States Patent
Zhou et al.

(10) Patent No.: US 12,183,956 B2
(45) Date of Patent: Dec. 31, 2024

(54) BATTERY MODULE, BATTERY PACK, APPARATUS, AND FAILURE HANDLING METHOD

(71) Applicant: CONTEMPORARY AMPEREX TECHNOLOGY (HONG KONG) LIMITED, Hong Kong (CN)

(72) Inventors: Di Zhou, Ningde (CN); Ye Xu, Ningde (CN); Bin Zhao, Ningde (CN); Rongcai Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 626 days.

(21) Appl. No.: 17/125,839

(22) Filed: Dec. 17, 2020

(65) Prior Publication Data

US 2021/0143518 A1    May 13, 2021

Related U.S. Application Data

(63) Continuation of application No. PCT/CN2020/073856, filed on Jan. 22, 2020.

(30) Foreign Application Priority Data

Oct. 31, 2019  (CN) .......................... 201911055609.8
Oct. 31, 2019  (CN) .......................... 201911056741.0

(51) Int. Cl.
*H01M 50/588*  (2021.01)
*H01M 50/51*  (2021.01)
(Continued)

(52) U.S. Cl.
CPC ......... *H01M 50/588* (2021.01); *H01M 50/51* (2021.01); *H01M 50/59* (2021.01); *H01M 2220/20* (2013.01); *H02J 7/0016* (2013.01)

(58) Field of Classification Search
CPC .... H01M 50/588; H01M 50/51; H01M 50/59; H01M 2220/20; H01M 10/4207;
(Continued)

(56) References Cited

U.S. PATENT DOCUMENTS 5,180,641 A    1/1993  Burns et al.
5,300,372 A *  4/1994  Aksoy ................. H01M 50/209
                                              429/178
(Continued)

FOREIGN PATENT DOCUMENTS

CN    102396097 A    3/2012
CN    102624050 A    8/2012
(Continued)

OTHER PUBLICATIONS

Machine English translation of CN 108199099 (Year: 2018).*
(Continued)

*Primary Examiner* — Michael L Dignan
(74) *Attorney, Agent, or Firm* — Kilpatrick Townsend & Stockton LLP

(57) ABSTRACT

This application relates to a battery module, a battery pack, an apparatus, and a failure handling method. The battery module includes: a plurality of battery units configured to be serially-connected, where the plurality of battery units include a failed battery unit and at least one non-failed battery unit after the battery module fails; and a conductive part, electrically connected to the at least one non-failed battery unit, and configured to make a current bypass an electrode assembly of the failed battery unit so that the battery module resumes working. This application simplifies a maintenance process of the battery module, reduces maintenance cost, and improves working efficiency of the battery module.

18 Claims, 53 Drawing Sheets

(51) Int. Cl.
*H01M 50/59* (2021.01)
*H02J 7/00* (2006.01)

(58) Field of Classification Search
CPC ............ H01M 50/204; H01M 40/209; H01M 50/572; H02J 7/0016; Y02E 60/10
See application file for complete search history.

(56) References Cited

U.S. PATENT DOCUMENTS

| | | | |
|---|---|---|---|
| 6,046,514 | A | 4/2000 | Rouillard et al. |
| 6,115,277 | A | 9/2000 | Plichta et al. |
| 6,172,892 | B1 | 1/2001 | Plichta et al. |
| 6,249,063 | B1 | 6/2001 | Rudoy et al. |
| 8,785,012 | B2 | 7/2014 | Gottmann et al. |
| 8,802,250 | B2 | 8/2014 | Gottmann et al. |
| 8,823,323 | B2 | 9/2014 | Troxel et al. |
| 8,884,585 | B2 | 11/2014 | Troxel et al. |
| 9,012,050 | B2 * | 4/2015 | Byun ................ H01M 50/147 429/61 |
| 9,246,140 | B2 * | 1/2016 | Kim ................ H01M 50/574 |
| 9,537,326 | B2 | 1/2017 | Troxel et al. |
| 9,972,824 | B2 * | 5/2018 | Umeyama ........... H01M 50/574 |
| 10,008,710 | B2 * | 6/2018 | Zhang ................ H01M 50/578 |
| 10,230,246 | B2 | 3/2019 | Troxel et al. |
| 10,418,619 | B2 | 9/2019 | Li et al. |
| 2008/0063929 | A1 * | 3/2008 | Byun ................ H01M 50/516 429/121 |
| 2011/0080139 | A1 | 4/2011 | Troxel et al. |
| 2011/0084663 | A1 | 4/2011 | Troxel et al. |
| 2011/0095725 | A1 | 4/2011 | Troxel et al. |
| 2011/0177381 | A1 * | 7/2011 | Oya ................ H01M 50/503 174/70 B |
| 2011/0183193 | A1 * | 7/2011 | Byun ................ H01M 50/531 429/163 |
| 2012/0315509 | A1 | 12/2012 | Gottmann et al. |
| 2013/0252038 | A1 * | 9/2013 | Kim ................ H01M 10/425 429/61 |
| 2014/0162158 | A1 | 6/2014 | Gottmann et al. |
| 2016/0079779 | A1 | 3/2016 | Troxel et al. |
| 2016/0114695 | A1 * | 4/2016 | Holgers ............... H01M 10/48 903/907 |
| 2017/0179462 | A1 | 6/2017 | Bourns et al. |
| 2017/0179713 | A1 * | 6/2017 | Bourns ................ H02H 9/026 |
| 2017/0352861 | A1 | 12/2017 | Li et al. |
| 2019/0131799 | A1 * | 5/2019 | Lorentz ............... H01M 50/583 |
| 2019/0207394 | A1 | 7/2019 | Troxel et al. |
| 2021/0265710 | A1 * | 8/2021 | Muenzel ............ H02J 7/0016 |

FOREIGN PATENT DOCUMENTS

| | | |
|---|---|---|
| CN | 202395111 U | 8/2012 |
| CN | 102832697 A | 12/2012 |
| CN | 103326061 A | 9/2013 |
| CN | 103560224 A | 2/2014 |
| CN | 103718362 A | 4/2014 |
| CN | 204597880 U | 8/2015 |
| CN | 209401727 U | 8/2015 |
| CN | 105471053 A | 4/2016 |
| CN | 106992323 A | 7/2017 |
| CN | 206650127 U | 11/2017 |
| CN | 206849936 U | 1/2018 |
| CN | 107919492 A | 4/2018 |
| CN | 108075198 A | 5/2018 |
| CN | 108199099 * 6/2018 ............ H01M 10/42 |
| CN | 108448021 A | 8/2018 |
| CN | 108512263 A | 9/2018 |
| CN | 109244285 A | 1/2019 |
| CN | 208955086 U | 6/2019 |
| CN | 209496940 U | 10/2019 |
| EP | 1414129 A2 | 4/2004 |
| JP | H1080067 A | 3/1998 |
| JP | 2012069406 A | 4/2012 |
| JP | 2013504288 A | 2/2013 |
| JP | 2014032949 A | 2/2014 |
| JP | 2017162724 A | 9/2017 |
| JP | 3219225 U | 11/2018 |
| JP | 2019515448 A | 6/2019 |
| JP | 2019186001 A | 10/2019 |
| KR | 20160112379 A | 9/2016 |
| WO | 2017143749 A1 | 8/2017 |
| WO | 2018177137 A1 | 10/2018 |
| WO | 2019114776 A1 | 6/2019 |
| WO | 2019174088 A1 | 9/2019 |

OTHER PUBLICATIONS

Contemporary Amperex Technology Co. Limited, Extended European Search Report, EP20824420.2, Oct. 15, 2021, 9 pgs.
Contemporary Amperex Technology Co. Limited, Communication Pursuant to Article 94(3) EPC, EP20824420.2, Jul. 21, 2022, 6 pgs.
Contemporary Amperex Technology Co. Limited, Communication Under Rule 71(3) EPC, Intention to Grant, EP20824420.2, Nov. 24, 2022, 93 pgs.
Contemporary Amperex Technology Co. Limited, International Search Report and Written Opinion, PCTCN2020073856, Apr. 13, 2020, 18 pgs.
Ningder Age New Energy Technology Co., Ltd., First Office Action, CN 201911056741.0, Jun. 2, 2021, 15 pgs.
Ningder Age New Energy Technology Co., Ltd., First Office Action, CN 201911055609.8, Sep. 23, 2021, 12 pgs.
First Office Action, JP 2021551811, Sep. 6, 2022, 55 pgs.
The first office action received in the corresponding Chinese Application 202080068449.5, mailed Jul. 21, 2023.

* cited by examiner

BATTERY MODULE, BATTERY PACK, APPARATUS, AND FAILURE HANDLING METHOD

CROSS REFERENCE TO RELATED APPLICATIONS

This application is a continuation application of PCT Patent Application No. PCT/CN2020/073856, entitled "BATTERY MODULE, BATTERY PACK, APPARATUS, AND METHOD FOR HANDLING FAILURE OF TARGET BATTERY UNIT" filed on Jan. 22, 2020, which claims priority to Chinese Patent Application No. 201911056741.0, filed with the State Intellectual Property Office of the People's Republic of China on Oct. 31, 2019, and entitled "BATTERY MODULE, BATTERY PACK, APPARATUS, AND METHOD FOR HANDLING FAILURE OF TARGET BATTERY UNIT", and Chinese Patent Application No. 201911055609.8, filed with the State Intellectual Property Office of the People's Republic of China on Oct. 31, 2019 and entitled "BATTERY MODULE, BATTERY PACK, APPARATUS, AND METHOD FOR HANDLING FAILURE OF FAILED BATTERY UNIT", all of which are incorporated herein by reference in their entirety.

TECHNICAL FIELD

This application relates to the technical field of an energy storage device, and in particular, to a battery module, a battery pack, an apparatus, and a failure handling method.

BACKGROUND

A battery module includes a plurality of battery units stacked against each other, and the plurality of battery units are electrically connected, so that the battery module outputs electric energy and supplies power to an electric device. When a battery unit fails, an entire circuit of the battery module fails, thereby making the battery module unable to work normally.

SUMMARY

This application provides a battery module, a battery pack, an apparatus, and a failure handling method, and simplifies a maintenance process of the battery module, reduces maintenance cost, and improves working efficiency of the battery module.

A first aspect of embodiments of this application provides a battery module. The battery module includes:
  a plurality of battery units configured to be serially-connected, where the plurality of battery units include a failed battery unit and at least one non-failed battery unit after the battery module fails; and
  a conductive part, configured to be electrically connected to the at least one non-failed battery unit, and make a current bypass an electrode assembly of the failed battery unit so that the battery module resumes working.

In a possible design, the at least one non-failed battery unit includes two non-failed battery units that are located upstream and downstream of the failed battery unit respectively, and the conductive part serial-connects the two non-failed battery units.

In a possible design, the battery module further includes: a connecting plate, configured to serial-connect electrode terminals of the plurality of battery units.

The conductive part serial-connects the two non-failed battery units through at least one of the connecting plate or the electrode terminals.

In a possible design, the connecting plate between the two non-failed battery units is in a disconnected state.

In a possible design, the failed battery unit includes two opposite-polarity electrode terminals, and the conductive part electrically connects the two electrode terminals of the failed battery unit.

In a possible design, the conductive part is further connected to a top cover of the failed battery unit to implement electrical connection to the at least one non-failed battery unit.

In a possible design, the conductive part includes a first conductive part and a second conductive part that are discretely disposed, and both the first conductive part and the second conductive part are connected to the top cover of the failed battery unit.

In a possible design, an end of the conductive part is sheet-shaped, and the end is interconnected to the connecting plate by partly overlapping or by no overlapping, so that the conductive part is interconnected to the connecting plate.

In a possible design, a clamping part is disposed at an end of the conductive part, and the clamping part is configured to clamp the connecting plate, so that the conductive part is interconnected to the connecting plate.

In a possible design, the clamping part includes a first arm and a second arm that are respectively disposed on two sides of the connecting plate to clamp the connecting plate.

In a possible design, the first arm and the second arm are disposed on two sides of the connecting plate in an overlapped or staggered manner.

In a possible design, the clamping part includes a position limiting part configured to prevent a relative movement of the conductive part in relation to the connecting plate.

In a possible design, the position limiting part is connected to at least one of the first arm or the second arm, and the position limiting part is contiguous to a sidewall of the connecting plate.

A second aspect of embodiments of this application provides a battery pack. The battery pack includes:
  a container, including an accommodation cavity; and
  the battery module described above, where the battery module is accommodated in the accommodation cavity.

A third aspect of embodiments of this application provides an apparatus, including:
  the battery pack described above, where the battery pack is configured to provide electrical energy.

A fourth aspect of embodiments of this application provides a failure handling method, configured to handle a failed battery unit of a battery module. After failing, the battery module includes the failed battery unit and at least one non-failed battery unit. The failure handling method includes:
  electrically connecting a conductive part to the at least one non-failed battery unit, and making a current bypass an electrode assembly of the failed battery unit so that the battery module resumes working.

In a possible design, the at least one non-failed battery unit includes two non-failed battery units that are located upstream and downstream of the failed battery unit respectively. When electrically connecting the conductive part to the at least one non-failed battery unit, the failure handling method includes:
  electrically connecting the conductive part to the two non-failed battery units, so that the two non-failed battery units are serially-connected.

In a possible design, the battery module further includes a connecting plate. When electrically connecting the conductive part to the two non-failed battery units, the failure handling method includes:

electrically connecting at least one of the connecting plate or the electrode terminals to the conductive part.

In a possible design, the failure handling method further includes:

disconnecting the connecting plate between the two non-failed battery units.

In a possible design, the failed battery unit includes two opposite-polarity electrode terminals. When electrically connecting the conductive part to the at least one non-failed battery unit, the failure handling method includes:

electrically connecting the conductive part to the two electrode terminals of the failed battery unit.

In a possible design, the failed battery unit includes a top cover. When electrically connecting the conductive part to the at least one non-failed battery unit, the failure handling method includes:

electrically connecting the conductive part to the top cover of the failed battery unit.

In a possible design, the conductive part includes a first conductive part and a second conductive part that are discretely disposed. When electrically connecting the conductive part to the top cover of the failed battery unit, the failure handling method includes:

electrically connecting the first conductive part to the top cover of the failed battery unit, and electrically connecting the second conductive part to the top cover of the failed battery unit.

In a possible design, an end of the conductive part is sheet-shaped. When electrically connecting the connecting plate to the conductive part, the failure handling method includes:

connecting the end to the connecting plate by partly overlapping, or interconnecting the end to the connecting plate by no overlapping.

In a possible design, a clamping part is disposed at an end of the conductive part. When electrically connecting the connecting plate to the conductive part, the failure handling method includes:

extending a part of the connecting plate into the clamping part, so that the connecting plate is clamped by the clamping part.

In a possible design, the clamping part includes a first arm and a second arm. When extending a part of the connecting plate into the clamping part, the failure handling method includes:

extending a part of the connecting plate until between the first arm and the second arm so that the connecting plate is clamped by the first arm and the second arm.

In a possible design, the clamping part includes a position limiting part. The position limiting part is connected to at least one of the first arm or the second arm. When extending a part of the connecting plate until between the first arm and the second arm, the failure handling method includes:

causing a sidewall of the connecting plate to be contiguous to the position limiting part.

In this embodiment, by connecting the conductive part to at least one non-failed battery unit, the failed battery unit can be removed from a circuit of the battery module, so that the failed battery unit no longer participates in a charging and discharging process of the battery module. Specifically, the failed battery unit does not affect the circuit of the battery module, and the failed battery unit is not in the circuit at all, thereby improving safety of the battery module. In addition, in this embodiment, the failed battery unit can be handled by performing simple connections through the conductive part, without a need to replace the entire battery module.

Understandably, the above general description and the following detailed description are only exemplary without limiting this application.

REFERENCE NUMERALS

Figure 1:
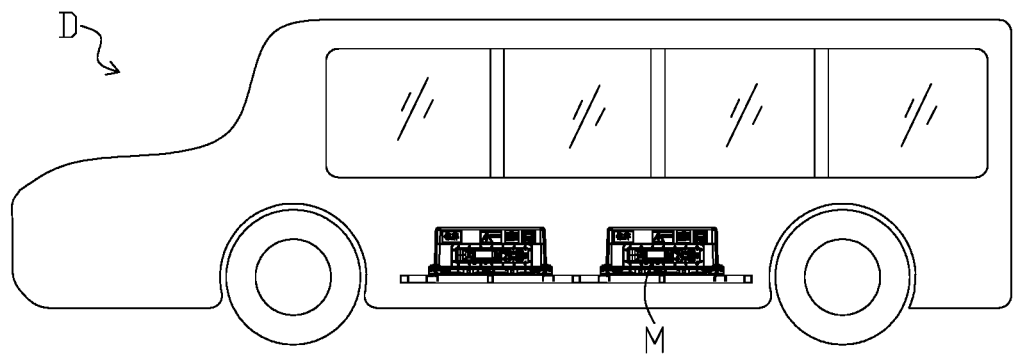
FIG. 1 is a schematic structural diagram of an apparatus according to a specific embodiment of this application.

D—Apparatus;
M—Battery pack;
M1—Container;
M11—Upper container part;
M12—Lower container part;
M13—Accommodation cavity;
M2—Battery module;
1—Battery unit;
11—Electrode terminal;
111—First electrode terminal;
112—Second electrode terminal;
12—Target battery unit;
13—Failed battery unit;
14—Non-failed battery unit;
15—Battery cell array;
151—Battery cell;
16—Top cover;
17—Electrode assembly;
2—Connecting plate;
21—First connecting plate;
211—First connecting region;
22—Second connecting plate;
221—Second connecting region;
23—Broken connecting plate;
231—First part;
232—Second part;
24—Unbroken connecting plate;
3—Conductive part;
31—First conductive part;
311—First connecting section;
312—Second connecting section;
313—First transition section;
32—Second conductive part;
321—Third connecting section;
322—Fourth connecting section;
323—Second transition section;
33—First connecting part;
34—Second connecting part;
35—Body part;
36—Clamping part;
361—Accommodation space;
361a—First arm;
361b—Second arm;
37—Position limiting part;
38—Metal strap;
4—Heat insulation part;
5—Connector;
6—End plate; and
7—Side plate.

The drawings described here are incorporated into the specification as a part of the specification. The drawings illustrate embodiments of this application and are used together with the specification to interpret the principles of this application.

DESCRIPTION OF EMBODIMENTS

For better understanding of the technical solutions of this application, the following describes embodiments of this application in detail with reference to accompanying drawings.

It is apparent that the described embodiments are only a part of rather than an entirety of the embodiments of this application. All other embodiments derived by a person of ordinary skill in the art based on the embodiments of this application without making any creative efforts shall fall within the protection scope of this application.

The terms used in the embodiments of this application are intended only for describing specific embodiments rather than for limiting this application. Unless otherwise expressly indicated in the context, the words "a", "the", and "this" that precedes a singular noun in the embodiments and claims of this application are intended to include the plural form of the noun.

Understandably, the term "and/or" used herein only describes an association relationship between associated objects and indicates existence of three relationships. For example, "A and/or B" may indicate existence of A alone, coexistence of A and B, and existence of B alone. In addition, the character "I" herein generally indicates an "or" relationship between the object preceding the character and the object following the character.

It needs to be noted that localizers such as "on", "above", "under", "below", "left", and "right" used in the embodiments of this application are described from a perspective shown in the accompanying drawings, and shall not be understood as a limitation on the embodiments of this application. In addition, understandably, depending on the context, one element described as being connected "on" or "under" another element not only means that the element may be directly connected "on" or "under" the other element, but also means that the element may be indirectly connected "on" or "under" the other element through an intermediate element.

An embodiment of this application provides an apparatus that uses a battery unit as a power supply, a battery pack, and a battery module. The apparatus may be a mobile device such as a vehicle, a ship, or a small aircraft. The apparatus includes a power source, and the power source is used to provide a driving force for the apparatus. The power source may be configured as a battery module that provides electrical energy to the apparatus. The driving force of the apparatus may be sole electric energy, or may include electric energy and other types of energy (such as mechanical energy). The power source may be a battery module (or a battery pack). In addition, the apparatus may also be an energy storage device such as a battery cabinet. The battery cabinet may include a plurality of battery modules (or battery packs), so that the battery cabinet can output electric energy. Therefore, any apparatus that can use a battery unit as a power supply shall fall within the protection scope of this application.

As shown in FIG. 1, using a vehicle as an example, an apparatus D in an embodiment of this application may be a new energy vehicle. The new energy vehicle may be a battery electric vehicle, or may be a hybrid electric vehicle or a range-extended electric vehicle or the like. The vehicle may include a battery pack M and a vehicle body. The battery pack M is disposed in the vehicle body. A driving motor is further disposed in the vehicle body, and the driving motor is electrically connected to the battery pack M. The battery pack M provides electrical energy. The driving motor is connected to wheels of the vehicle body through a transmission mechanism to drive the vehicle to run. Specifically, the battery pack M may be horizontally disposed at a bottom of the vehicle body.

Figure 2:
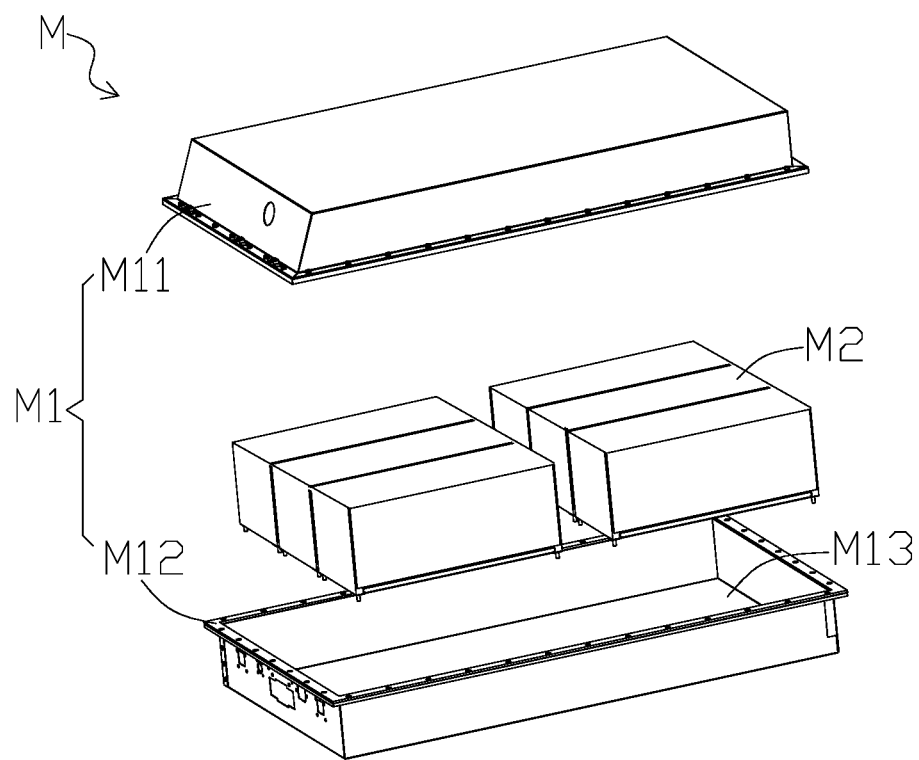
FIG. 2 is a schematic structural diagram of a battery pack in FIG. 1 according to a specific embodiment.

As shown in FIG. 2, the battery pack M includes a container M1 and a battery module M2 that is disclosed in this application. The container M1 has an accommodation cavity M13. The battery module M2 is accommodated in the accommodation cavity M13. The battery module M2 may be one or more in number. A plurality of battery modules M2 are arranged in the accommodation cavity M13. The container M1 is not limited in terms of type, and may be a frame-shaped container, a disk-shaped container, or a box-shaped container. Specifically, as shown in FIG. 2, the container M1 may include a lower container part M12 accommodating the battery module M2 and an upper container part M11 engaging with the lower container part M12.

It needs to be noted that a length direction X, a width direction Y, and a height direction Z mentioned herein are defined with reference to a battery unit. The length direction X means a thickness direction of the battery unit. The width direction Y means a width direction of the battery unit, and the width direction Y and the length direction X are perpendicular (approximately perpendicular) to each other and located on a same plane. The height direction Z means an extension direction of electrode terminals in the battery unit. In the battery module, the length direction X, the width direction Y, and the height direction Z are perpendicular (approximately perpendicular) to each other. That is, the height direction Z is perpendicular to a plane formed by the width direction Y and the length direction X.

The battery module includes a plurality of battery units and a frame structure configured to fix the battery units. The plurality of battery units may be stacked on each other along the length direction X. The frame structure may include end plates. The end plates are respectively located at two ends of the battery units along the length direction X, and are used to limit movement of the battery units along the length direction X. In addition, in a specific embodiment, the frame structure may further include side plates. The two side plates are respectively located on two sides of the battery units along the width direction Y, and the side plates are connected to the end plates to form the frame structure. In another embodiment, the frame structure may have no side plate, and the battery units are connected by a first binding strap or by both a first binding strap and a second binding strap after being stacked. The end plates and the binding strap form the frame structure. In addition, in a specific embodiment, the battery pack may include a container and a plurality of battery units. The container has an accommodation cavity. The plurality of battery units are located in the accommodation cavity, and may be connected to the container. Specifically, the battery units may be bonded to an inner wall of the container through a binder.

Specifically, each battery unit includes an electrode assembly, a top cover, electrode terminals, and a housing. An inner cavity of the housing is used to accommodate the electrode assembly and an electrolyte, and one or more electrode assemblies may be disposed in the inner cavity of the housing. The electrode terminals are disposed on the top cover, and the electrode assembly is electrically connected to the electrode terminals. The electrode assembly includes a first electrode plate, a second electrode plate, and a separator. A polarity of the first electrode plate is opposite to a polarity of the second electrode plate. The separator is located between the first electrode plate and the second electrode plate that are adjacent to each other, and is configured to separate the first electrode plate from the second electrode plate. In a possible design, a negative electrode plate, a separator, and a positive electrode plate are wound to form an electrode assembly. In another possible design, a negative electrode plate, a separator, and a positive electrode plate are stacked to form an electrode assembly. In addition, after being injected into the inner cavity of the housing, the electrolyte can infiltrate the electrode assembly, so that the electrode assembly can output electrical energy to the electrode terminals.

The electrode terminals include a first electrode terminal and a second electrode terminal that have opposite polarities. In the battery module or the battery pack, the plurality of battery units are electrically connected to form a circuit of the battery module or the battery pack. Specifically, the battery units may be serially-connected to each other, and may be connected to each other by a connecting plate. For example, at the time of serial-connecting the battery units, a first electrode terminal of one battery unit is connected to a second electrode terminal of another battery unit through the connecting plate.

In a working process of the battery module, each battery unit is continuously charged and discharged, and the battery unit may be faulty (for example, a capacity of the battery unit attenuates abnormally) and thus unable to work normally. Therefore, the faulty battery unit that cannot work normally is herein defined as a failed battery unit, and a non-faulty battery unit that can work normally is defined as a non-failed battery unit. In this case, one or more failed battery units exist in the battery module or the battery pack, so that a circuit of the battery module or the battery pack is faulty and unable to supply power normally. That is, the battery module or the battery pack fails. To solve this technical problem, this application removes the failed battery unit from the circuit of the battery module and forms a new circuit.

It needs to be noted that the battery unit mentioned in the embodiment of this application may fall in the following two circumstances. In a first circumstance, when the battery module is formed by serial-connecting a plurality of battery cells, the battery unit in the embodiment of this application may be a single battery cell. Correspondingly, the failed battery unit may be one of failed battery cells. In a second circumstance, when the battery module includes at least one parallel assembly formed by parallel-connecting two or more battery cells, the battery unit in the embodiment of this application may be a parallel assembly. Correspondingly, the failed battery unit is one of the parallel assemblies, and the parallel assembly includes at least one failed battery cell.

In addition, the battery unit mentioned in the embodiment of this application may be a pouch-type cell, or may be a prismatic cell or a cylindrical cell or the like.

Figure 3:
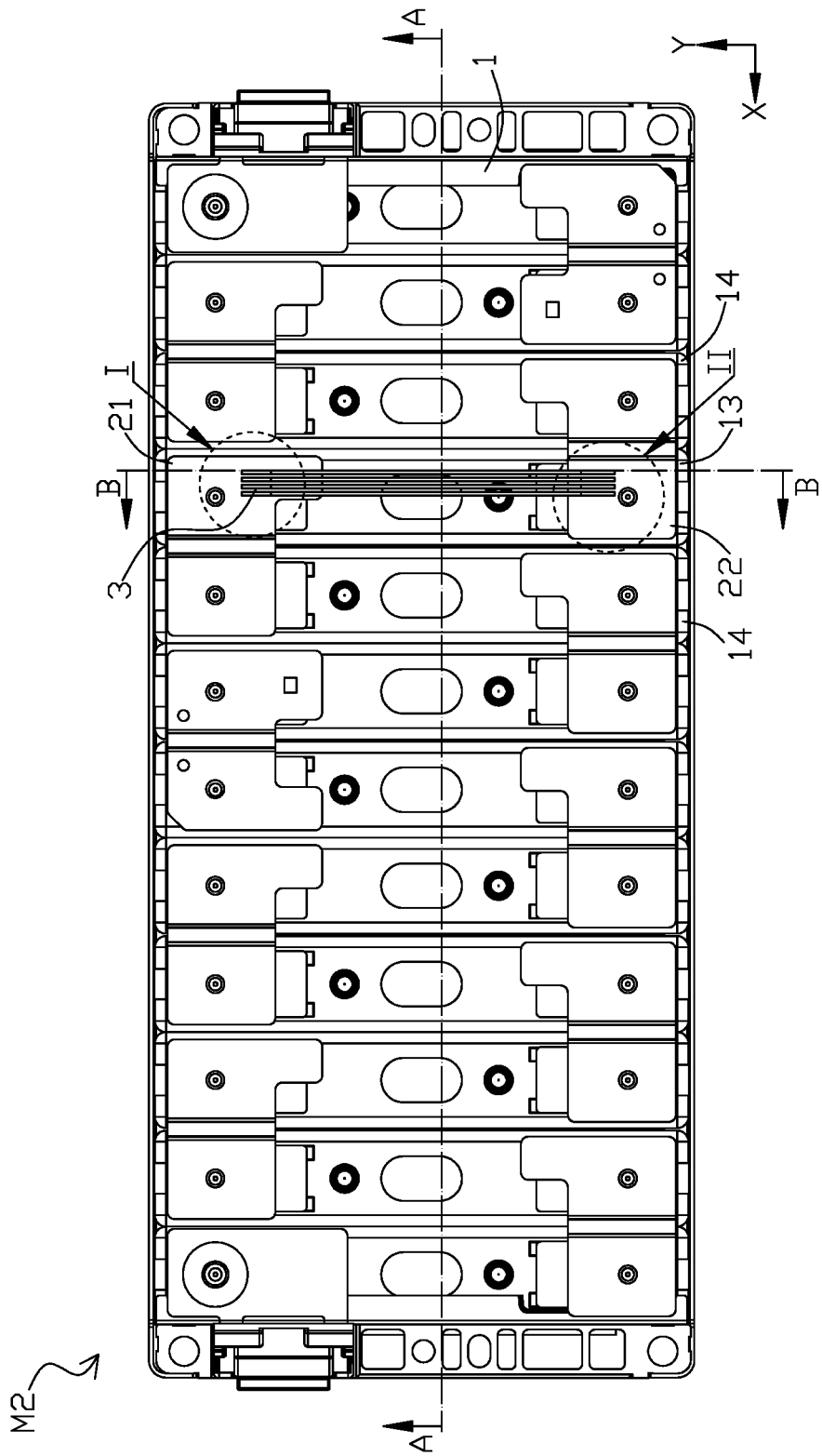
FIG. 3 is a top view of a battery module in FIG. 2 according to a first specific embodiment.
Figure 4:
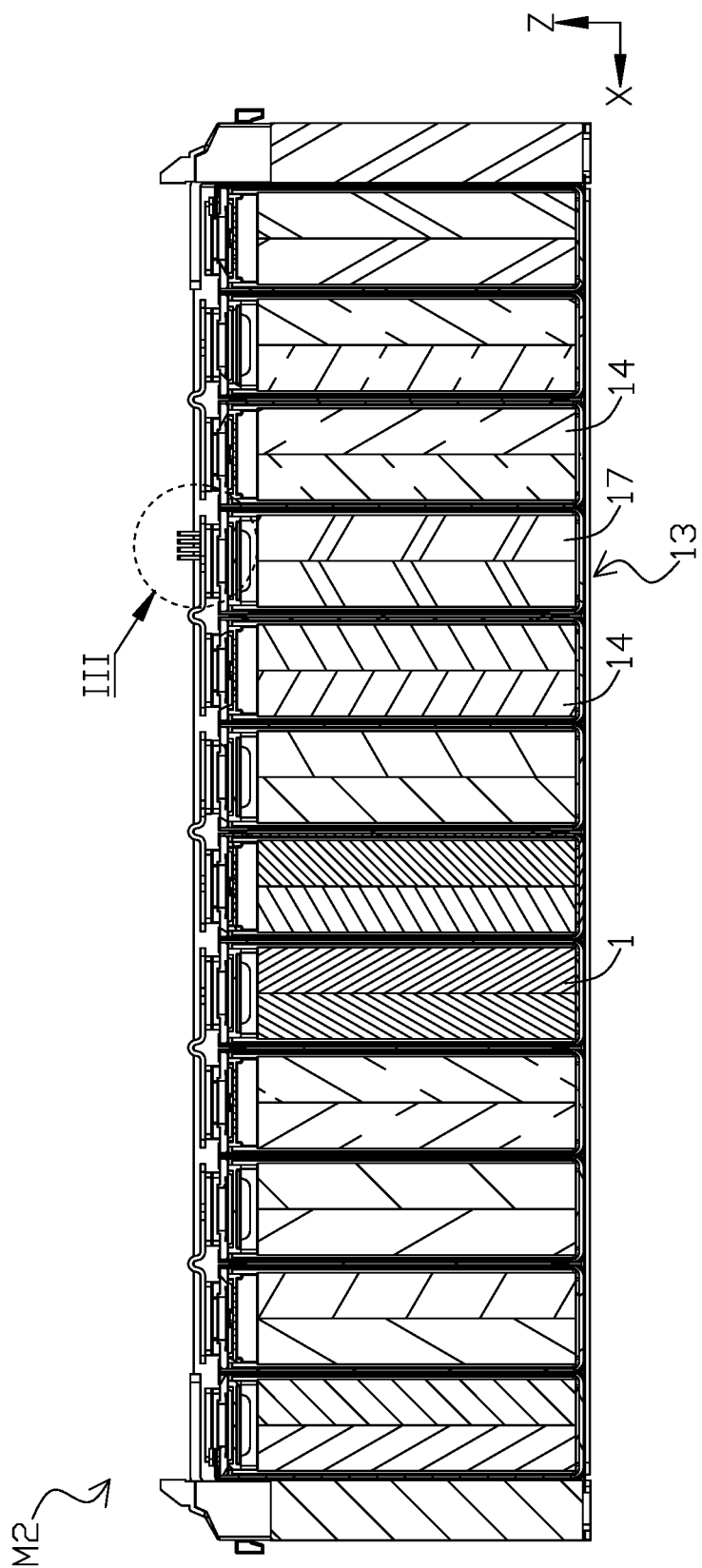
FIG. 4 is a sectional view in an A-A direction of FIG. 3.

To solve the above technical problem, as shown in FIG. 3, after the battery module M2 in the embodiment of this application fails, the plurality of serially-connected battery units 1 of the battery module M2 include at least one failed battery unit 13 and at least one non-failed battery unit 14. In addition, the battery module M2 further includes a conductive part 3. The conductive part 3 is a part capable of conducting electricity to implement electrical connection. The conductive part 3 is configured to be electrically connected to at least one non-failed battery unit 14. As shown in FIG. 4, after the conductive part 3 is electrically connected to the at least one non-failed battery unit 14, a current can bypass an electrode assembly 17 of the failed battery unit 13, so that the battery module M2 resumes working, where the resumption of working means that the battery module M2 can be charged or discharged normally.

In the embodiment of this application, that the conductive part 3 is electrically connected to at least one non-failed battery unit 14 includes: the conductive part 3 is directly connected to the at least one non-failed battery unit 14, or the conductive part 3 is indirectly connected to the at least one non-failed battery unit 14. In this way, the current can be transmitted through the conductive part 3 to the non-failed battery unit 14 connected to the conductive part 3, so as to enable conduction of the circuit of the battery module M2 and make the battery module M2 resume working.

In existing designs, when a battery unit in the battery pack fails, people may think of replacing the failed battery unit, or, in order to improve repair efficiency, think of replacing and repairing the entire battery module. Consequently, in a repair process, the failed battery pack (the battery pack containing the failed battery unit) needs to be returned to a manufacturer, and the manufacturer needs to match a corresponding battery unit or battery module. Alternatively, a model of the corresponding battery unit or battery module needs to be sent to the manufacturer. This process consumes a lot of time for waiting, and is not conducive to optimization of resources.

The above handling method is consistent with handling methods in most fields, in which the failed part or structure is replaced to make the overall structure resume working. Therefore, at repair service points in most fields, samples of parts that are vulnerable to failure are stored, and simple test devices are made readily available. If a part that is not vulnerable to failure fails, or, if a part that is not easy to store or keep fails, the repair service point cannot replace or repair the part unless a replacement part is picked up from the manufacturer. If a complicated repair method is required, the repair service point has to request technical support from corresponding technicians of the manufacturer.

In the battery field, battery units account for a large proportion of the failed parts of the battery pack. However, there are many difficulties in storing samples of the battery units. In addition, the battery units are not suitable for being stored for a long time because: 1. currently battery units have many models differing in size, capacity, chemical system, structure, and the like; 2. self-discharge occurs when the battery units are stored for a long time, and a capacity balance between a positive electrode terminal and a negative electrode terminal of a battery unit will be gradually broken and the imbalance will deepen over time; and 3. during long-term storage, irreversible capacity losses will also accumulate due to a decomposition reaction of the electrolyte. In addition, storage conditions of the battery units are demanding. With adverse environmental factors, the self-discharge of the battery units may accelerate.

Even if all battery units are of the same structure without involving the problem of models, parameters such as a capacity and a self-discharge speed of a battery unit need to be measured again if the battery unit needs to be put into use after being stored for a long time. However, at general repair service points, such test conditions are lacking, and operators lack professional analysis capabilities. Without retesting the battery unit, normal working of a repaired battery pack cannot be ensured. In addition, with the problem of battery models, each repair service point not only needs to reserve battery units of different models, but also need to be equipped with related test devices and corresponding technicians. Therefore, it is difficult for the repair service point to implement the repair method of replacing the battery unit.

Therefore, in order to improve repair efficiency of the battery pack, the operator will replace a failed battery module in the battery pack (the failed battery module means a battery module containing a failed battery unit). This method implements repair quickly. However, a battery module includes a plurality of battery units. In rare circumstances, all battery units in a battery module fail. In normal circumstances, the battery module cannot work normally if just a small number of battery units in a battery module fail (for example, only one battery unit fails). In this case, replacing the entire battery module causes a waste of resources.

Moreover, a new replacement battery module will have a considerable problem in battery balancing. When a battery pack is in normal use, a capacity of the battery pack will attenuate, and the capacity differs between the new battery module and an old battery module after the replacement. According to the Buckets Effect, the capacity of the battery pack depends on the battery module of the lowest capacity. Therefore, the new replacement battery module does not work well in the structure. Further, due to capacity attenuation, the old battery module is always fully charged and fully discharged, thereby speeding up ending of a service life of the old battery module. In addition, an internal resistance of the old battery module is higher than that of the new replacement battery module, and the same current flows through the old battery module and the new replacement battery module. In this case, the old battery module with a higher internal resistance generates more heat. That is, the battery unit in the old battery module has a higher temperature, and deteriorates at a higher speed, thereby further increasing the internal resistance of the old battery module. Therefore, the increase of the internal resistance and the rise of temperature of the battery unit form a pair of negative feedback, and accelerate the deterioration of the battery unit that has a high internal resistance.

On the other hand, for a circuit of an electric device, both a short circuit and an open circuit depict a circuit fault. Currently, the short circuit is mainly used to realize fuse blowout, or used for a load of other test devices. However, no one adds a conductive part into the corresponding structure to short-circuit the failed battery unit because this practice is simply considered problematic and unable to achieve goals. However, short-circuiting one of the battery units in the entire battery module ensures normal use of the battery pack without causing a high volatility in capacity.

The problem of failure of the battery module can also be solved by disconnecting the failed battery unit. By connecting with a conductive part, the repair method can be simplified, and rapid repair can be implemented through simple connections. In addition, the failed battery unit is not in the circuit at all, and safety of the battery module is well ensured.

In this embodiment, as shown in FIG. 3, the conductive part 3 is connected to at least one non-failed battery unit 14, so that the failed battery unit 13 is no longer involved in the circuit of the battery module M2. That is, the failed battery unit 13 does not affect the circuit of the battery module M2, thereby improving safety of the battery module M2. Moreover, in this embodiment, repair is implemented through simple connection of the conductive part 3, without a need to replace the entire battery module M2. When the battery module M2 is applied to a vehicle, the vehicle can be directly repaired at the repair service point without returning the entire vehicle to the manufacturer or without replacing with a new battery pack M, thereby improving repair efficiency of the battery module M2 and simplifying a maintenance process and reducing maintenance cost. In addition, after the above operations are performed, only a small number of failed battery units 13 in the battery module M2 do not participate in formation of the circuit. This enables the battery module M2 and the battery pack M to work normally without causing a significant decrease in the battery capacity of the battery module M2.

In addition, in a structure of the battery pack in which the battery unit is directly bonded to an accommodation cavity of a container through a binder, when a battery unit fails, it is not easy to perform an operation of removing the failed battery unit from the accommodation cavity. Therefore, the handling method in this embodiment has advantages of convenient operation and high efficiency.

In the embodiment of this application, in order to achieve a purpose of making a current bypass the electrode assembly of the failed battery unit, the following two methods may be specifically performed. In the first method, the electrode terminals of the failed battery unit are connected by a conductive part so as to short-circuit the electrode assembly of the failed battery unit. At this time, the circuit of the failed battery unit in the battery module is equivalent to a conductor, serving the only purpose of conducting electricity. In this method, the conductive part is indirectly connected to the non-failed battery unit. In the second method, the conductive part connects non-failed battery units that are located upstream and downstream of the failed battery unit respectively, so that the current of the non-failed battery units is transmitted through the conductive part to enable conduction of the circuit of the battery module. In this method, the conductive part may directly connect the non-failed battery units, or indirectly connect the non-failed battery units.

In a possible design, as shown in FIG. 3, the conductive part 3 may be configured to electrically connect the two electrode terminals 11 of the failed battery unit 13.

In this embodiment, the conductive part 3 may be directly connected to the two opposite-polarity electrode terminals 11 of the failed battery unit 13, or may be indirectly connected to the two electrode terminals 11 of the failed battery unit 13.

Specifically, as shown in FIG. 3, the battery module M2 further includes connecting plates 2. The connecting plates 2 are connected to the two electrode terminals 11 of the battery unit 1. Therefore, the conductive part 3 is electrically connected to the two electrode terminals 11 of the failed battery unit 13. In this way, the conductive part 3 may be electrically connected to at least one non-failed battery unit 14 by means of: electrically connecting the conductive part 3 to the electrode terminals 11 of the failed battery unit 13, and/or, electrically connecting the conductive part 3 to the connecting plates 2 that are connected to the electrode terminals 11 of the failed battery unit 13.

In the embodiment shown in FIG. 3, the conductive part 3 is electrically connected to the connecting plates 2 that are connected to the electrode terminals 11 of the failed battery unit 13, and the conductive part 3 may be connected to the connecting plates 2 by means of welding, bonding, riveting, or the like as long as the electrical connection between the conductive part 3 and the connecting plates 2 is implemented and reliable. In this embodiment, each connecting plate 2 is larger than the electrode terminal 11 in size. Therefore, in connecting the conductive part 3 to the connecting plates 2, due to a relatively large junction area between the parts, processing difficulty is reduced, connection reliability is improved, and a service life of the battery module M2 is increased. In addition, this ensures a sufficient passage area at a connection joint, and ensures safety. In addition, the connecting plates 2 are superimposed on the electrode terminals 11 of the failed battery unit 13. In connecting the conductive part 3 to the connecting plates 2, the two connecting plates 2 do not need to be removed for the sole purpose of exposing the electrode terminals 11 of the failed battery unit 13, thereby reducing processing steps, simplifying a failure handling process, and improving efficiency.

Figure 5:
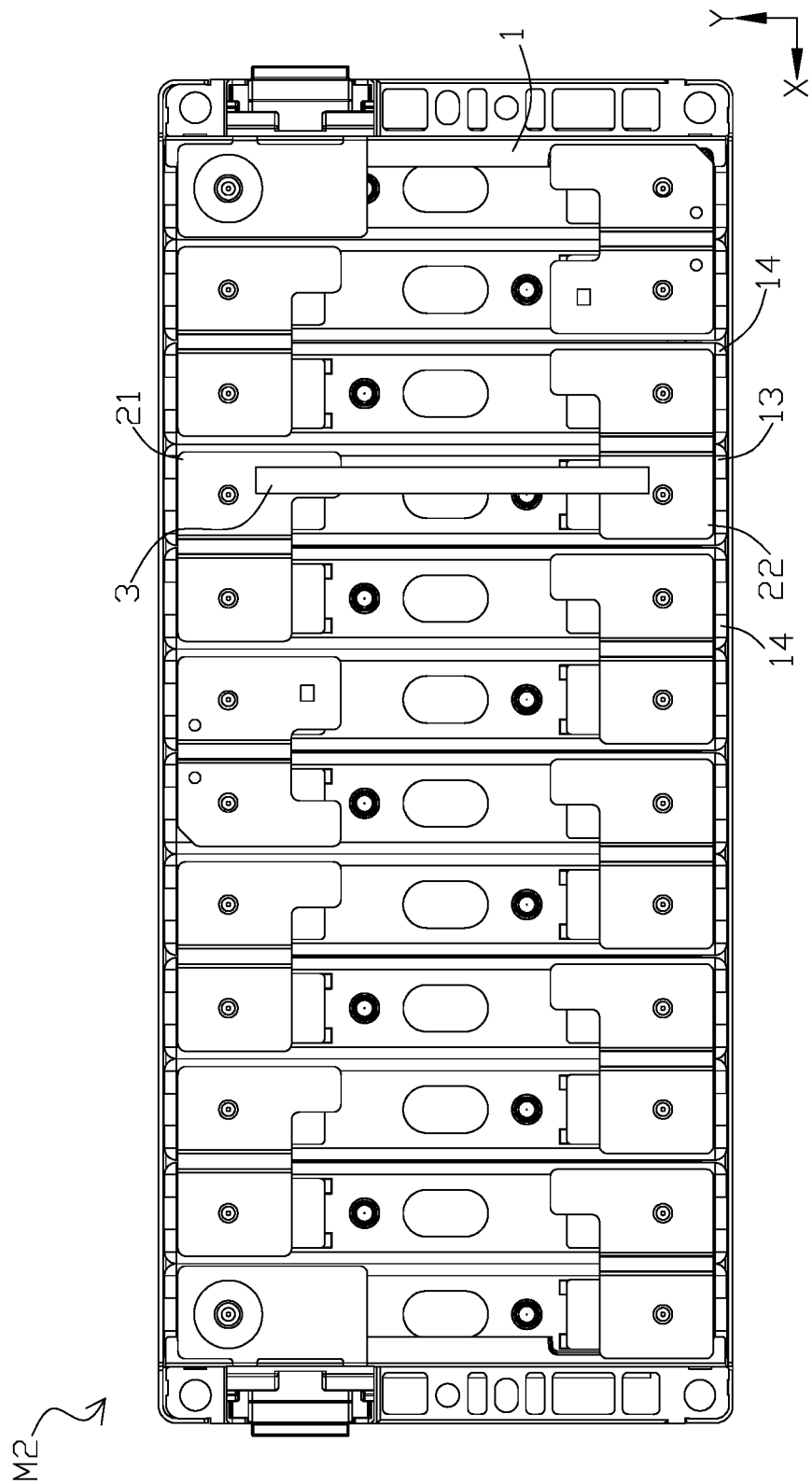
FIG. 5 is a top view of a battery module in FIG. 2 according to a second specific embodiment.

In the embodiment shown in FIG. 5, the conductive part 3 may be specifically a plate structure, or an end of the conductive part 3 may be a sheet-shaped structure. In this case, the conductive part 3 may be connected to the connecting plates 2 by welding, or by riveting or clamping. In this embodiment, the rigid-structured conductive part 3 has a relatively high structural strength, and can improve connection reliability between the conductive part 3 and the connecting plates 2.

Figure 6:
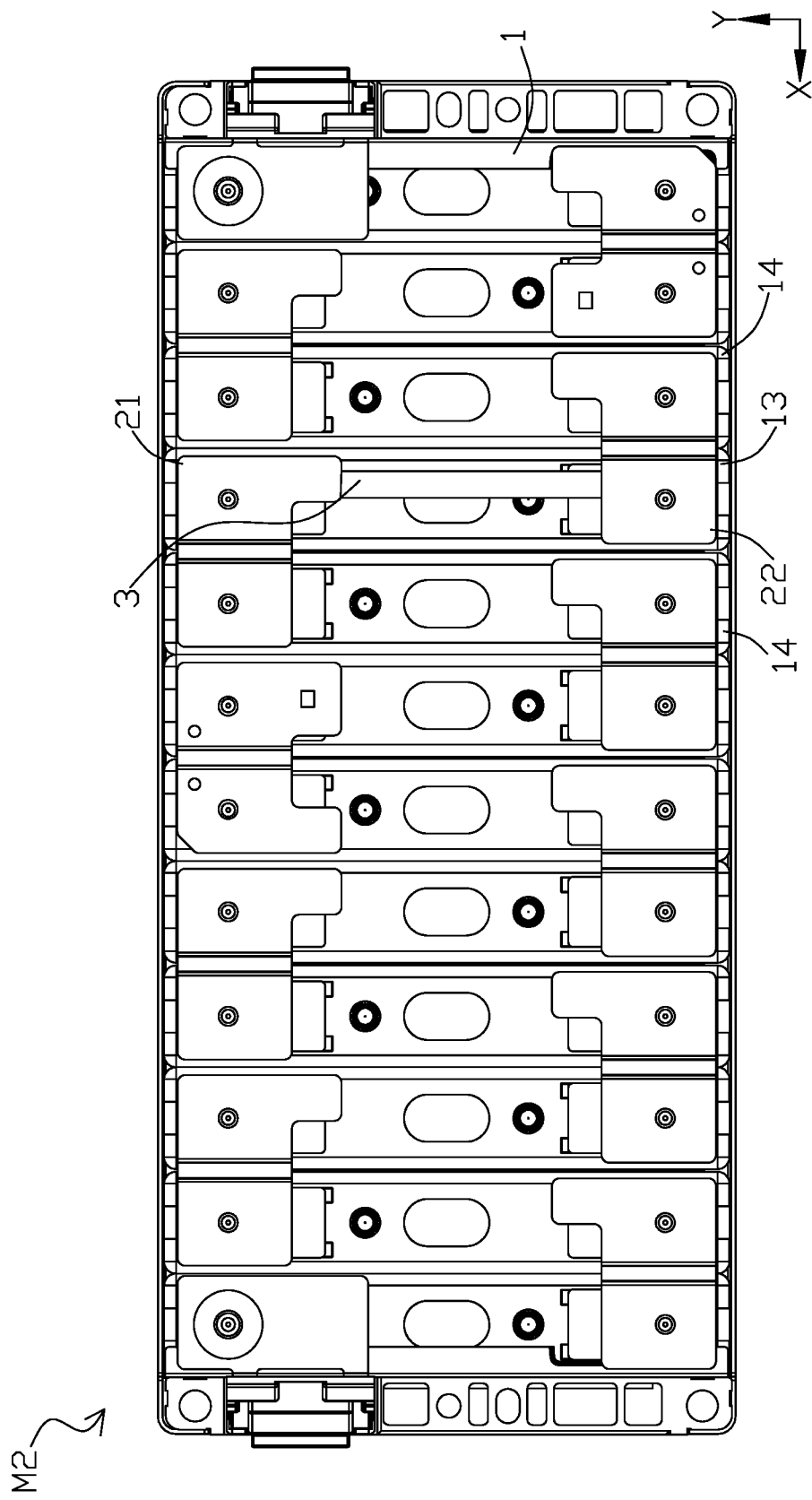
FIG. 6 is a top view of a battery module in FIG. 2 according to a third specific embodiment.

Specifically, as shown in FIG. 5, the end of the sheet-shaped structure of the conductive part 3 may partly overlap the connecting plates 2. That is, the end of the conductive part 3 is lap-jointed to the connecting plates 2 to implement mutual connection. Alternatively, as shown in FIG. 6, the end of the sheet-shaped structure of the conductive part 3 may overlap nothing of the connecting plates 2, and the conductive part 3 is interconnected to the connecting plates 2 (specifically, interconnected in a way such as butt-welding) to implement mutual connection.

In addition, a height of the conductive part 3 of the plate structure is small so as to prevent the conductive part 3 and the connecting plates 2 from interfering with an upper cover of the battery module M2 and effectively reduce the height of the battery module M2.

Figure 7:
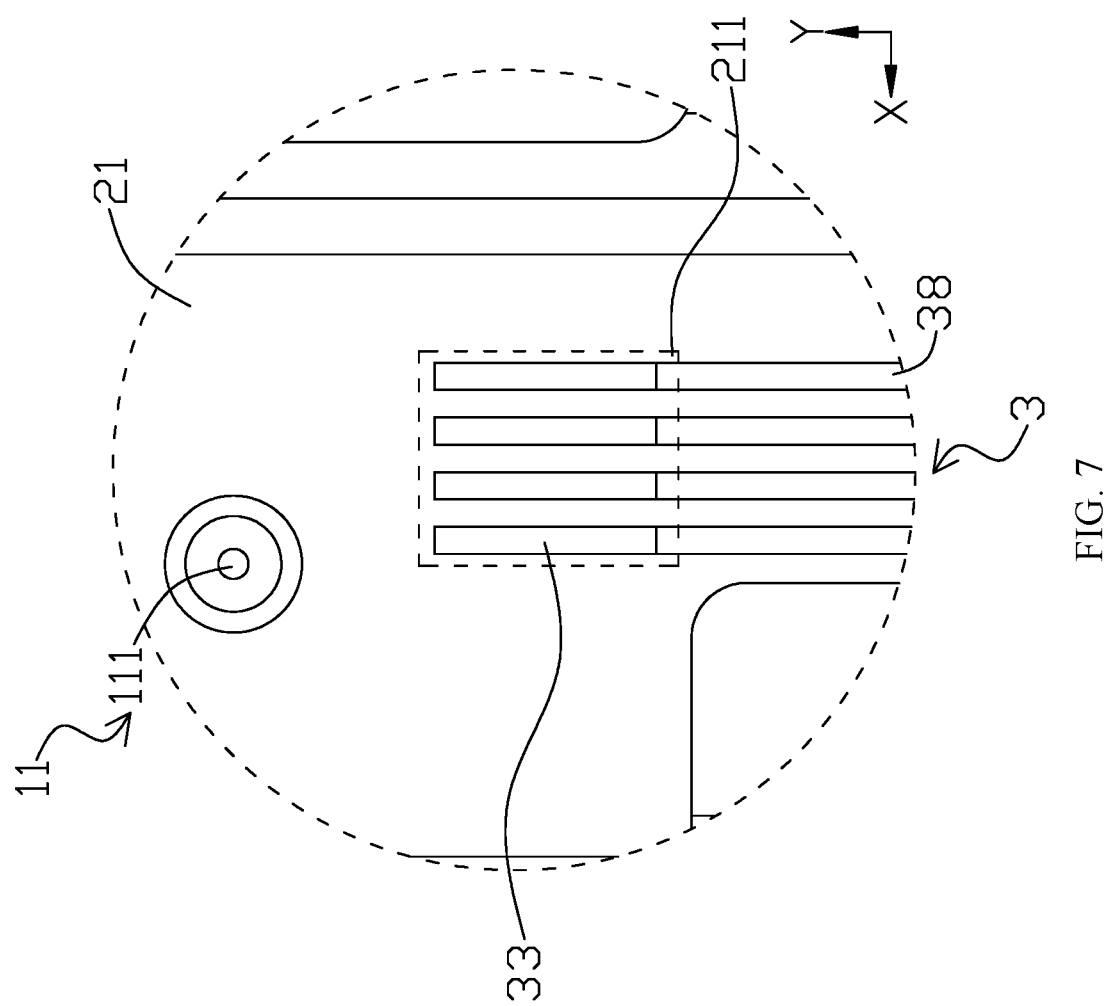
FIG. 7 is a local detailed view of part I of FIG. 3.
Figure 8:
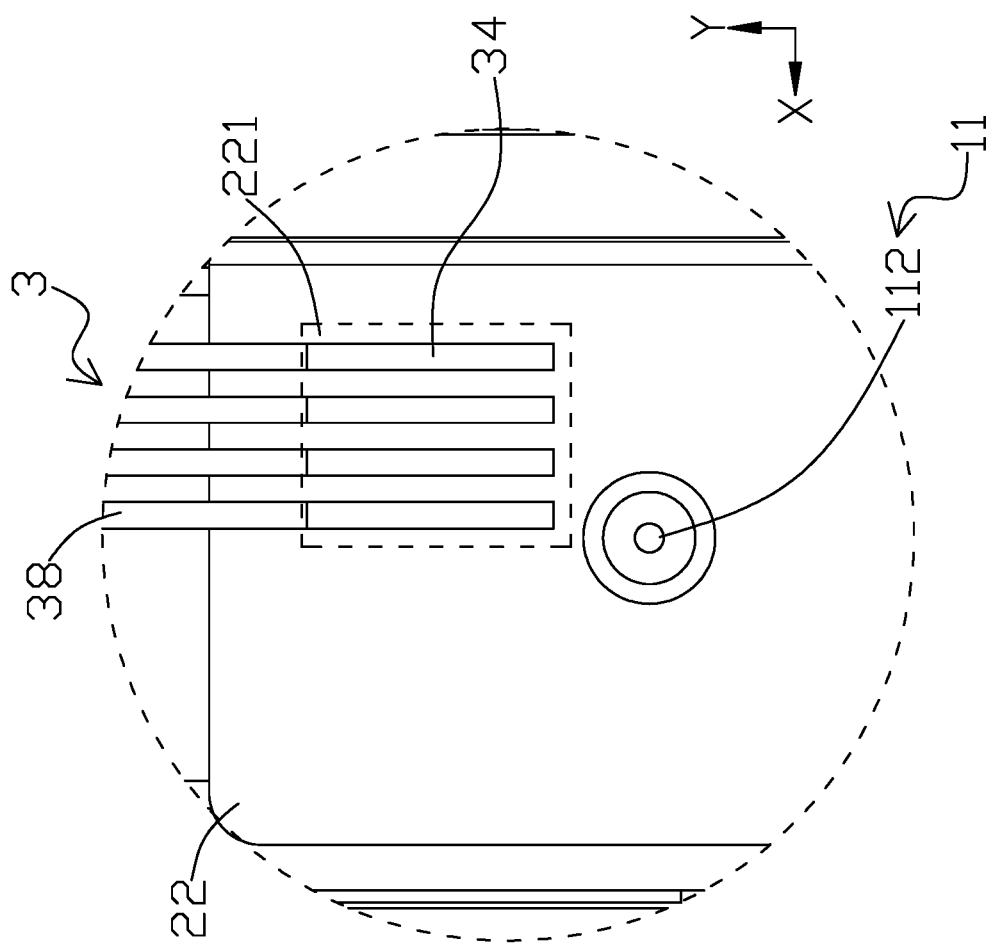
FIG. 8 is a local detailed view of part II of FIG. 3.
Figure 9:
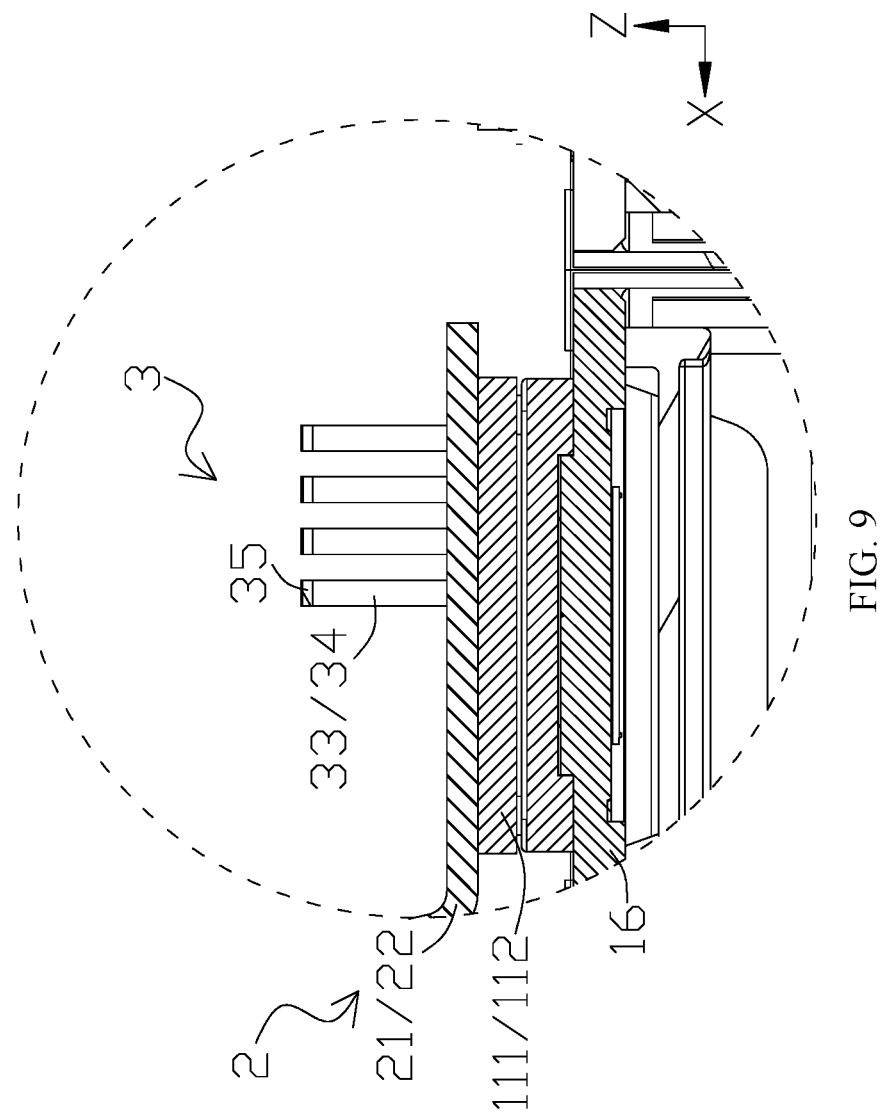
FIG. 9 is a local detailed view of part III of FIG. 4.
Figure 10:
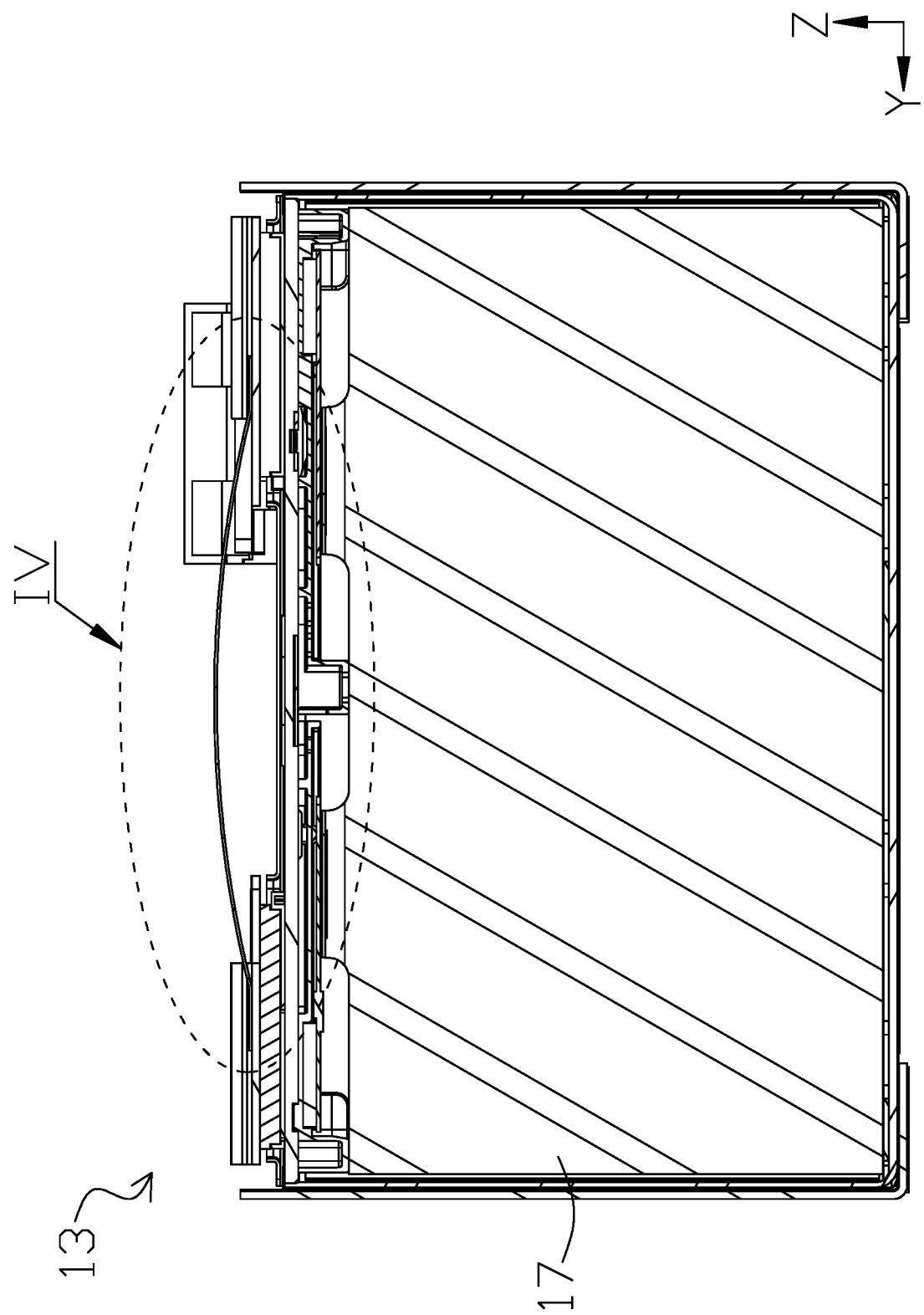
FIG. 10 is a sectional view in a B-B direction of FIG. 3.

In another specific embodiment, as shown in FIG. 7, a first electrode terminal 111 of the failed battery unit 13 is connected to a first connecting plate 21. Similarly, as shown in FIG. 8, a second electrode terminal 112 of the failed battery unit 13 is connected to a second connecting plate 22. Here, the conductive part 3 may adopt an integrated structure. The first connecting plate 21 and the second connecting plate 22 may be directly connected by the conductive part 3 of the integrated structure, thereby having an advantage of a simple structure. In addition, only two connection operations (such as welding) need to be performed, thereby improving efficiency of handling the failed battery unit 13. In addition, the conductive part 3 of the integrated structure can also be directly connected to the first connecting plate 21 and the second connecting plate 22 without a need to find a connection position on another conductive structure, thereby simplifying processing steps and improving connection reliability between the conductive part 3 and the first connecting plate 21 and the second connecting plate 22.

The conductive part 3 in this embodiment may be a flexible structure or a mildly rigid structure to facilitate the connection between the conductive part 3 and the first connecting plate 21 and the second connecting plate 22. In addition, the conductive part 3 is deformable and can dodge other parts by deforming, thereby further reducing risks of interference between the conductive part 3 and other parts in the battery module M2.

Specifically, as shown in FIG. 7 and FIG. 8, the conductive part 3 may include one or more metal straps 38. Each metal strap 38 is connected to the first connecting plate 21 and the second connecting plate 22 by welding or bonding or by other means.

"Bonding" here means wire bonding. In a bonding process, under joint effects of heat and pressure or ultrasonic energy, interatomic diffusion occurs between a wire and a bonding pad metal to achieve the purpose of bonding. In this embodiment, using the bonding between the conductive part 3 and the first connecting plate 21 as an example, as shown in FIG. 7, when the conductive part 3 includes the metal strap 38, the metal strap 38 is a wire in a bonding process, and the first connecting plate 21 is a bonding pad metal in the bonding process. Therefore, under joint effects of heat and pressure or ultrasonic energy, interatomic diffusion occurs between the metal strap 38 and the first connecting plate 21 to achieve bonding and implement connection between the conductive part 3 and the first connecting plate 21. Therefore, the bonding process described in the embodiment of this application is based on different principles than a welding connection means between metals commonly used in the prior art.

Specifically, the bonding may be achieved by means of ultrasonic bonding. In addition, when the conductive part 3 is connected to the first connecting plate 21 and the second connecting plate 22 by means of ultrasonic bonding, the conductive part 3 may be made of a flexible material so as to facilitate completion of the ultrasonic bonding process. Moreover, when the conductive part 3 is made of a flexible material, the conductive part 3 is deformable so as to buffer an impact received.

The material of the metal strap 38 may be one or more of copper, aluminum, or nickel, and certainly may be another material that has a low resistivity and a high conductivity.

In this embodiment, the first connecting plate 21 and the second connecting plate 22 may be bonded to the conductive part 3 in the following manner: as shown in FIG. 7 and FIG. 8, first of all, a first connecting region 211 is determined on the first connecting plate 21, and a second connecting region 221 is determined on the second connecting plate 22, where the first connecting region 211 and the second connecting region 221 may be manually determined. Specifically, a region may serve as the first connecting region 211 or the second connecting region 221 as long as the region does not interfere with other parts and has a relatively flat plane. For example, a flatness of the two connecting regions may be 0.1 mm-0.3 mm. Specifically, the flatness of the two connecting regions may be 0.15 mm or the like, so as to meet requirements of bonding the parts and improve connection reliability after the bonding. In addition, after the first connecting region 211 and the second connecting region 221 are determined, a length of the conductive part 3 may be determined according to a distance between the first connecting region 211 and the second connecting region 221. For example, the length of the conductive part 3 may be greater than the distance between the first connecting region 211 and the second connecting region 221, thereby improving connection reliability between the parts after the bonding. In addition, a quantity and a sectional area of the metal straps 38 included in the conductive part 3 may be determined according to actual conditions.

Further, as shown in FIG. 7 and FIG. 8, after the first connecting region 211 and the second connecting region 221 are determined, the first connecting region 211 and the second connecting region 221 may be cleaned appropriately. After impurities are cleaned away, a first connecting part 33 of the conductive part 3 is bonded to the first connecting plate 21 at the first connecting region 211, and a second connecting part 34 of the conductive part 3 is bonded to the second connecting plate 22 at the second connecting region 221.

In the above embodiments, the conductive part 3 may include one or more metal straps 38. Before the conductive part 3 is bonded to the first connecting plate 21 and the second connecting plate 22, the quantity N and the sectional area S of the metal straps 38 are determined according to the following formula: $A=\mu \times N \times S$, where $\mu$ denotes a passage coefficient of the metal straps 38, and A denotes a persistent current that passes through the battery unit when the battery pack is working normally.

Therefore, according to the above formula, a relationship between the quantity N and the sectional area S of the metal straps 38 can be obtained, a value of N×S can be obtained. Therefore, possible combinations of the quantity N and the sectional area S of the metal straps 38 can be determined according to the relationship between the quantity N and the sectional area S of the metal strips 38.

Specifically, when the material of the metal straps 38 is aluminum, the sectional area S of each metal strap 38 may be 2 $mm^2$, 6 $mm^2$, or the like, and therefore, the required quantity N of the metal straps 38 can be obtained.

Figure 11:
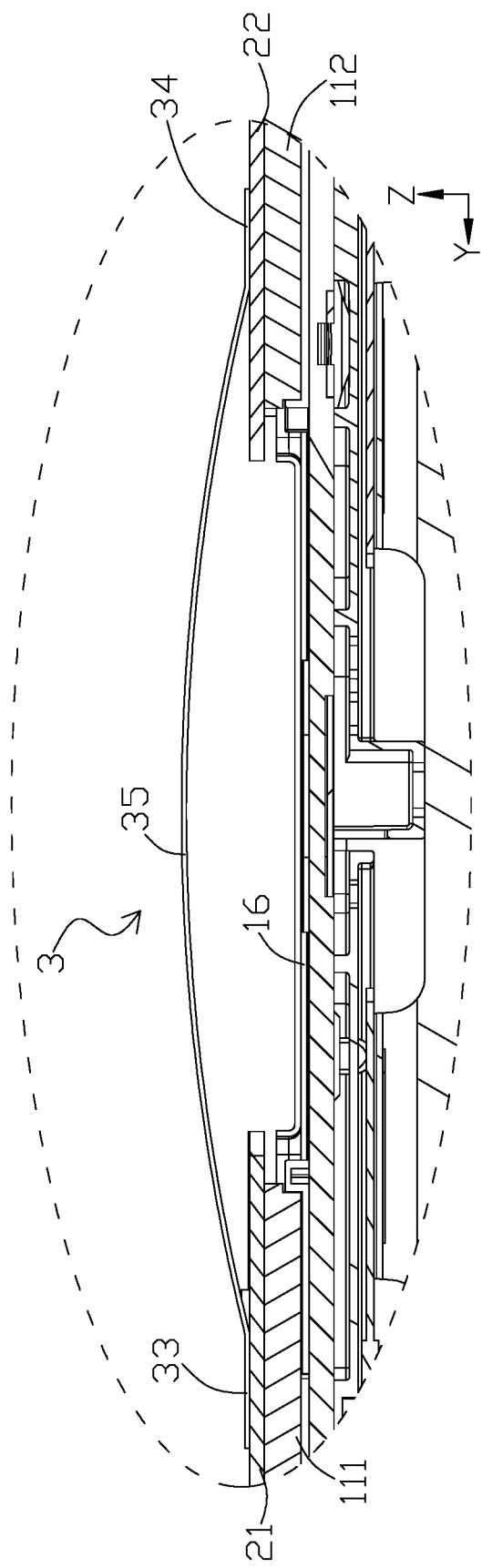
FIG. 11 is a local detailed view of part IV of FIG. 10.

In a specific embodiment, as shown in FIG. 11, the conductive part 3 may include a first connecting part 33, a second connecting part 34, and a body part 35. The body part 35 is connected to the first connecting part 33 and the second connecting part 34, the first connecting part 33 is connected to the first connecting plate 21, and the second connecting part 34 is connected to the second connecting plate 22.

In this embodiment, when the battery module vibrates during working, the failed battery unit 13 vibrates accordingly, thereby causing the first electrode terminal 111 moves relative to the second electrode terminal 112 of the failed battery unit 13 and pulling the conductive part 3. In this embodiment, the body part 35 can absorb a part of an external force received by the conductive part 3, thereby improving strength of the conductive part 3, improving the connection reliability between the conductive part 3 and the first connecting plate 21 and the second connecting plate 22, and increasing the service life of the battery module.

Specifically, as shown in FIG. 11, the body part 35 may be an arched structure, and the body part 35 protrudes away from the top cover 16 along a height direction Z.

In this embodiment, in a case of being an arched structure, the body part 35 can absorb vibration and impact of the conductive part 3 along a length direction X and a width direction Y, thereby increasing the service life of the battery module. In addition, the body part 35 that is an arched structure can reduce the force of pulling caused by the conductive part 3 to the first connecting plate 21 and the second connecting plate 22 after the conductive part 3 is connected to the first connecting plate 21 and the second connecting plate 22, thereby improving connection reliability.

More specifically, as shown in FIG. 11, a highest point of the arched structure of the body part 35 is neither too high nor too low. When the highest point of the arched structure is too high, a distance between the arched structure and an upper cover of the battery module is relatively small. Each battery cell generates heat while the battery module is working. If the battery module adopts a non-metal upper cover, the non-metal upper cover is at risk of being penetrated by melting due to a too high temperature, thereby leading to a high fire risk of the battery module. In order to reduce the fire risk, the battery module may adopt a metal upper cover. When the distance between the highest point of the arched structure of the conductive part 3 and the metal upper cover is small, the conductive part 3 is at risk of contacting the upper cover. The contacting electrifies the upper cover of the battery module, and poses a risk of electric shock to staff who are maintaining the battery module. In order to reduce such a safety hazard, the distance between the upper cover of the battery module and the conductive part 3 may be increased.

When the highest point of the arched structure is too low, the pulling force caused by the body part 35 to the first connecting part 33 and the second connecting part 34 are relatively large, thereby reducing structural strength of the first connecting part 33 and the second connecting part 34 and reducing connection reliability between the conductive part 3 and the first connecting plate 21 and the second connecting plate 22. Therefore, in this embodiment, the highest point of the body part 35 should be lower than the upper cover of the battery module, or there is a preset gap between the highest point of the body part 35 and the upper cover of the battery module. The preset gap may be 3 mm or another numerical value.

In a possible design, the conductive part 3 may be further electrically connected to the top cover 16 of the failed battery unit 13 while being electrically connected to at least one non-failed battery unit 14. In this embodiment, the conductive part 3 may be electrically connected to the two electrode terminals 11 of the failed battery unit 13 while being electrically connected to the top cover 16 of the failed battery unit 13. In this case, the failed battery unit 13 serves only as a conductor without participating in the charging and discharging process of the battery module. Therefore, a charging and discharging circuit of the battery module can be reconnected through the conductive part 3 and the top cover 16 of the failed battery unit 13 to make the battery module resume working.

Compared with a solution in which the conductive part 3 is electrically connected to only at least one non-failed battery unit 14, the means of connection in this embodiment increases a conductive area between the conductive part 3 and the non-failed battery unit 14, thereby increasing the passage area and improving safety of the battery module and the battery pack. In addition, the means of connection in this embodiment also improves connection reliability between the conductive part 3 and the parts in the battery module, thereby further improving the safety of the battery module and the battery pack.

In a first specific embodiment, the conductive part 3 may be an integrated structure, and the conductive part 3 of the integrated structure is electrically connected to at least one non-failed battery unit 14. In addition, the integrated conductive part 3 is also electrically connected to the top cover 16 of the failed battery unit 13.

Figure 12:
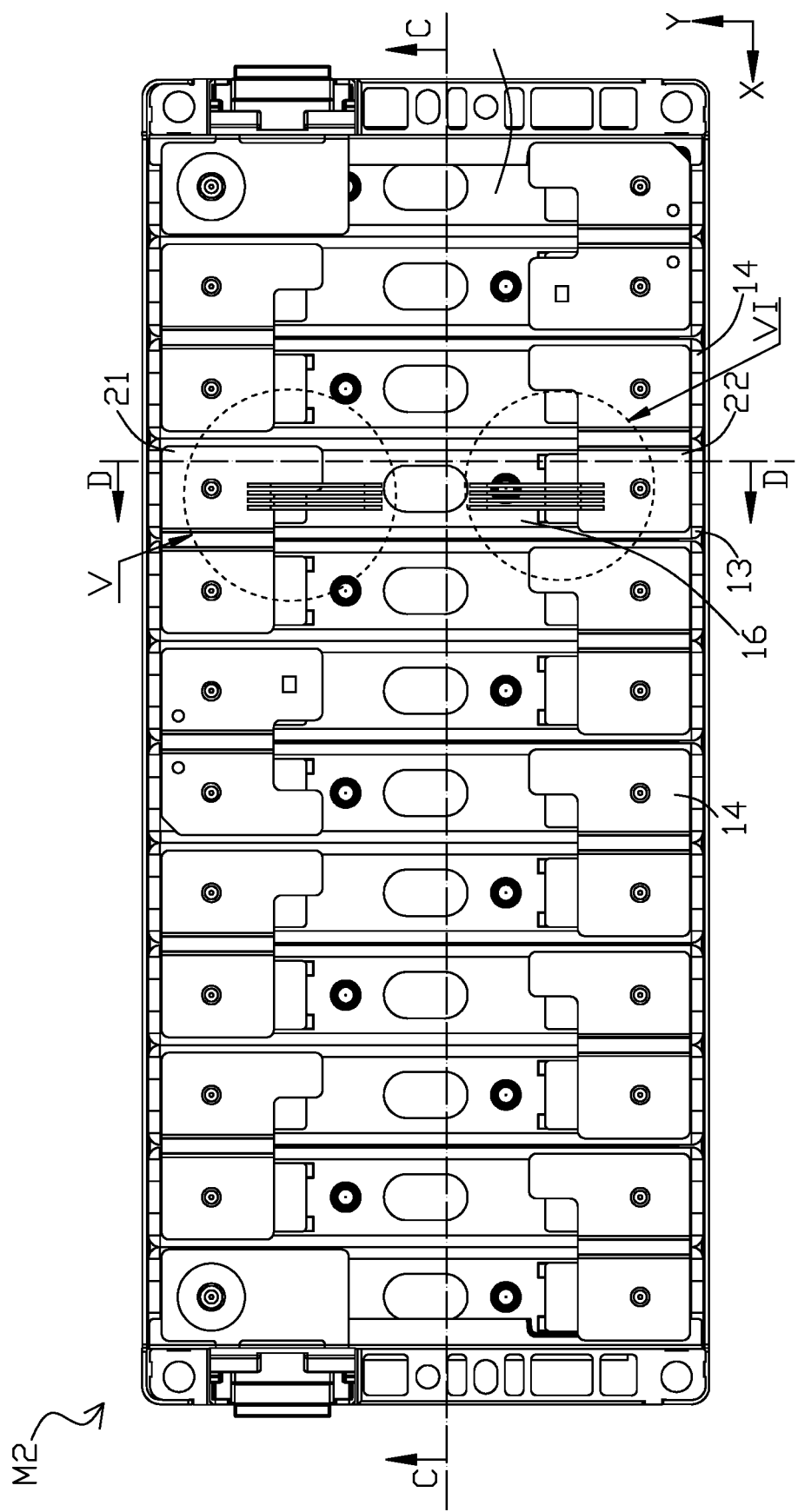
FIG. 12 is a top view of a battery module in FIG. 2 according to a fourth specific embodiment.

In another specific embodiment, as shown in FIG. 12, the conductive part 3 may include a first conductive part 31 and a second conductive part 32 that are discretely disposed, and both the first conductive part 31 and the second conductive part 32 are connected to the top cover 16 of the failed battery unit 13.

Figure 13:
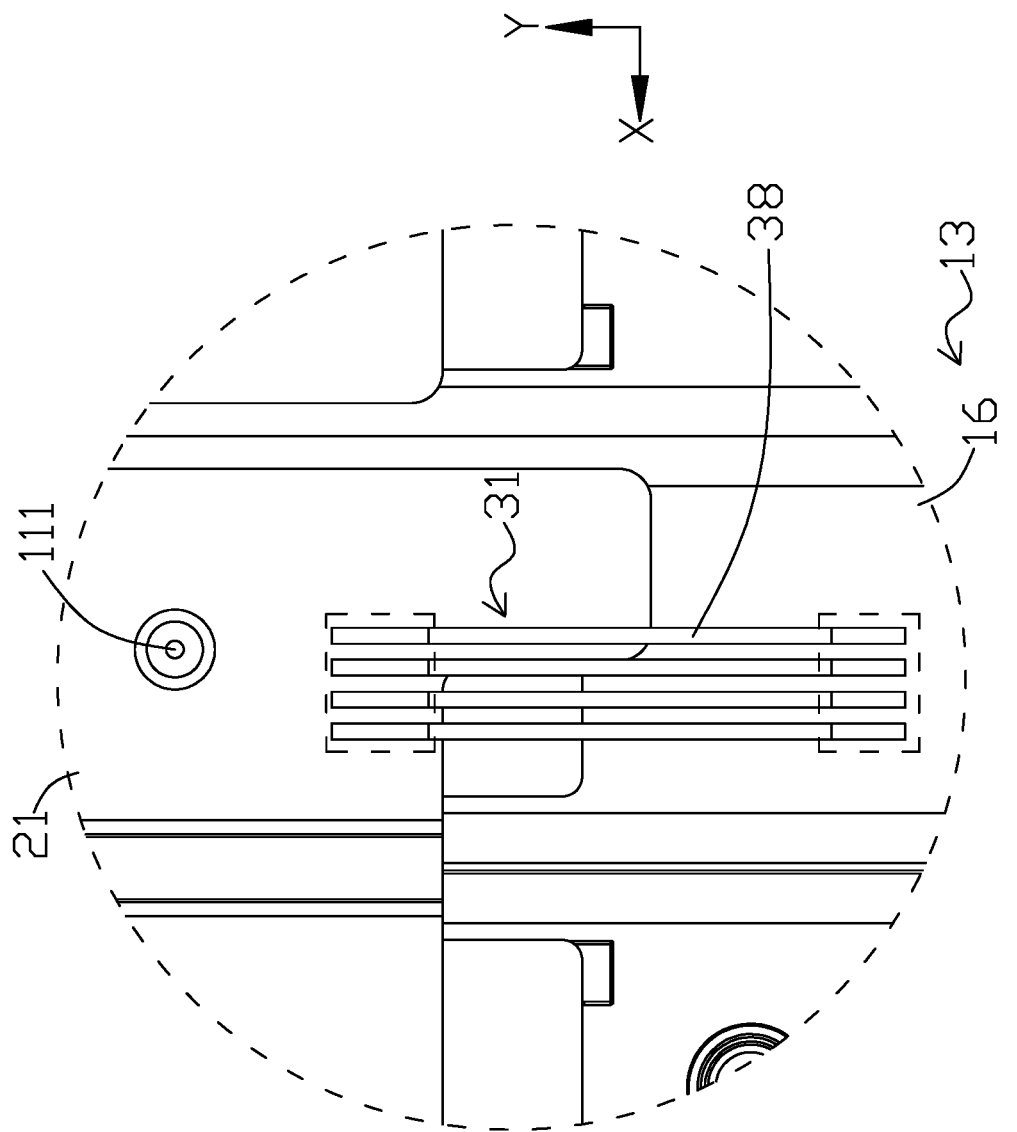
FIG. 13 is a local detailed view of part V of FIG. 12.
Figure 14:
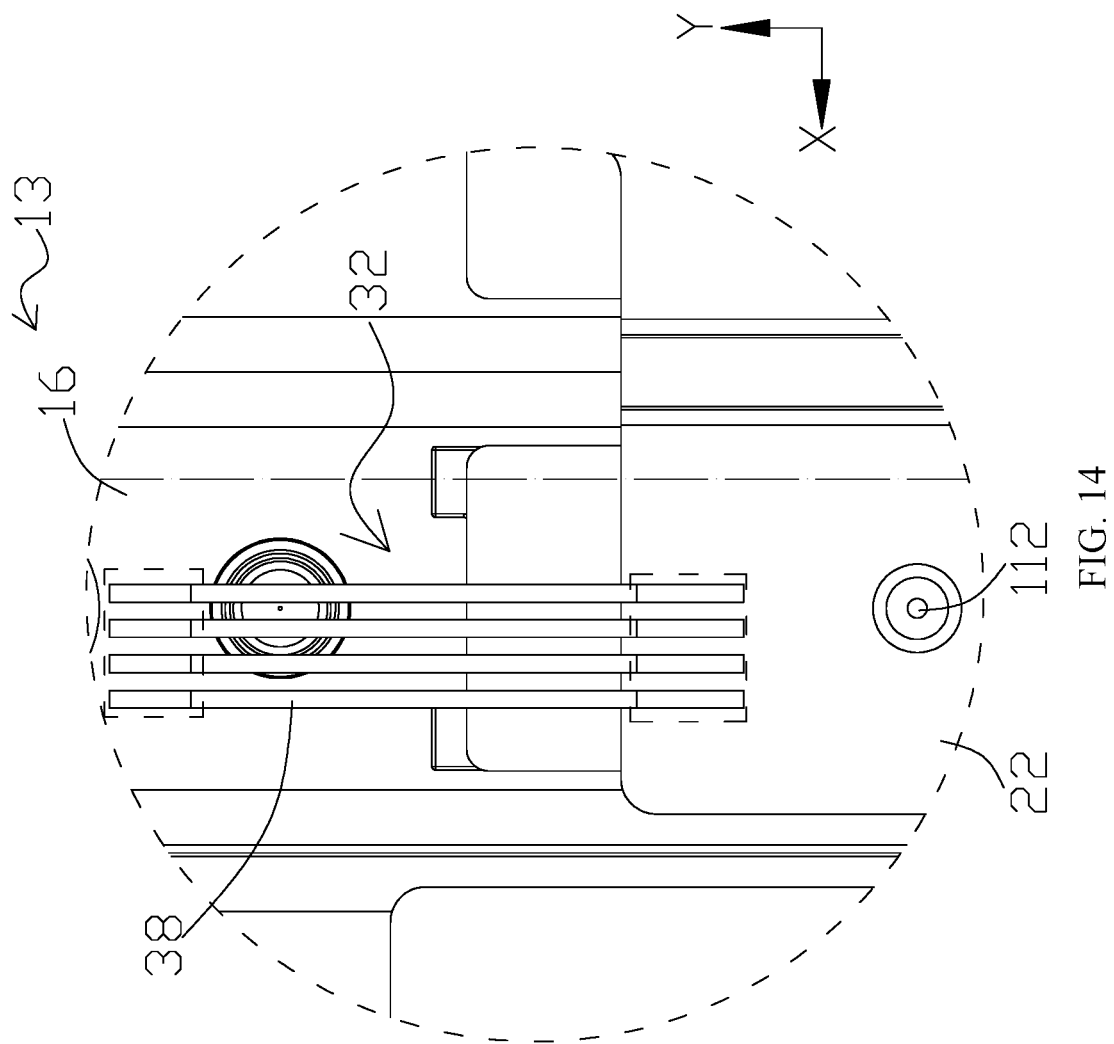
FIG. 14 is a local detailed view of part VI of FIG. 12.
Figure 15:
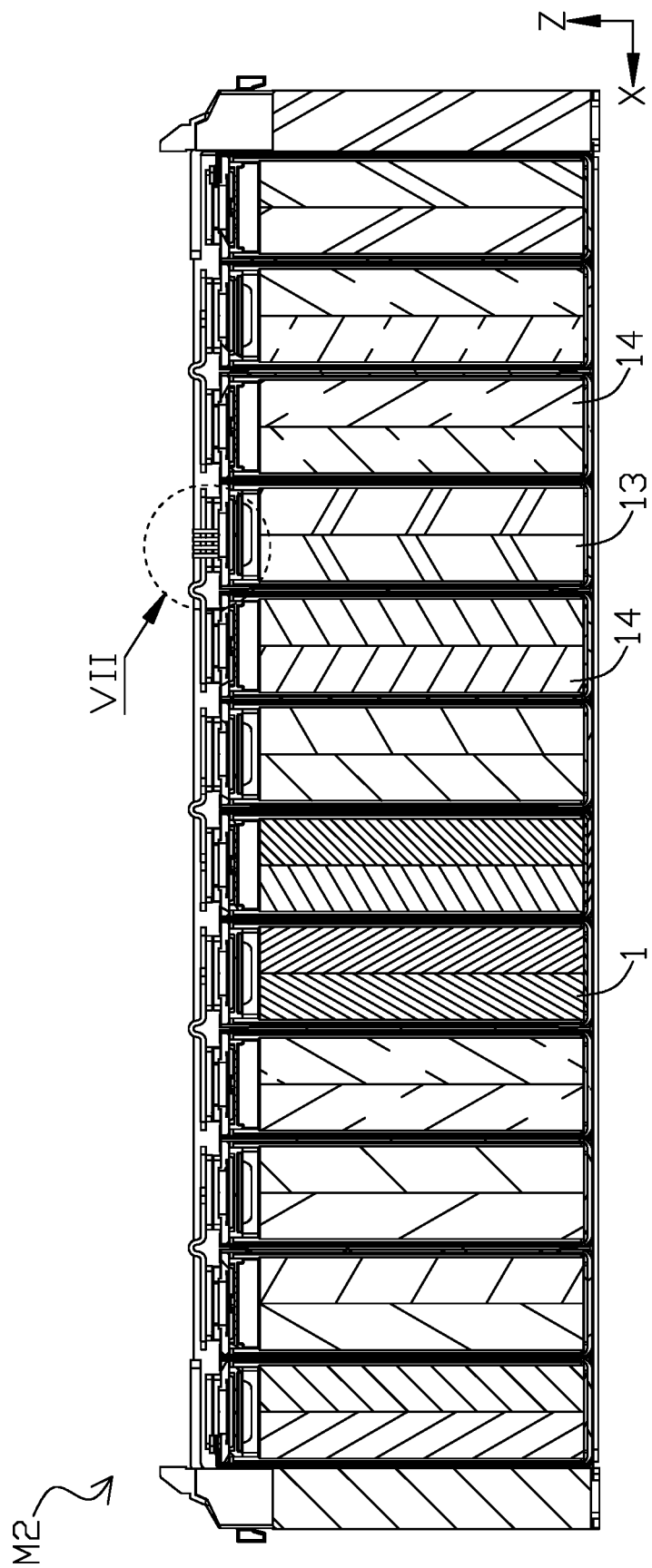
FIG. 15 is a sectional view in a C-C direction of FIG. 12.
Figure 16:
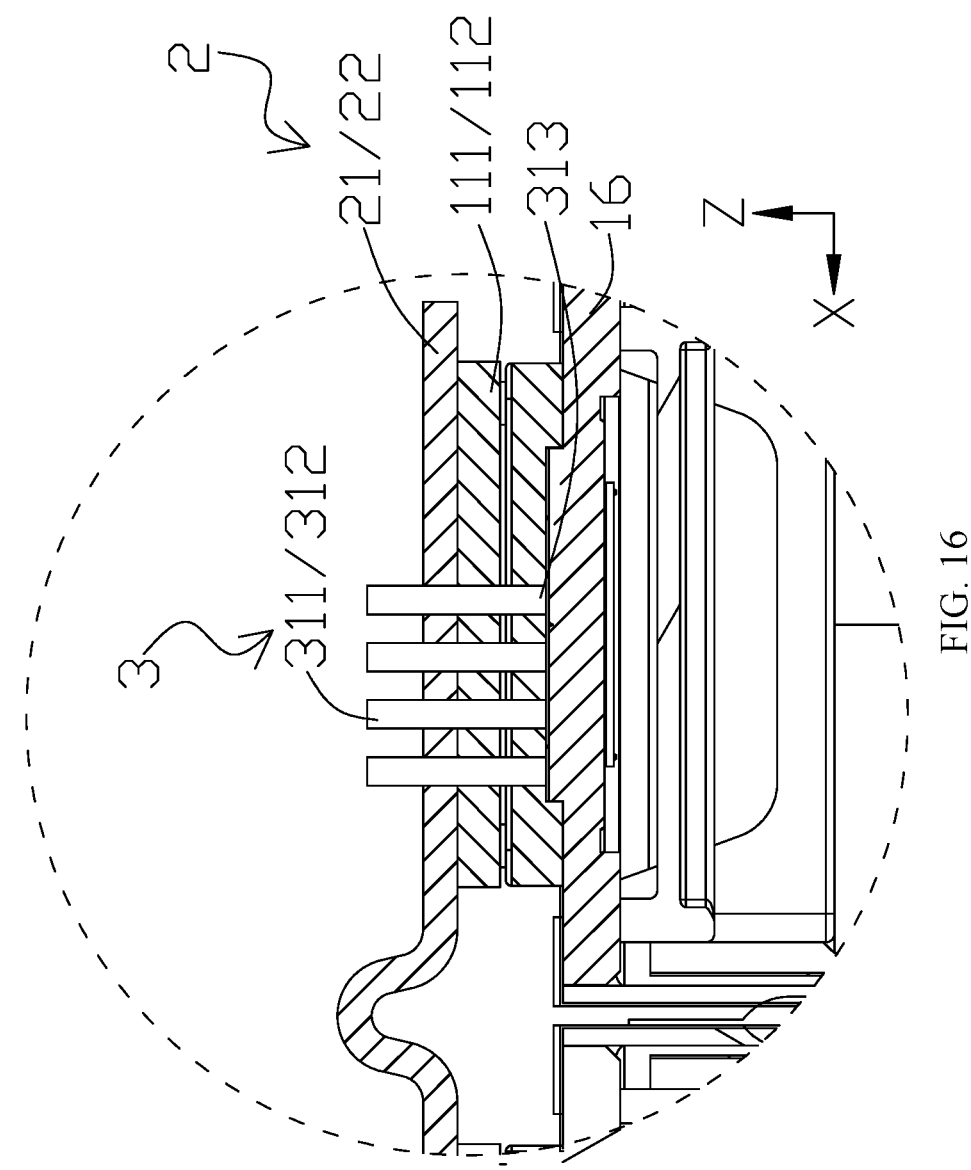
FIG. 16 is a local detailed view of part VII of FIG. 15.
Figure 17:
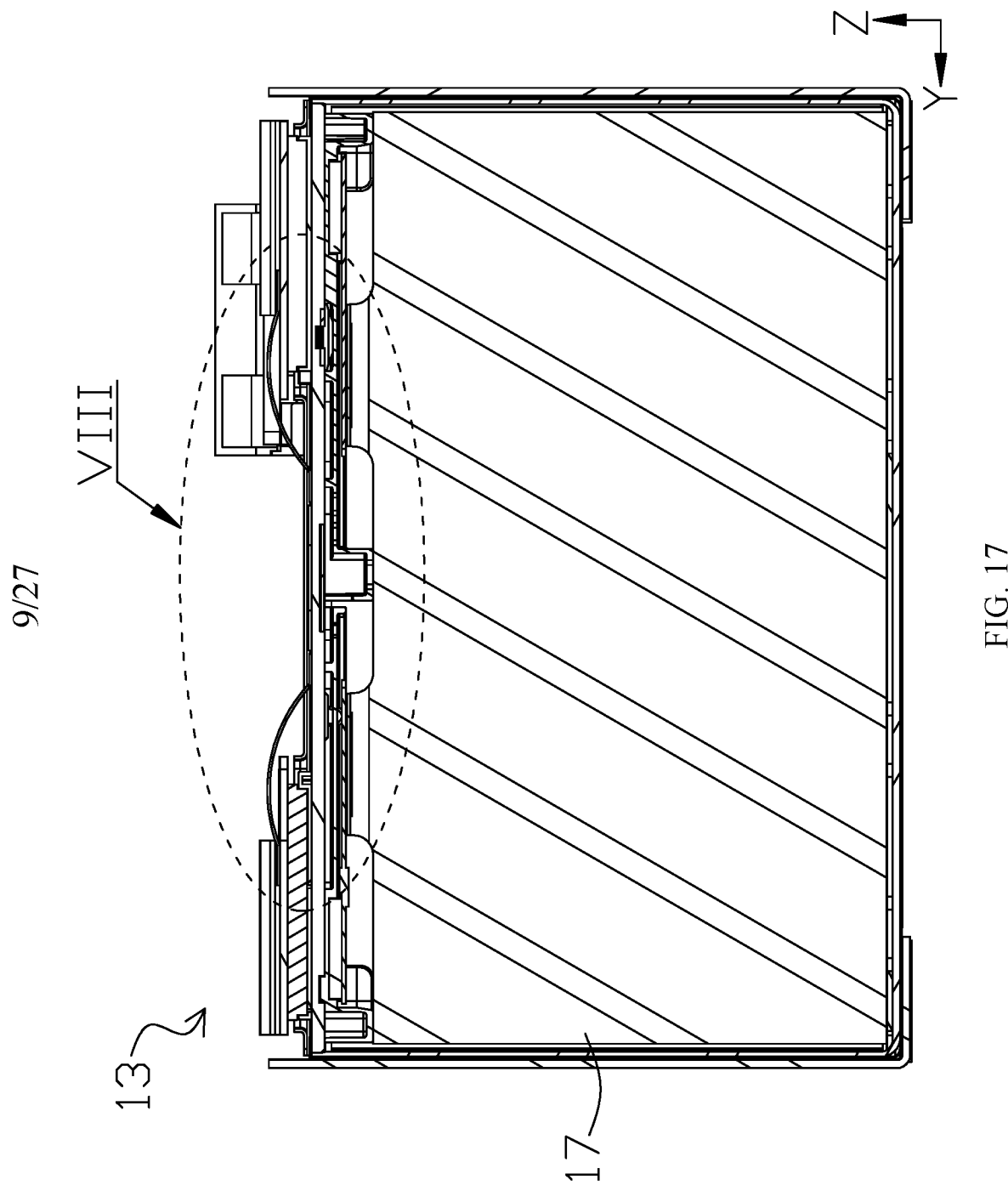
FIG. 17 is a sectional view in a D-D direction of FIG. 12.

Specifically, as shown in FIG. 13, one end of the first conductive part 31 is connected to the top cover 16 of the failed battery unit 13, and the other end is connected to the first connecting plate 21. Specifically, the first conductive part 31 may be connected to the first connecting plate 21 and the top cover 16 by bonding. Similarly, as shown in FIG. 14, one end of the second conductive part 32 is connected to the top cover 16 of the failed battery unit 13, and the other end is connected to the second connecting plate 22. The specific bonding connection means is the same as the foregoing bonding connection means applied between the conductive part 3 and the first connecting plate 21 and the second connecting plate 22, description of which is omitted here. Certainly, the parts may also be connected by other means such as welding and clamping.

Figure 18:
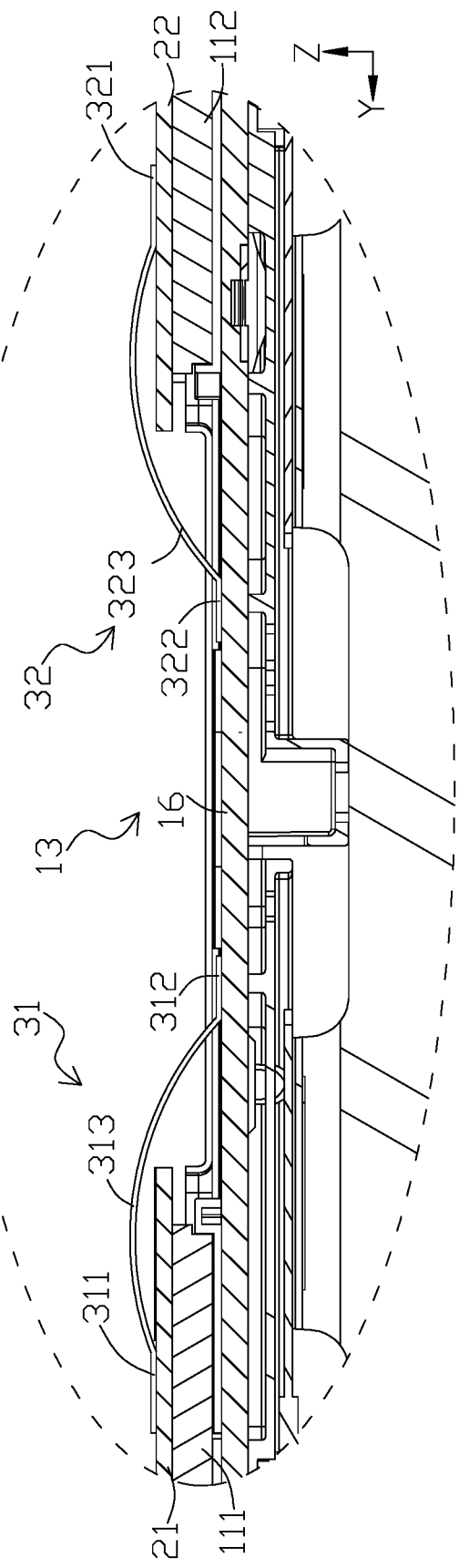
FIG. 18 is a local detailed view of part VIII of FIG. 17.

In a specific embodiment, as shown in FIG. 18, the first conductive part 31 may include a first connecting section 311, a second connecting section 312, and a first transition section 313. The first transition section 313 is connected to the first connecting section 311 and the second connecting section 312, the first connecting section 311 is connected to the first connecting plate 21, and the second connecting section 312 is connected to the top cover 16 of the failed battery unit 13. The second conductive part 32 includes a third connecting section 321, a fourth connecting section 322, and a second transition section 323. The second transition section 323 is connected to the third connecting section 321 and the fourth connecting section 322. The third connecting section 321 is connected to the second connecting plate 22, and the fourth connecting section 322 is connected to the top cover 16 of the failed battery unit 13.

The first electrode terminal 111 and the second electrode terminal 112 have a different height compared with the top cover 16. That is, the first electrode terminal 111 and the second electrode terminal 112 are higher than the top cover 16. The first connecting section 311 and the second connecting section 312 differ in height, and the third connecting section 321 and the fourth connecting section 322 differ in height. Therefore, the first transition section 313 is disposed obliquely along the height direction Z, and the second transition section 323 is disposed obliquely along the height direction Z. In addition, the first transition section 313 and the second transition section 323 are arc structures. Therefore, the first transition section 313 and the second transition section 323 can be deformed under an external force, so as to buffer the impact received by the first conductive part 31 and the second conductive part 32 and increase the service life of the battery module.

Specifically, along the height direction Z, the first conductive part 31 and the second conductive part 32 are located below the upper cover of the battery module. In addition, the first conductive part 31 and the second conductive part 32 are at a preset distance from the upper cover of the battery module to prevent the first conductive part 31 and the second conductive part 32 from interfering with the upper cover and reduce the height of the battery module, thereby increasing an energy density of the battery module.

In another specific embodiment, the first conductive part 31 and the second conductive part 32 may also be plate structures, and both are flexible structures. In this way, the first conductive part 31 facilitates connecting of the first electrode terminal 111 and the top cover 16 that differ in height, and the second conductive part 32 facilitates connecting of the second electrode terminal 112 and the top cover 16 that differ in height. In addition, when the two conductive parts are flexible structures, it is convenient to connect the first conductive part 31 to the first connecting plate 21 and the top cover 16, and it is convenient to connect the second conductive part 32 to the second connecting plate 22 and the top cover 16.

In this embodiment, the size of the first conductive part 31 and the second conductive part 32 of the plate structure along the height direction is small so as to prevent the first conductive part 31 and the second conductive part 32 from interfering with the upper cover of the battery module and effectively reduce the height of the battery module.

Figure 19:
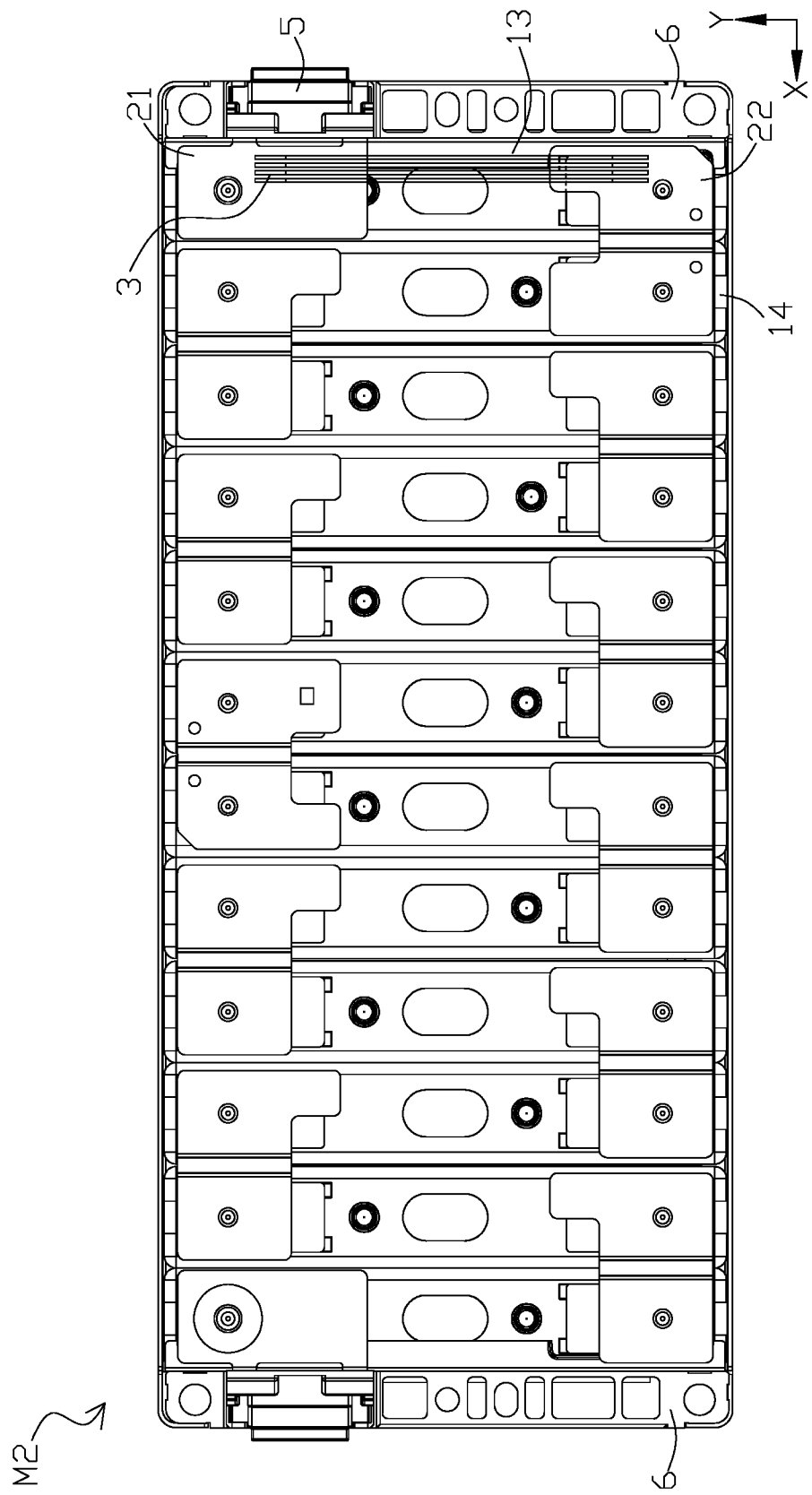
FIG. 19 is a top view of a battery module in FIG. 2 according to a fifth specific embodiment.

In a possible design, as shown in FIG. 19, the battery module M2 further includes a connector 5. The connector 5 is configured to output electric energy of the battery module M2. The connector 5 may be installed on an end plate of the battery module M2. The connector 5 is connected to the connecting plate 2 adjacent to the connector 5. When the failed battery unit 13 is located at an end of the battery module M2 along the length direction X, that is, when the failed battery unit 13 is adjacent to the end plate 6 of the battery module M2, the connecting plate 2 connected to the failed battery unit 13 is further connected to the connector 5, and the first electrode terminal 111 and the second electrode terminal 112 of the failed battery unit 13 are connected by the conductive part 3. In this way, the failed battery unit 13 serves only a conductive function. In addition, under a conductive effect of the failed battery unit 13, electrical energy of the non-failed battery unit 14 adjacent to the failed battery unit 13 can be transmitted to the connector 5, thereby enabling the battery module M2 to resume working and output electrical energy normally.

Figure 20:
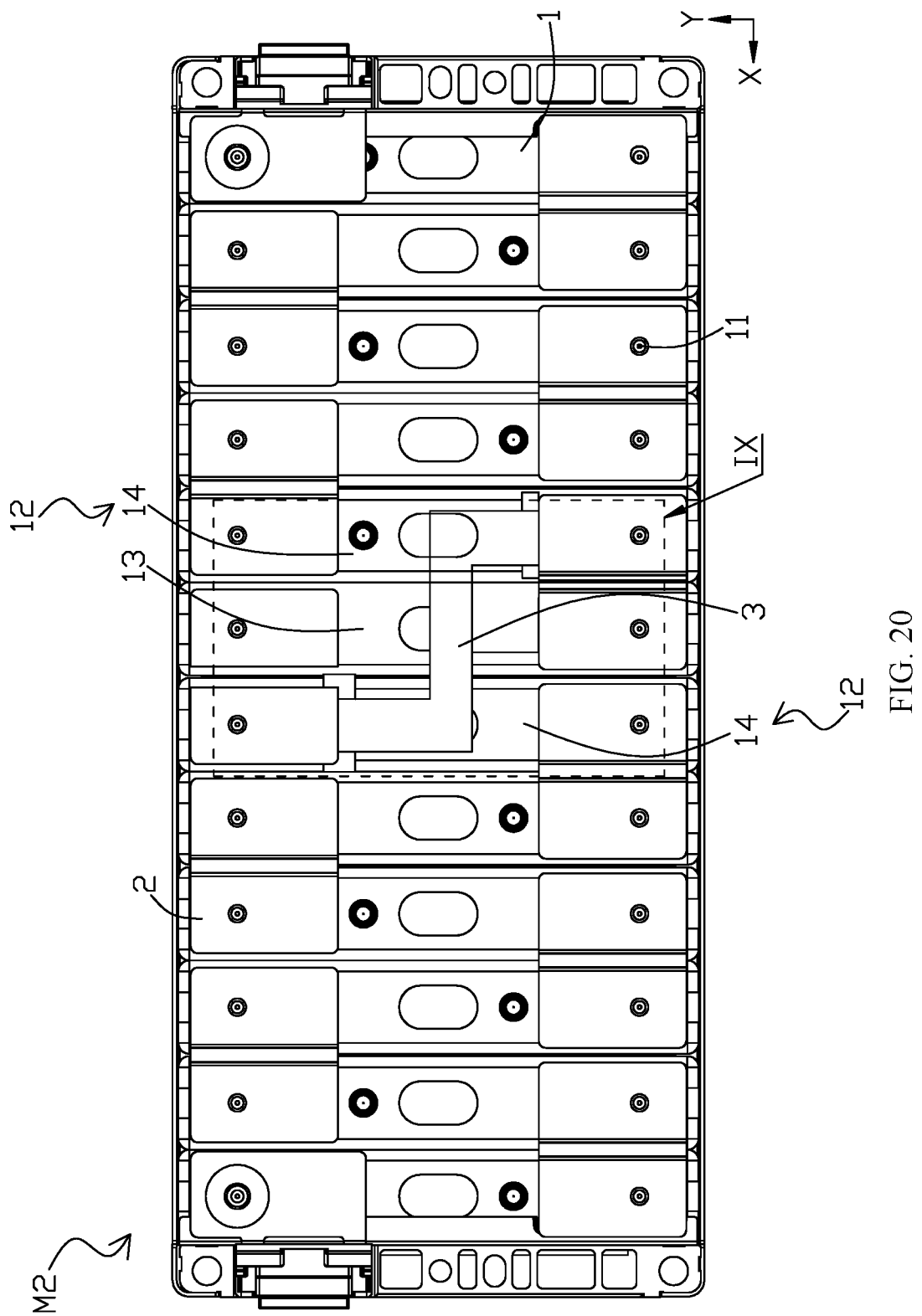
FIG. 20 is a top view of a battery module in FIG. 2 according to a sixth specific embodiment.

In another possible design, as shown in FIG. 20, two non-failed battery units 14 that are upstream and downstream of the failed battery unit 13 respectively exist in the battery module M2. The upstream and downstream of the failed battery unit 13 mean that: the two non-failed battery units 14 are located upstream and downstream of the failed battery unit 13 along a current flow direction of the battery module M2, and the two non-failed battery units 14 may be adjacent to the failed battery unit 13 or not (that is, separated by at least one battery unit 1). The two non-failed battery units 14 located upstream and downstream of the failed battery unit 13 respectively are defined as target battery units 12.

In this embodiment, the conductive part 3 is serially-connected to two target battery units 12 (the two non-failed battery units 14). The target battery units 12 are non-failed battery units 14, and each failed battery unit 13 is located between the two target battery units 12.

Figure 21:
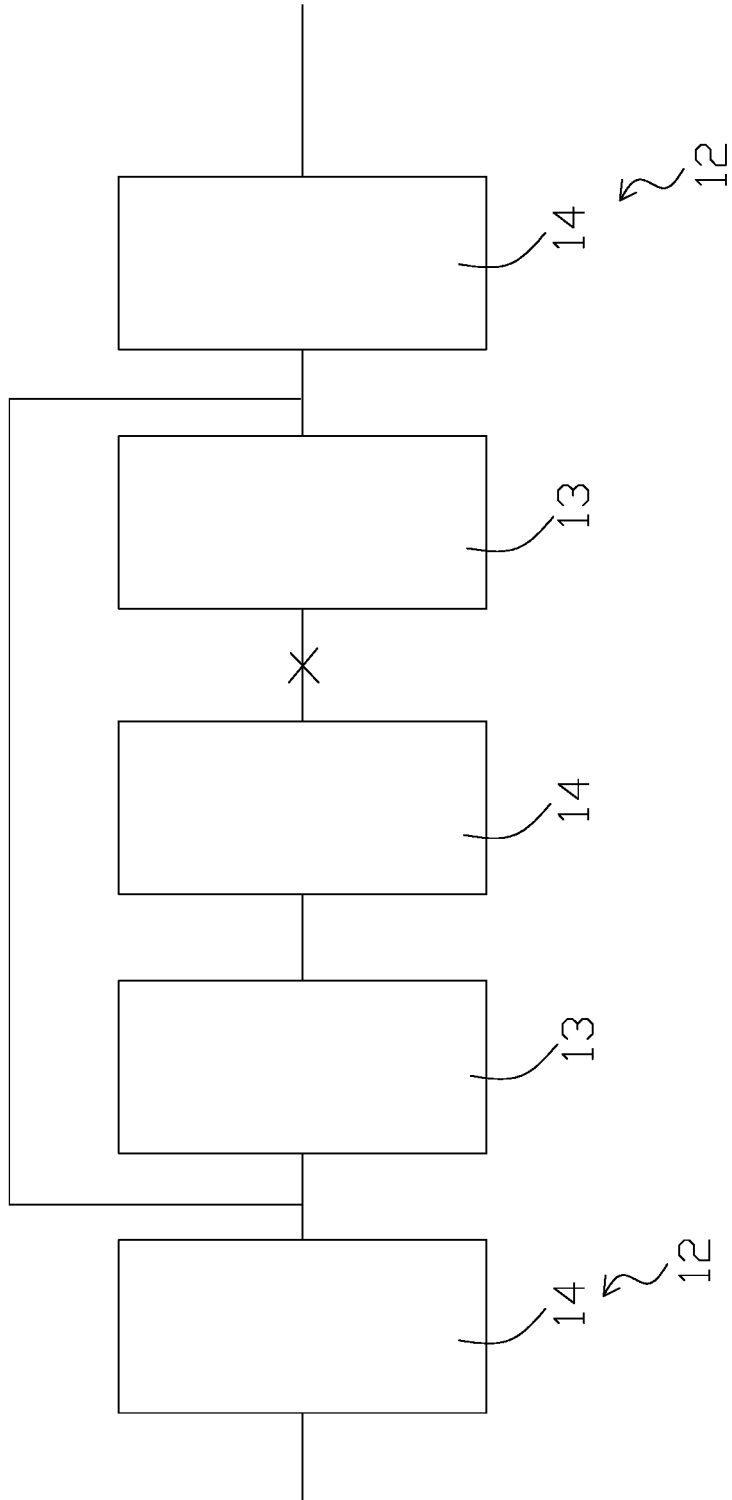
FIG. 21 is a schematic diagram of a part of circuits of a battery module.

In this embodiment, as shown in FIG. 20 and FIG. 21, when one or more failed battery units 13 exist in the battery module M2 (the failed battery units 13 may be adjacent to each other or not, that is, a non-failed battery unit 14 may exist between the adjacent failed battery units 13), the target battery units 12 (the target battery units 12 are non-failed battery units 14) are electrically connected by the conductive part 3, thereby parallel-connecting each failed battery unit 13 to the conductive part 3. Because a resistance of the conductive part 3 is lower than a resistance of each battery unit 1 (including the failed battery unit 13, and possibly including a few non-failed battery units 14) located between the two target battery units 12, a current that passes through the conductive part 3 is larger than a current that passes through each failed battery unit 13. In this way, the circuit of the battery module M2 is reconnected. In the circuit, the current flowing through each failed battery unit 13 is small, and an impact thereby caused onto the circuit of the battery module M2 is small.

Therefore, when one or more battery units 1 fail in a working process of the battery module M2, the failure can be solved by connecting the two target battery units 12 through the conductive part 3, without a need to repair or replace the entire battery module M2. When the battery module M2 is applied to a vehicle, the vehicle can be directly repaired at a repair service point without returning the entire vehicle to the manufacturer or without replacing with a new battery pack, thereby improving work efficiency of the battery module M2, simplifying a maintenance process, and reducing maintenance cost. In addition, after the above operations are performed, the current passing through the failed battery unit 13 is small, so that the battery module M2 can work normally without causing a significant decrease in the battery capacity of the battery module M2.

In addition, in a structure in which the battery unit 1 is bonded to an accommodation cavity of a container through a binder, when a battery unit 1 fails, it is not easy to perform an operation of removing the failed battery unit from the accommodation cavity. Therefore, the handling method in this embodiment in which the target battery units 12 are electrically connected through the conductive part 3 has advantages of convenient operation and high efficiency.

In a case that the conductive part 3 is electrically connected to at least one non-failed battery unit 14 by serial-connecting two non-failed battery units 14, two ends of the conductive part 3 are connected to two opposite-polarity electrode terminals 11 of the two non-failed battery units 14 respectively, thereby achieving the purpose of serial-connecting two non-failed battery units 14 through the conductive part 3. The conductive part 3 may be directly connected or indirectly connected to the two opposite-polarity electrode terminals 11.

Specifically, as shown in FIG. 20, to further reduce the impact caused by the failed battery unit 13 onto the charging and discharging circuit of the battery module and reduce safety hazards of the failed battery unit 13 that is electrified, the current passing through the failed battery unit 13 may be minimized, and the current passing through the failed battery unit 13 may be reduced to zero as far as possible. To achieve this purpose, the at least two battery units 1 located between the two target battery units 12 may be electrically disconnected.

Understandably, as shown in FIG. 21, when the battery units 1 at any positions between the two target battery units 12 are electrically disconnected, that is, when an open-circuit point exists in the circuit between the two target battery units 12, the current passing through each failed battery unit 13 is zero. In this case, all the current passes through one of the target battery units 12 and the conductive part 3 and enters the other target battery unit 12, so as to remove all failed battery units 13 from the circuit of the battery module M2 and prevent the failed battery units 13 from affecting the circuit of the battery module. In addition, this can avoid the safety hazards of the staff during maintenance that are caused by electrification of the failed battery units 13.

In addition, in this embodiment, there may be one or more open-circuit points between the two target battery units 12, and the open-circuit points may be located anywhere between the target battery units 12.

Specifically, as shown in FIG. 20, the battery module M2 further includes a connecting plate 2. The connecting plate 2 is configured to serial-connect the electrode terminals 11 of a plurality of battery units 1. The conductive part 3 serial-connects two non-failed battery units 14 through at least one of the connecting plate 2 or the electrode terminals 11. Specifically, the conductive part 3 may be electrically connected to at least one non-failed battery unit 14 by means of: electrically connecting the conductive part 3 to the electrode terminals 11 of the two non-failed battery units 14, and/or, electrically connecting the conductive part 3 to the connecting plates 2 that are connected to the electrode terminals 11 of the non-failed battery units 14.

In this embodiment, the conductive part 3 is configured to connect two target battery units 12. In a specific embodiment, the conductive part 3 may be connected to the connecting plates 2 that are connected to the two target battery units 12, thereby implementing indirect connection to the electrode terminals 11 of the target battery units 12. The conductive part 3 may be connected to the connecting plates 2 by means of welding, bonding, riveting, or the like as long as the electrical connection between the conductive part 3 and the connecting plates 2 is implemented and reliable. In this embodiment, each connecting plate 2 is larger than the electrode terminal 11 in size. Therefore, in connecting the conductive part 3 to the connecting plates 2, due to a relatively large junction area between the parts, processing difficulty is reduced, connection reliability is improved, and a service life of the battery module M2 is increased. In addition, the connecting plates 2 are superimposed on the electrode terminals 11 of the failed battery unit 13. In connecting the conductive part 3 to the connecting plates 2, the two connecting plates 2 do not need to be removed for the sole purpose of exposing the electrode terminals 11 of the failed battery unit 13, thereby reducing processing steps, simplifying a failure handling process, and improving efficiency.

In a possible design, the conductive part 3 may be further electrically connected to the top cover 16 of the failed battery unit 13 while being electrically connected to at least one non-failed battery unit 14. In this embodiment, the conductive part 3 may be electrically connected to the electrode terminals 11 of the two non-failed battery units 14 while being electrically connected to the top cover 16 of the failed battery unit 13. In this case, the failed battery unit 13 does not participate in the charging and discharging process of the battery module, and a charging and discharging circuit of the battery module can be reconnected through the conductive part 3 and the top cover 16 of the failed battery unit 13 to make the battery module resume working.

Compared with a solution in which the conductive part 3 is electrically connected to the electrode terminals 11 of only two non-failed battery units 14, the means of connection in this embodiment increases a conductive area between the conductive part 3 and the non-failed battery units 14, thereby increasing the passage area and improving safety of the battery module and the battery pack. In addition, the means of connection in this embodiment also improves connection reliability between the conductive part 3 and the parts in the battery module, thereby further improving the safety of the battery module and the battery pack.

In a first specific embodiment, the conductive part 3 may be an integrated structure, and the conductive part 3 of the integrated structure is electrically connected to the electrode terminals 11 of the two non-failed battery units 14. In addition, the integrated conductive part 3 is also electrically connected to the top cover 16 of the failed battery unit 13.

In a second specific embodiment (not shown in the drawings), the conductive part may include a third conductive part and a fourth conductive part that are discretely disposed. One end of the third conductive part is electrically connected to electrode terminals of a non-failed battery unit, and the other end is electrically connected to the top cover of the failed battery unit. One end of the fourth conductive part is electrically connected to electrode terminals of the other non-failed battery unit, and the other end is electrically connected to the top cover of the failed battery unit. The third conductive part is electrically connected to the fourth conductive part through the top cover of the failed battery unit.

Further, as shown in FIG. 20, the connecting plate 2 between the two target battery units 12 (the two non-failed battery units 14) is in a disconnected state. Specifically, at least a part of the connecting plates 2 located between the two target battery units 12 are in a disconnected state.

Specifically, the battery module M2 includes connecting plates 2. The connecting plates 2 are connected to the electrode terminals 11 of the battery units 1, so as to electrically connect all the battery units 1. In this embodiment, at least one connecting plate 2 among the connecting plates 2 that connect adjacent battery units 1 located between two target battery units 12 is disconnected, so as to electrically disconnect the adjacent battery units 1 that are connected to the connecting plate 2. In this way, an open-circuit point is formed between the two target battery units 12. When the open-circuit point is formed by disconnecting the connecting plate 2, it is convenient to perform a disconnection operation due to a relatively large area of the connecting plate 2.

Figure 22:
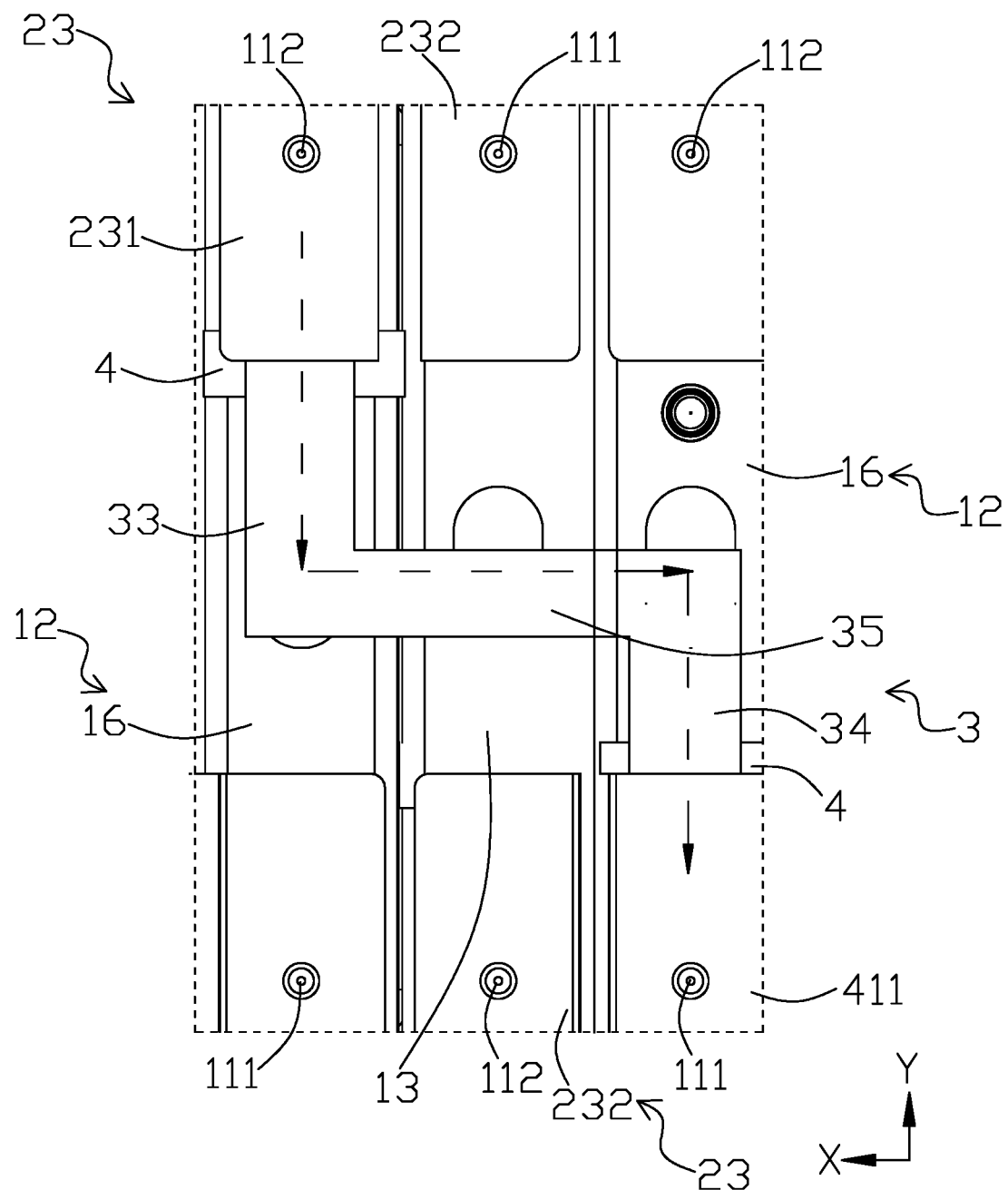
FIG. 22 is a local detailed view of part IX of FIG. 20.
Figure 23:
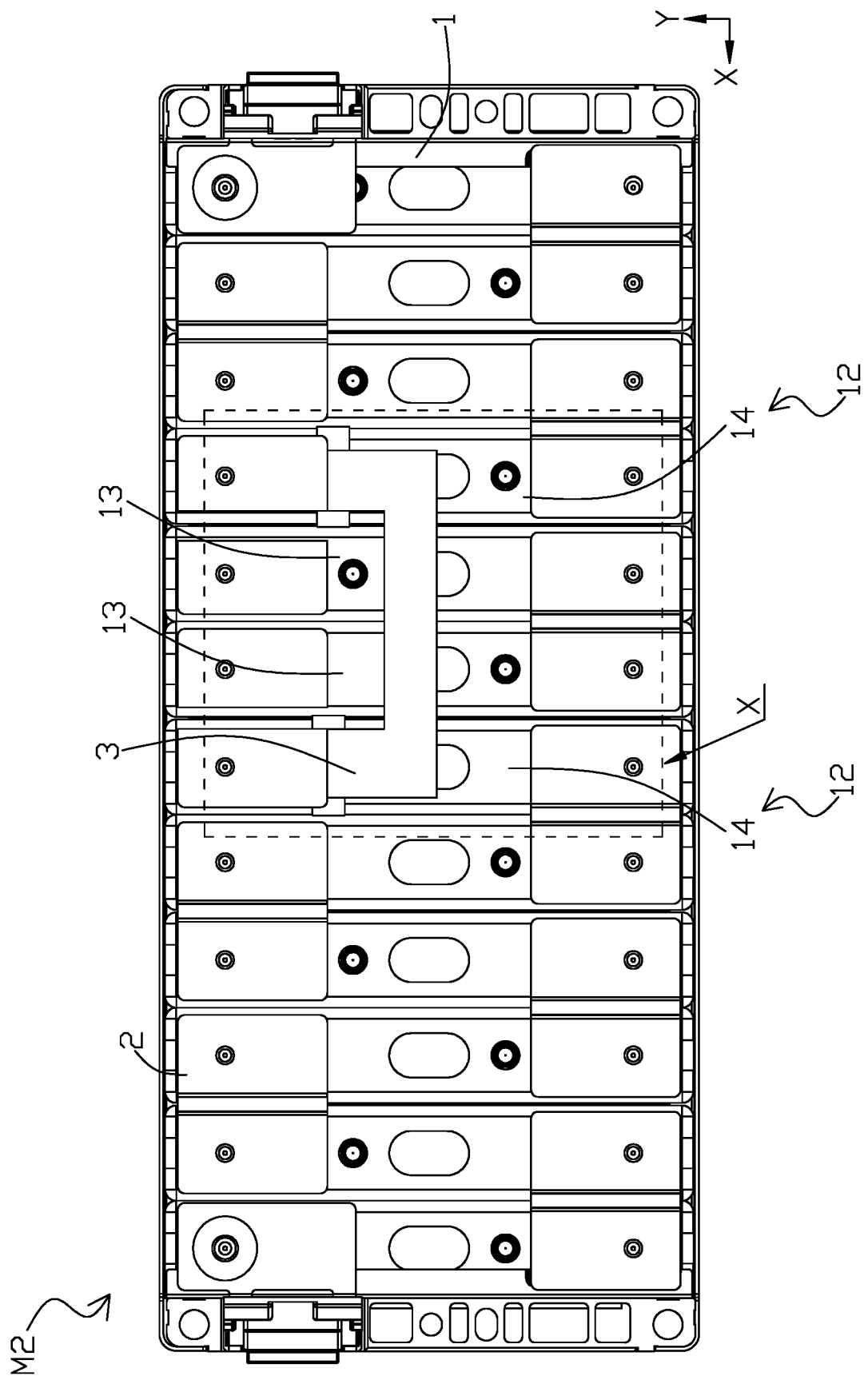
FIG. 23 is a top view of a battery module in FIG. 2 according to a seventh specific embodiment.
Figure 24:
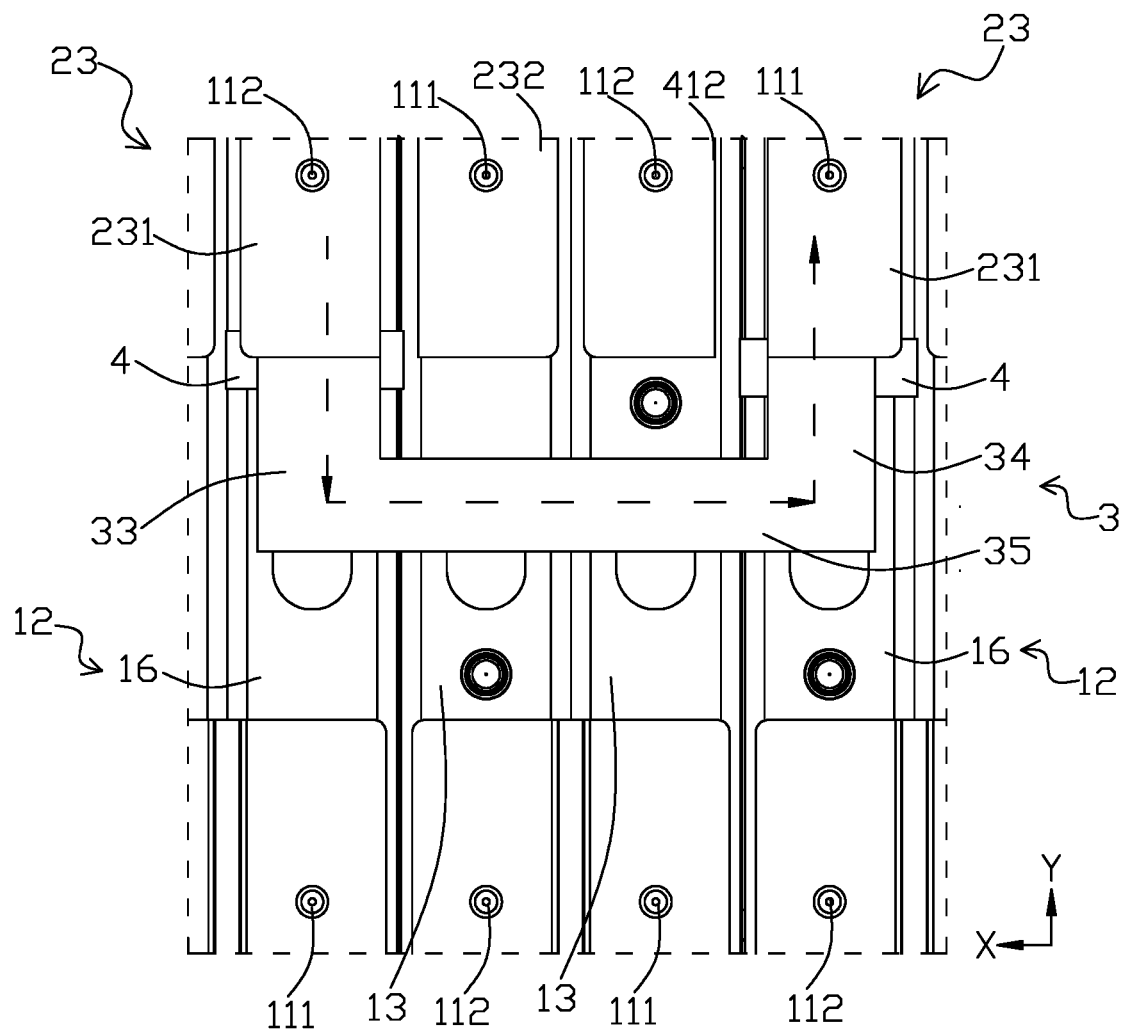
FIG. 24 is a local detailed view of part X of FIG. 23.

In a possible design, as shown in FIG. 22 to FIG. 24, the two target battery units 12 are electrically disconnected from the adjacent failed battery unit 13 along the length direction X. That is, the circuit between the two target battery units 12 has two open-circuit points, and the quantity of the battery units 1 between the two target battery units 12 is relatively small when the target battery units 12 are adjacent to the failed battery unit 13. In this way, the quantity of battery units 1 not involved in the circuit of the battery module M2 is relatively small, and the impact on the circuit of the battery module M2 is relatively small.

In addition, after the two target battery units 12 are electrically disconnected from the adjacent failed battery unit 13, at least two open-circuit points are formed, thereby ensuring an open circuit between the two target battery units 12, preventing the failed battery unit 13 from affecting the charging and discharging circuit of the battery module M2, ensuring a deenergized state of the failed battery unit 13, and improving safety. In addition, the conductive part 3 is connected to the connecting plate 2 that is connected to the target battery units 12, thereby electrically connecting the two target battery units 12. Therefore, the conductive part 3 can achieve the purpose of forming a new circuit by bypassing all failed battery units 13.

In a specific embodiment, as shown in FIG. 22 to FIG. 24, the failed battery units 13 may be adjacent to the target battery units 12. In this case, the connecting plate 2 connected to both the failed battery units 13 and the target battery units 12 is disconnected to form a broken connecting plate 23. Along the length direction X, the broken connecting plate 23 includes a first part 231 and a second part 232 that are disconnected along the length direction X, and the first part 231 is spaced apart from the second part 232 along the length direction X to electrically disconnect the first part 231 from the second part 232. The first part 231 is connected to the electrode terminals 11 of the target battery unit 12, the second part 232 is connected to the electrode terminal 11 of the failed battery unit 13. The conductive part 3 connects the first parts 231 of the two broken connecting plates 23 to electrically connect the adjacent target battery units 12.

For example, in the embodiment shown in FIG. 22, a failed battery unit 13 is included between two target battery units 12. The failed battery unit 13 is adjacent to both target battery units 12, and the failed battery unit 13 is disconnected from both target battery units 12. After the conductive part 3 is connected to the two target battery units 12, the current flows in a direction indicated by an arrow in FIG. 22, that is, from the first target battery unit 12 to the conductive part 3, and then to a next target battery unit 13. The embodiment shown in FIG. 24 is similar, but differs only in the quantity of failed battery units 13 between the two target battery units 12.

In this embodiment, the two broken connecting plates 23 form open-circuit points between the two target battery units 12. In this embodiment, at least two open-circuit points are included. In addition, when connecting the first parts 231 of the two broken connecting plates 23, the conductive part 3 can indirectly connect the electrode terminals 11 of the two target battery units 12. In addition, due to large areas of the first parts 231, the risk of too high temperatures of the parts in a working process of the battery module is reduced, and the safety of the battery module is improved. In addition, with a large junction area between the conductive part 3 and the first part 231, connection reliability is improved.

The two broken connecting plates 23 may be formed by cutting off the connecting plate 2 that connects the target battery units 12 to the failed battery unit 13, or by other means.

In addition, when the conductive part 3 is connected to the first part 231 of the broken connecting plate 23 and the conductive part 3 is a plate structure, the conductive part 3 may be connected to the first part 231 by butt-welding, or the conductive part 3 may be connected to the first part 231 by bonding, riveting or other means as long as a reliable connection is implemented between the two parts.

In another specific embodiment, the connecting plate 2 that connects the failed battery unit 13 and each target battery unit 12 is cut off to form a broken connecting plate 23. The broken connecting plate 23 includes a second part 232. The second part 232 is connected to the electrode terminal 11 of the failed battery unit 13. The first part 231 connected to the electrode terminal 11 of the target battery unit 12 is removed so that the electrode terminal 11 of the target battery unit 12 is exposed. Therefore, the conductive part 3 can be directly connected to the exposed electrode terminals 11 of the two target battery units 12.

In this embodiment, the first part 231 of the connecting plate 2 connected to the target battery units 12 is removed to facilitate the direct connection between the conductive part 3 and the electrode terminals 11 of the target battery units 12. After the conductive part 3 is connected to the electrode terminals 11, a passage area between the conductive part 3 and the electrode terminals 11 of the target battery units 12 is relatively large, thereby reducing over temperature risks of the battery module during working. In addition, the direct connection between the conductive part 3 and the electrode terminals 11 of the target battery units 12 can also improve connection reliability and reduce risks of disconnection between the conductive part 3 and the electrode terminals 11 when the battery module vibrates. In addition, after the first part 231 is removed, a weight of the battery module can be reduced.

Each battery cell generates heat while the battery module is working. If the battery module adopts a non-metal upper cover, the non-metal upper cover is at risk of being penetrated by melting due to a too high temperature, thereby leading to a high fire risk of the battery module. In order to reduce the fire risk, the battery module may adopt a metal upper cover. Therefore, when the distance between the conductive part 3 and the upper cover is small, the conductive part 3 is at risk of contacting the upper cover. The contacting electrifies the upper cover of the battery module, and poses a risk of electric shock to staff who are maintaining the battery module. In this embodiment, after the first part is removed, an installation space for the conductive part 3 is available. After the electrode terminals 11 of the target battery units 12 are connected to the conductive part 3, a height of the target battery units 12 will not increase significantly, thereby reducing risks of interference between the conductive part 3 in the battery module and other parts (such as the upper cover of the battery module), and reducing safety hazards of the battery module.

In another specific embodiment, both connecting plates 2 that connect the failed battery unit 13 to the target battery units 12 are removed to expose the electrode terminals 11 of the failed battery unit 13 and expose the electrode terminals 11 of the target battery units 12. In this way, the conductive part 3 can be directly connected to the electrode terminals 11 of both target battery units 12.

In this embodiment, by removing all connecting plates 2 connected to the target battery units 12 and the failed battery unit 13, the weight of the battery module can be further reduced, and the removal of the connecting plate 2 connected to the failed battery unit 13 does not affect the circuit of the battery module. In a specific embodiment, the connecting plates 2 connected to all battery units 1 located between the target battery units 12 may be removed, so that all the battery units 1 located between the target battery units 12 are electrically disconnected from each other, thereby improving the safety of the circuit and further reducing the weight of the battery module.

In addition, in connecting the conductive part 3 to the electrode terminals 11 of the target battery units 12, the conductive part 3 may be superimposed on the electrode terminals 11, and then the conductive part 3 is welded to the electrode terminals 11 through laser welding. Certainly, the conductive part 3 may also be connected to the electrode terminals 11 of the target battery units 12 by bonding, riveting or other means as long as a reliable connection is implemented.

Figure 25:
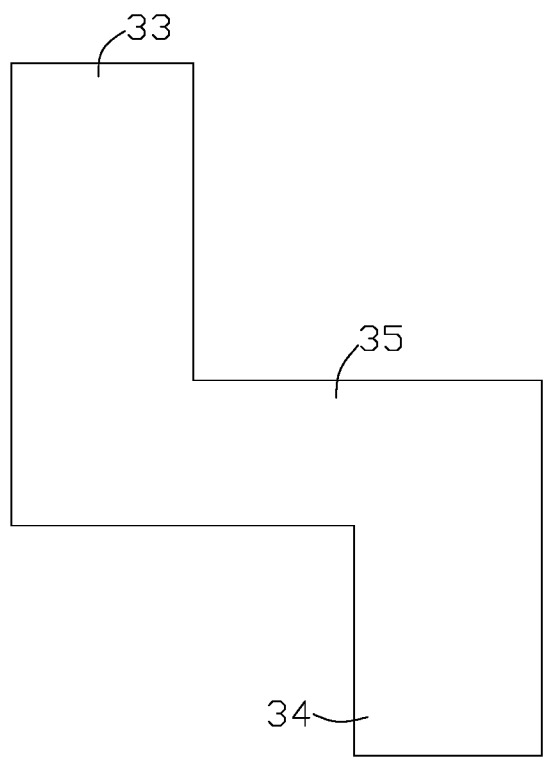
FIG. 25 is a schematic structural diagram of a conductive part in FIG. 22 according to a specific embodiment.
Figure 26:
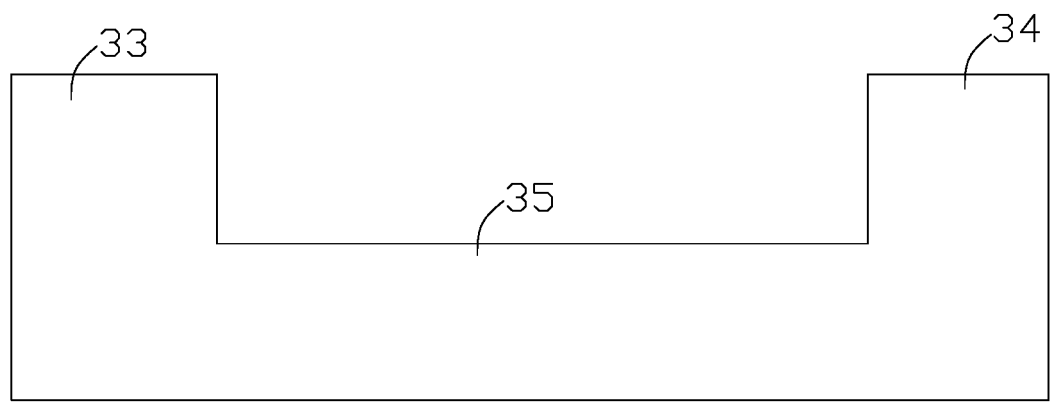
FIG. 26 is a schematic structural diagram of a conductive part in FIG. 24 according to another specific embodiment.
Figure 27:
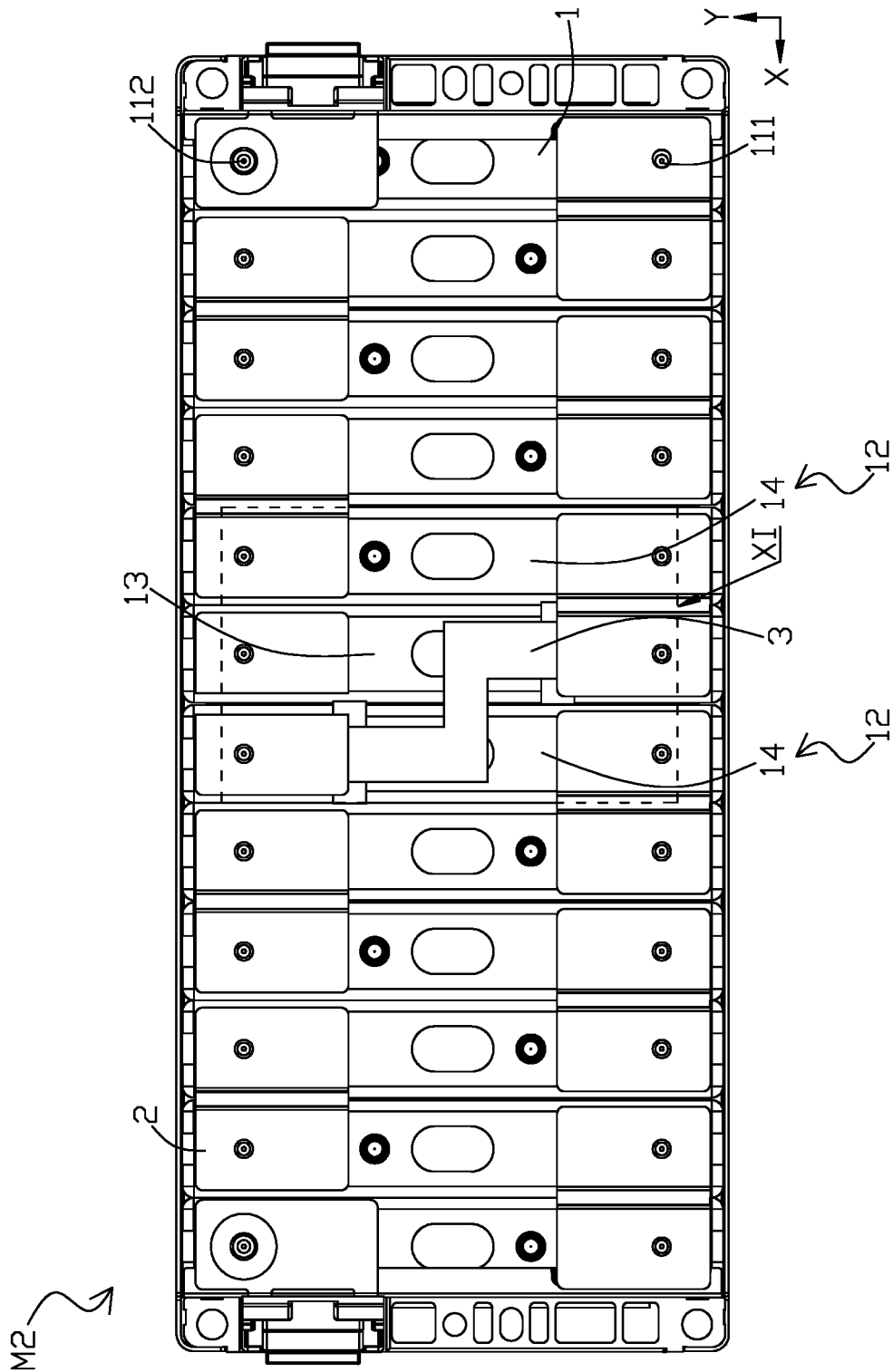
FIG. 27 is a top view of a battery module in FIG. 2 according to an eighth specific embodiment.

In a specific embodiment, as shown in FIG. 25 and FIG. 26, the conductive part 3 includes a first connecting part 33, a second connecting part 34, and a body part 35. The body part 35 is connected to the first connecting part 33 and the second connecting part 34. As shown in FIG. 22 to FIG. 26, the first connecting part 33 and the second connecting part 34 are respectively connected to the electrode terminals 11 of the target battery units 12. The connection here includes direct connection and indirect connection. That is, the first connection part 33 and the second connection part 34 may be directly connected to the electrode terminals 11 of the two target battery units 12 respectively, or may be indirectly connected through other parts (such as the first part 231 of the broken connecting plate 23), as long as the electrode terminals 11 of the two target battery units 12 are electrically connected.

Specifically, the conductive part 3 may be a plate-like structure, and may include a first connecting part 33, a second connecting part 34, and a body part 35 of the plate-like structure. The size of the plate-like conductive part 3 in the height direction Z is relatively small, so as to reduce risks of interference between the conductive part 3 and the upper cover of the battery module and improve the safety of the battery module.

In a specific embodiment, as shown in FIG. 22, in a case that there are an odd number of battery units 1 between the two target battery units 12, the first connecting part 33 and the second connecting part 34 are located on two sides of the body part 35 respectively along the width direction Y, and the first connecting part 33 and the second connecting part 34 are spaced apart from each other along the length direction X.

Specifically, in a case that only the failed battery units 13 rather than the non-failed battery units 14 exist between the two battery units 1, when there are an odd number of failed battery units 13, as shown in FIG. 22, the conductive part 3 bypasses the odd number of battery units 1. In addition, to implement circuit connection, the first connecting part 33 and the second connecting part 34 of the conductive part 3 needs to be (directly or indirectly) connected to the opposite-polarity electrode terminals 11. Accordingly, in this embodiment, the first connecting part 33 and the second connecting part 34 are located on two sides of the body part 35 respectively. In the embodiment shown in FIG. 25, the conductive part 3 may be a Z-shaped structure, the body part 35 extends along the length direction X, and the first connecting part 33 and the second connecting part 34 extend along the width direction Y, with the two extension directions being opposite. In addition, the size of the body part 35 along the length direction X depends on the quantity of the battery units 1 between the two target battery units 12. The larger the quantity of battery units 1 between the two target battery units 12 (the more the battery units 1 bypassed by the conductive part 3), the greater the length of the body part 35.

In another specific embodiment, in a case that there are an even number of battery units 1 between two target battery units 12, as shown in FIG. 24, the first connecting part 33 and the second connecting part 34 are located on the same side of the body part 35 along the width direction Y, and the first connecting part 33 and the second connecting part 34 are spaced apart from each other along the length direction X.

Specifically, in a case that only the failed battery units 13 rather than the non-failed battery units 14 exist between the two battery units 12, when there are an even number of failed battery units 13, as shown in FIG. 24, the conductive part 3 bypasses the even number of battery units 1. In addition, to implement circuit connection, the first connecting part 33 and the second connecting part 34 of the conductive part 3 needs to be (directly or indirectly) connected to the opposite-polarity electrode terminals 11. Accordingly, in this embodiment, the first connecting part 33 and the second connecting part 34 are located on the same side of the body part 35 respectively along the width direction Y. In the embodiment shown in FIG. 26, the conductive part 3 may be a U-shaped structure, the body part 35 extends along the length direction X, and the first connecting part 33 and the second connecting part 34 extend along the width direction Y, with the two extension directions being the same. In addition, the size of the body part 35 along the length direction X depends on the quantity of the battery units 1 between the two target battery units 12. The larger the quantity of battery units 1 between the two target battery units 12 (the more the battery units 1 bypassed by the conductive part 3), the greater the length of the body part 35.

Therefore, the specific structure of the conductive part 3 may be set according to the quantity of the battery units 1 between the target battery units 12, and this application does not limit the structure or the size of the conductive part 3.

In another possible design, as shown in FIG. 27 to FIG. 34, among the two target battery units 12 along the length direction X, one target battery unit 12 is electrically disconnected from the failed battery unit 13, and an open-circuit point is formed between the target battery unit 12 and the failed battery unit 13. The other target battery unit 12 is connected to the failed battery unit 13. Therefore, in this embodiment, an open-circuit point exists in each battery unit 1 located between the target battery units 12. In addition, the conductive part 3 is connected to the connecting plate 2 connected to the target battery unit 12, and is connected to the connecting plate 2 connected to the failed battery unit 13 adjacent to the other target battery unit 12.

Figure 28:
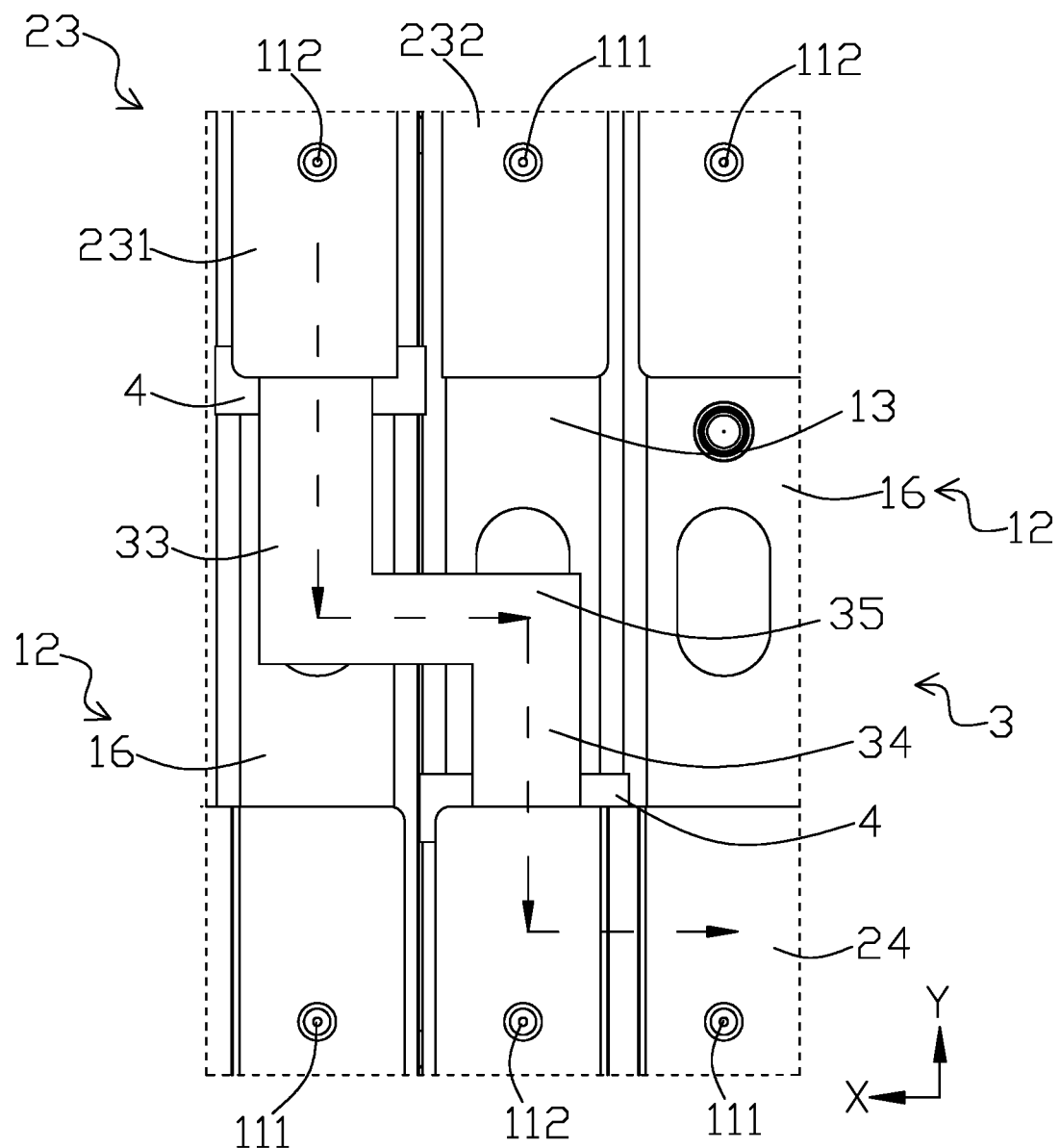
FIG. 28 is a local detailed view of part XI of FIG. 27.
Figure 29:
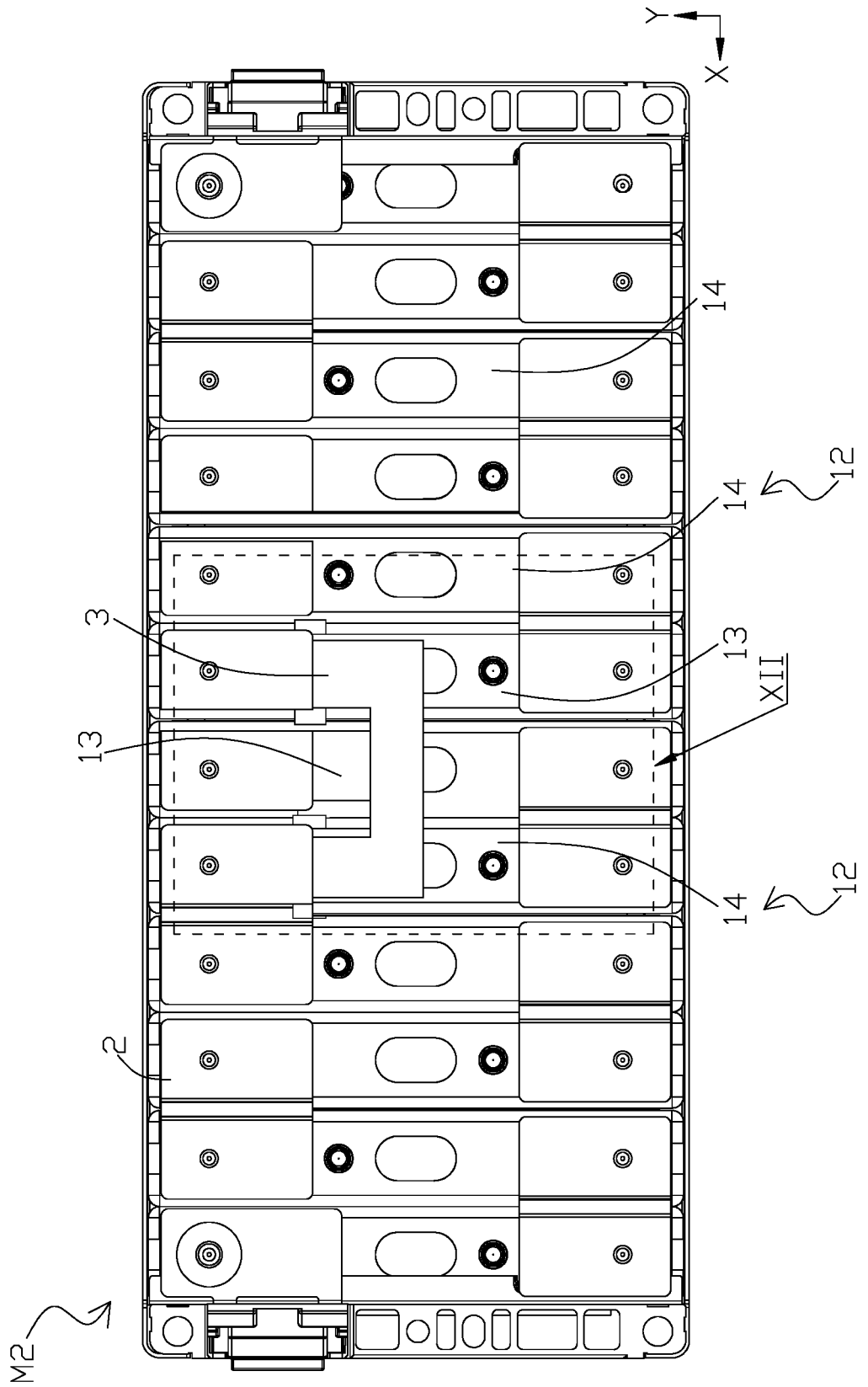
FIG. 29 is a top view of a battery module in FIG. 2 according to a ninth specific embodiment.
Figure 30:
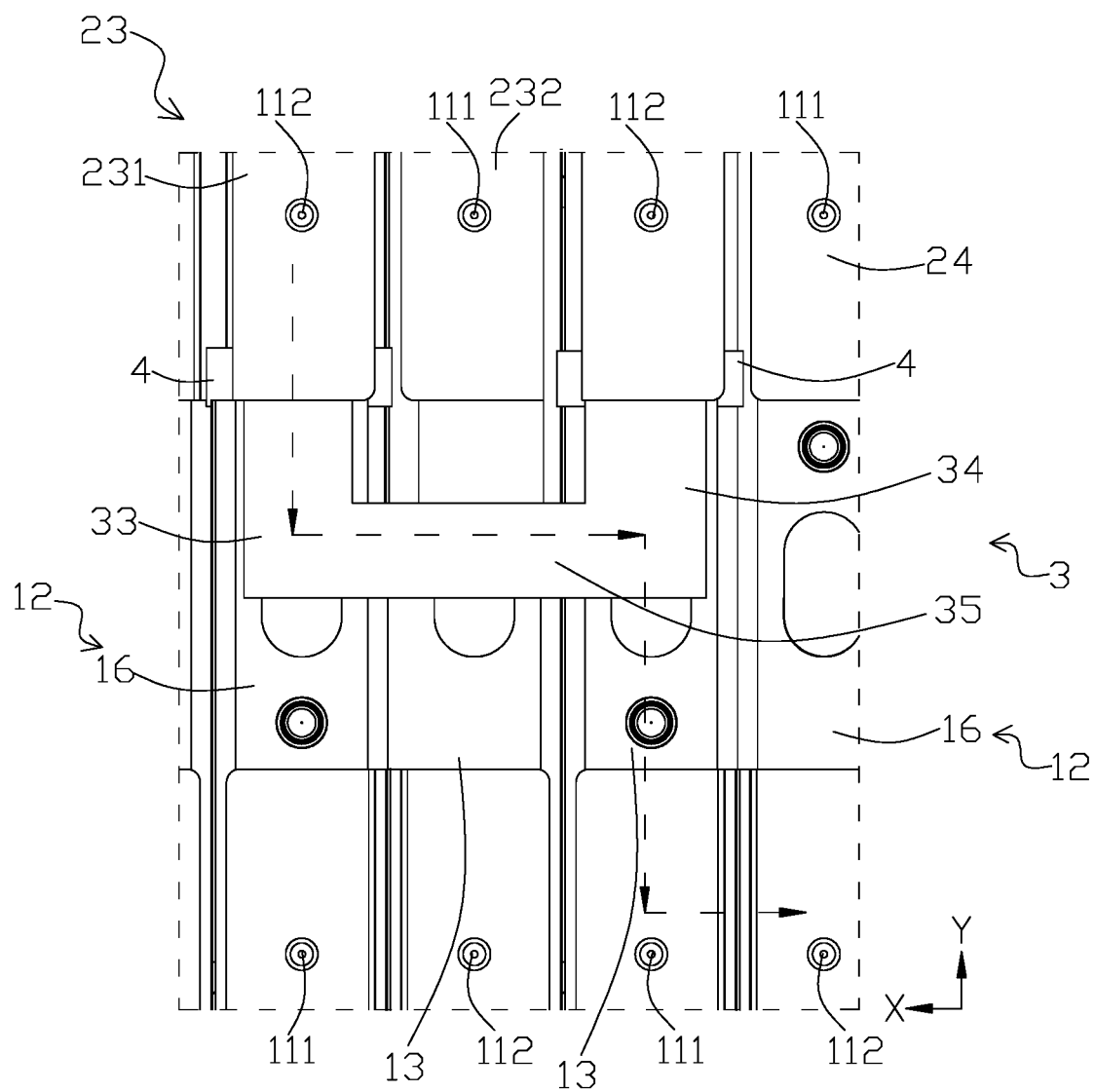
FIG. 30 is a local detailed view of part XII of FIG. 29.

For example, in the embodiment shown in FIG. 28, a failed battery unit 13 is included between two target battery units 12. The failed battery unit 13 is adjacent to both target battery units 12. The failed battery unit 13 is disconnected from one of the two adjacent target battery units 12, and is connected to the other target battery unit 12. The conductive member 3 is connected to the target battery unit 12 disconnected from the failed battery unit 13, and is connected to the failed battery unit 13 adjacent to the other target battery unit 12 (that is connected to the failed battery unit 13). The direction of the current is shown by the arrow in FIG. 28. Specifically, the current flows from the first target battery unit 12 to the conductive part 3, then to the failed battery unit 13, and finally to the target battery unit 12 connected to the failed battery unit 13. The embodiment shown in FIG. 30 is similar, but differs only in the quantity of failed battery units 13 between the two target battery units 12, description of which is omitted here.

Figure 31:
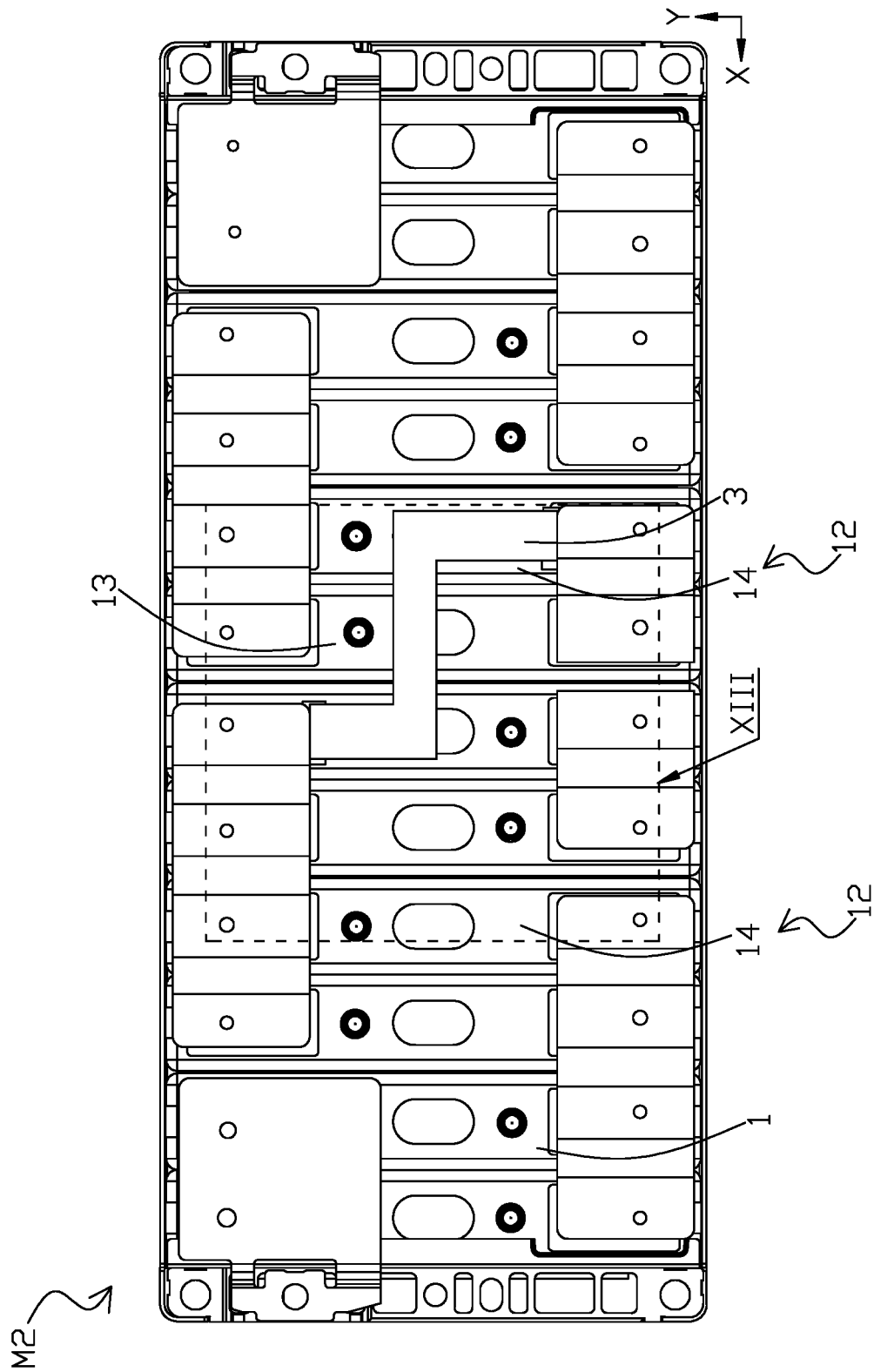
FIG. 31 is a top view of a battery module in FIG. 2 according to a tenth specific embodiment.
Figure 32:
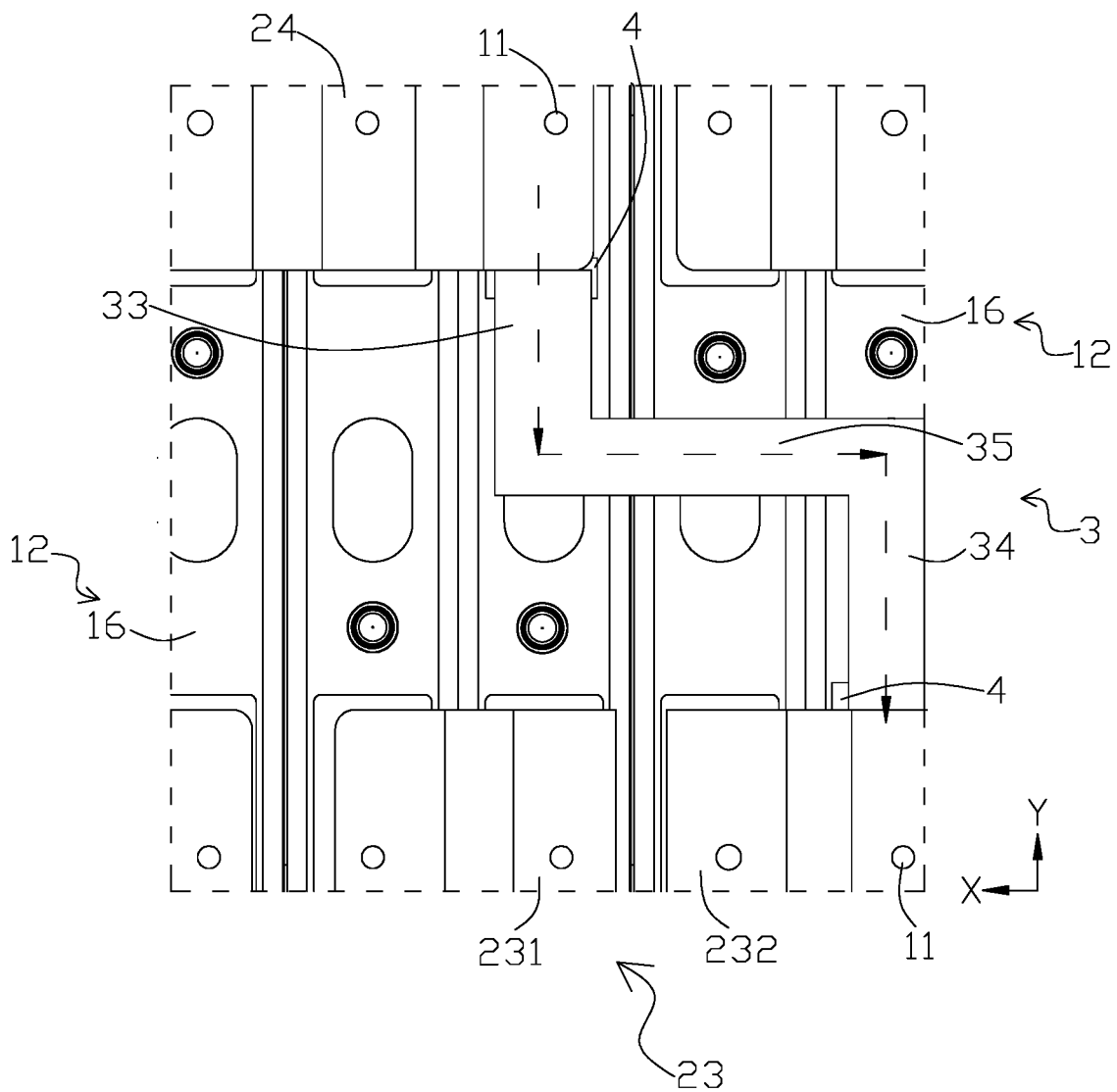
FIG. 32 is a local detailed view of part XIII of FIG. 31.
Figure 33:
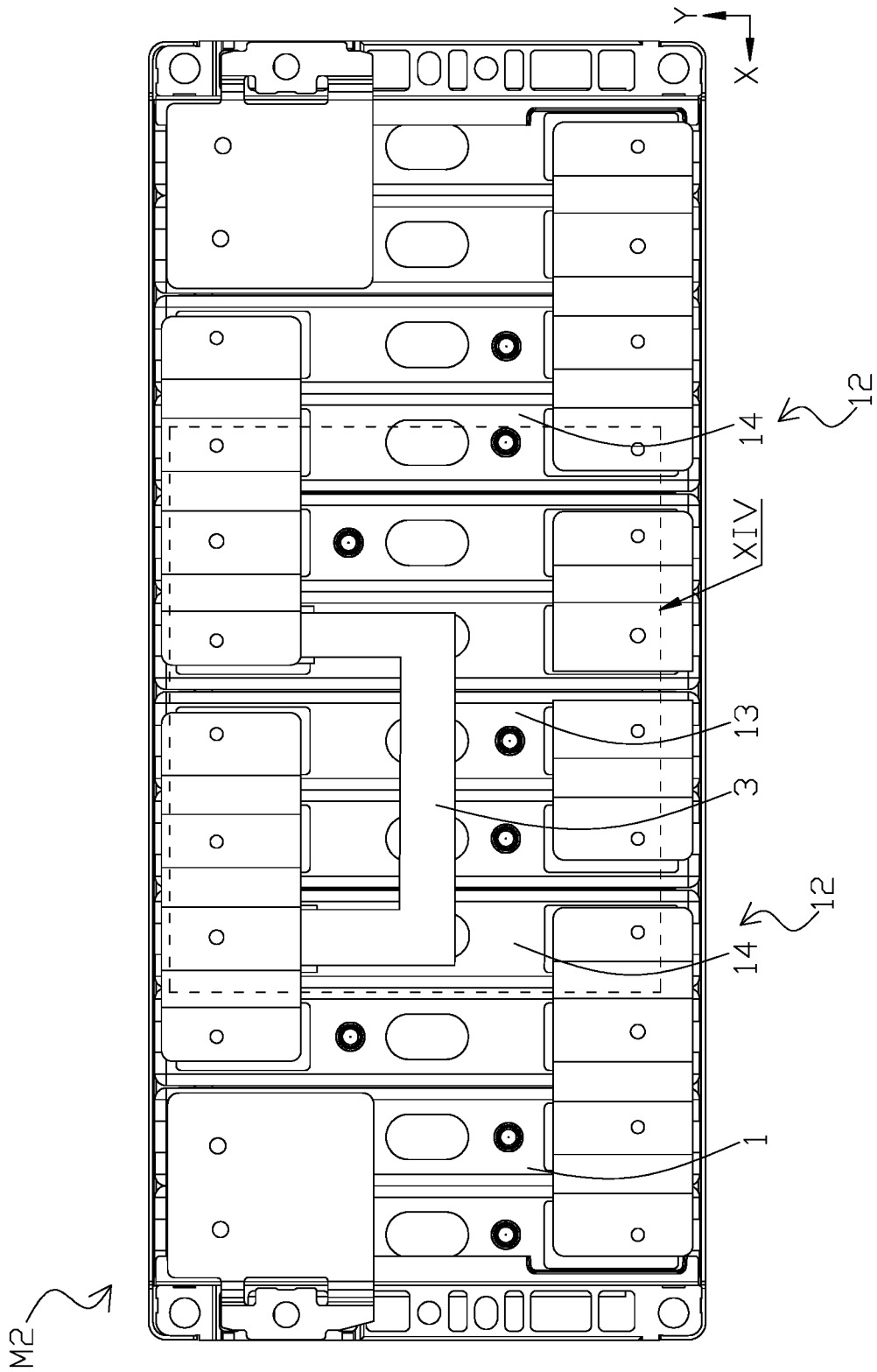
FIG. 33 is a top view of a battery module in FIG. 2 according to an eleventh specific embodiment.

In the embodiments shown in FIG. 31 and FIG. 32, the failed battery unit 13 is a parallel assembly that includes at least one failed battery cell. As shown in FIG. 32, the parallel assembly includes two parallel-connected battery cells. At least one of the two battery cells fails, and two failed battery units 13 are included between the target battery units 12. The current direction is shown by the arrow in FIG. 32. Specifically, the current flows from one target battery unit 12 to the conductive part 3, and then to the failed battery unit 13 adjacent to the other target battery unit 12. The embodiment shown in FIG. 34 is similar, but differs only in the quantity of failed battery units 13 between the two target battery units 12, description of which is omitted here.

In this embodiment, one open-circuit point exists between two target battery units 12. The open-circuit point is formed by electrically disconnecting the target battery units 12 from the adjacent failed battery unit 13. As described above, after flowing through the conductive part 3, the current can also flow through the failed battery unit 13 connected to the target battery units 12, and then flow into the target battery units 12. Specifically, the failed battery unit 13 connected to the target battery units 12 serves a function of conducting the current, thereby reducing the size of the conductive part 3, saving materials and cost, and reducing the size of the battery module.

Figure 34:
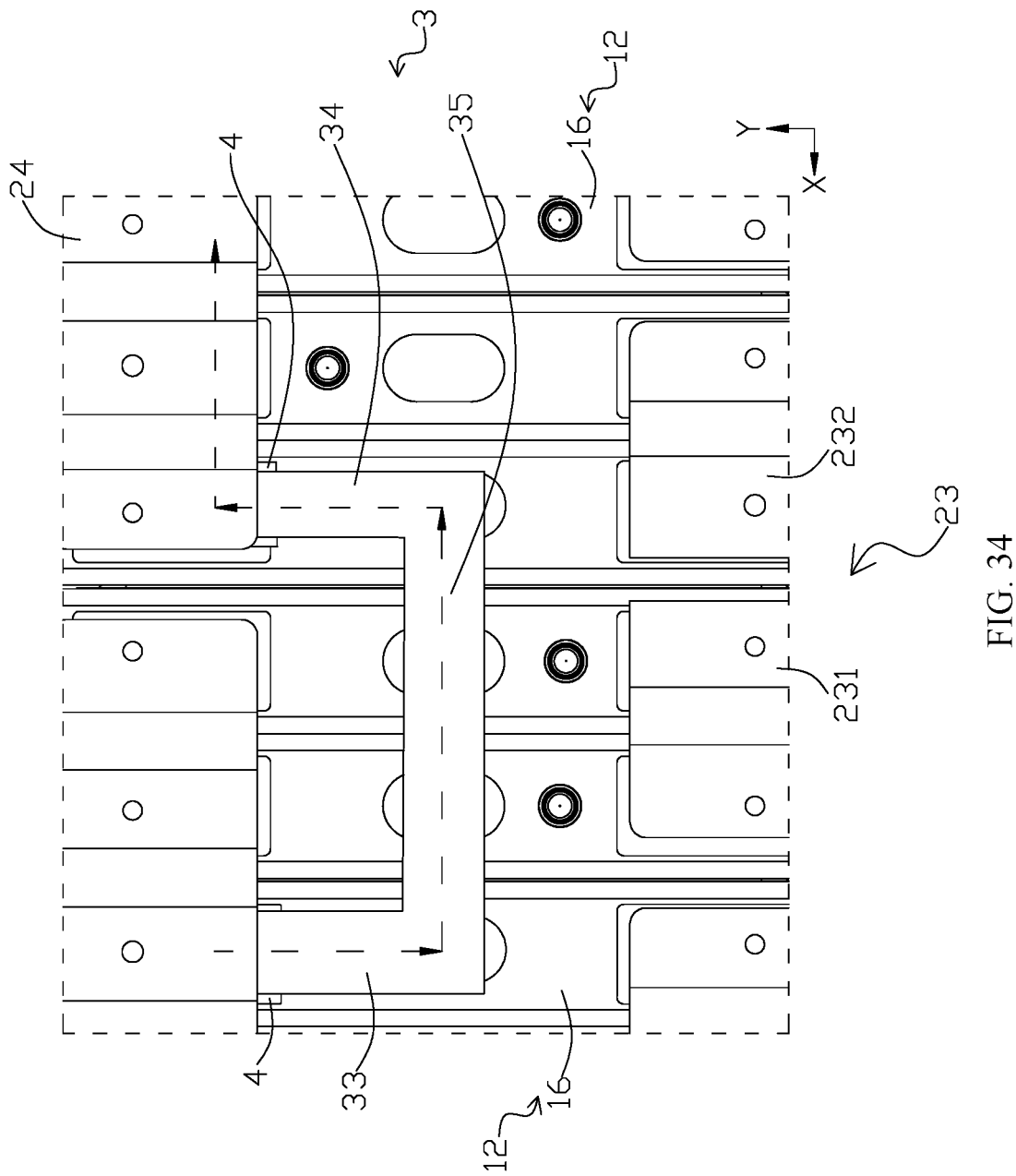
FIG. 34 is a local detailed view of part XIV of FIG. 33.

In a specific embodiment, as shown in FIG. 34, of the two connecting plates 2 connected to the failed battery unit 13 along the length direction X, one is a broken connecting plate 23, and the other is an unbroken connecting plate 24. In addition, the broken connecting plate 23 includes a first part 231 and a second part 232 that are disconnected from each other along the length direction X. The first part 231 is connected to an electrode terminal 11 of each target battery unit 12, the second part 232 is connected to the electrode terminal 11 of the failed battery unit 13. In addition, the conductive part 3 connects the unbroken connecting plate 24 and the first part 231 to electrically connect the target battery unit 12.

In this embodiment, the broken connecting plate 23 forms an open-circuit point between the two target battery units 12. In this embodiment, one open-circuit point is included. In addition, when connecting the first part 231 of the broken connecting plate 23 to the unbroken connecting plate 24, the conductive part 3 can indirectly connect the electrode terminals 11 of the two target battery units 12. In addition, due to a large area of the first part 231, the junction area between the conductive part 3 and the first part 231 is relatively large, and the passage area between the conductive part 3 and the first part 231 is relatively large, thereby reducing over temperature risks of the parts and improving the safety of the battery module. In addition, with a large junction area, connection reliability of the parts is improved.

The two broken connecting plate 23 may be formed by cutting off the connecting plate 2 that connects the target battery units 12 to the failed battery unit 13, or by other means, details of which made be obtained with reference to the following embodiment.

In addition, when the conductive part 3 is connected to the first part 231 of the broken connecting plate 23 and the conductive part 3 is a plate structure, the conductive part 3 may be connected to the first part 231 by butt-welding, or the conductive part 3 may be connected to the first part 231 by bonding, riveting or other means as long as a reliable connection is implemented between the two parts.

In another specific embodiment, of the two connecting plates 2 connected to the failed battery unit 13 along the length direction X, one is a broken connecting plate 23, and the other is an unbroken connecting plate 24. The first part 231 that is of the broken connecting plate 23 and connected to the electrode terminal 11 of each target battery unit 12 is removed to expose the electrode terminal 11 of the target battery unit 12. In this way, the broken connecting plate 23 includes only the second part 232. The second part 232 is connected to the electrode terminal 11 of the failed battery unit 13. In addition, the conductive part 3 is directly connected to the exposed electrode terminal 11 of the target battery unit 12 and the unbroken connecting plate 24.

In this embodiment, the first part 231 that is of the broken connecting plate 23 and connected to the target battery unit 12 is removed to facilitate the direct connection between the conductive part 3 and the electrode terminals 11 of the target battery units 12, thereby avoiding energy loss generated when the current passes through the first part 231. In addition, after welding is performed, a passage area between the conductive part 3 and the electrode terminals 11 of the target battery units 12 is relatively large, thereby reducing over temperature risks of the battery module during working. In addition, the direct connection between the conductive part 3 and the electrode terminals 11 of the target battery units 12 can also improve connection reliability and reduce risks of disconnection between the conductive part 3 and the electrode terminals 11 when the battery module vibrates. In addition, after the first part 231 is removed, a weight of the battery module can be reduced.

In this embodiment, after the first part 231 is removed, an installation space for the conductive part 3 is available. After the electrode terminals 11 of the target battery units 12 are connected to the conductive part 3, a height of the target battery units 12 will not increase significantly, thereby reducing risks of interference between the conductive part 3 and other parts (such as the upper cover of the battery module), and reducing safety hazards of the battery module caused by a contact between the conductive part 3 and the metal upper cover.

In a specific embodiment, of the two connecting plates 2 connected to the failed battery unit 13 along the length direction X, one is a broken connecting plate 23, and the other is an unbroken connecting plate 24. In addition, the broken connecting plate 23 is removed to expose the electrode terminals 11 of the target battery units 12 connected to the broken connecting plate 23 and expose the electrode terminals 11 of the failed battery unit 13 connected to the broken connecting plate 23, so that the conductive part 3 directly connects the electrode terminals 11 of the target battery units 12 to the unbroken connecting plate 24.

In this embodiment, by removing the broken connecting plate 23 connected to the target battery units 12 and the failed battery unit 13, the weight of the battery module can be further reduced, and the removal of the connecting plate connected to the failed battery unit 13 does not affect the circuit of the battery module. In a specific embodiment, the connecting plates 2 connected to all battery units 1 located between the target battery units 12 may be removed, so that all the battery units 1 located between the target battery units 12 are electrically disconnected from each other, thereby improving the safety of the circuit and further reducing the weight of the battery module.

In addition, in connecting the conductive part 3 to the electrode terminals 11 of the target battery units 12, the conductive part 3 may be superimposed on the electrode terminals 11, and then the conductive part 3 is welded to the electrode terminals 11 through penetration welding. Certainly, the conductive part 3 may also be connected to the electrode terminals 11 of the target battery units 12 by bonding, riveting or other means as long as a reliable connection is implemented.

In the above embodiments, as shown in FIG. 34, the conductive part 3 may be specifically a plate structure, or an end of the conductive part 3 may be a sheet-shaped structure. In this case, the conductive part 3 may be connected to the connecting plates 2 by welding, or by riveting or clamping. In this embodiment, the rigid-structured conductive part 3 has a relatively high structural strength, and can improve connection reliability between the conductive part 3 and the connecting plates 2.

Figure 35:
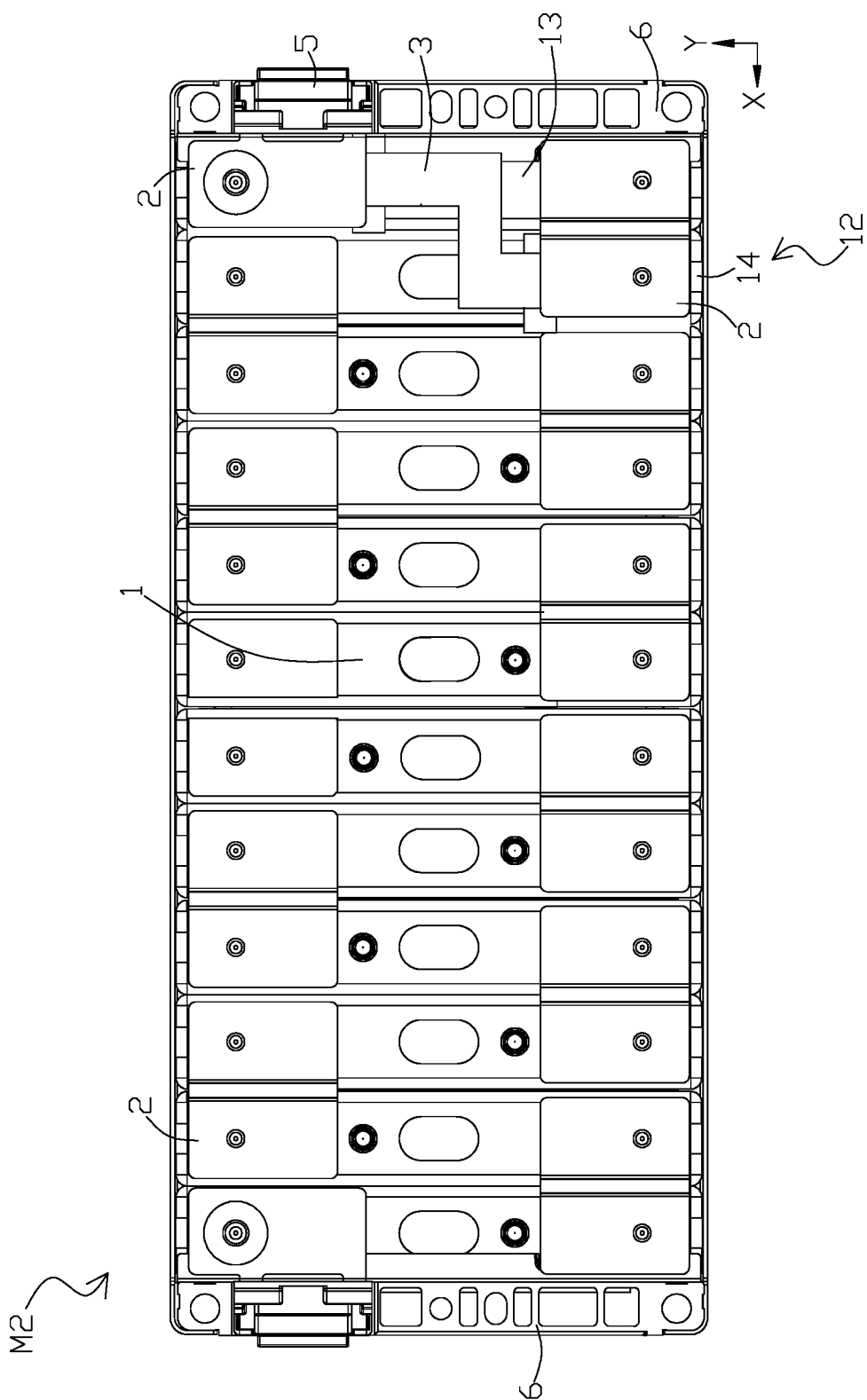
FIG. 35 is a top view of a battery module in FIG. 2 according to a twelfth specific embodiment.
Figure 36:
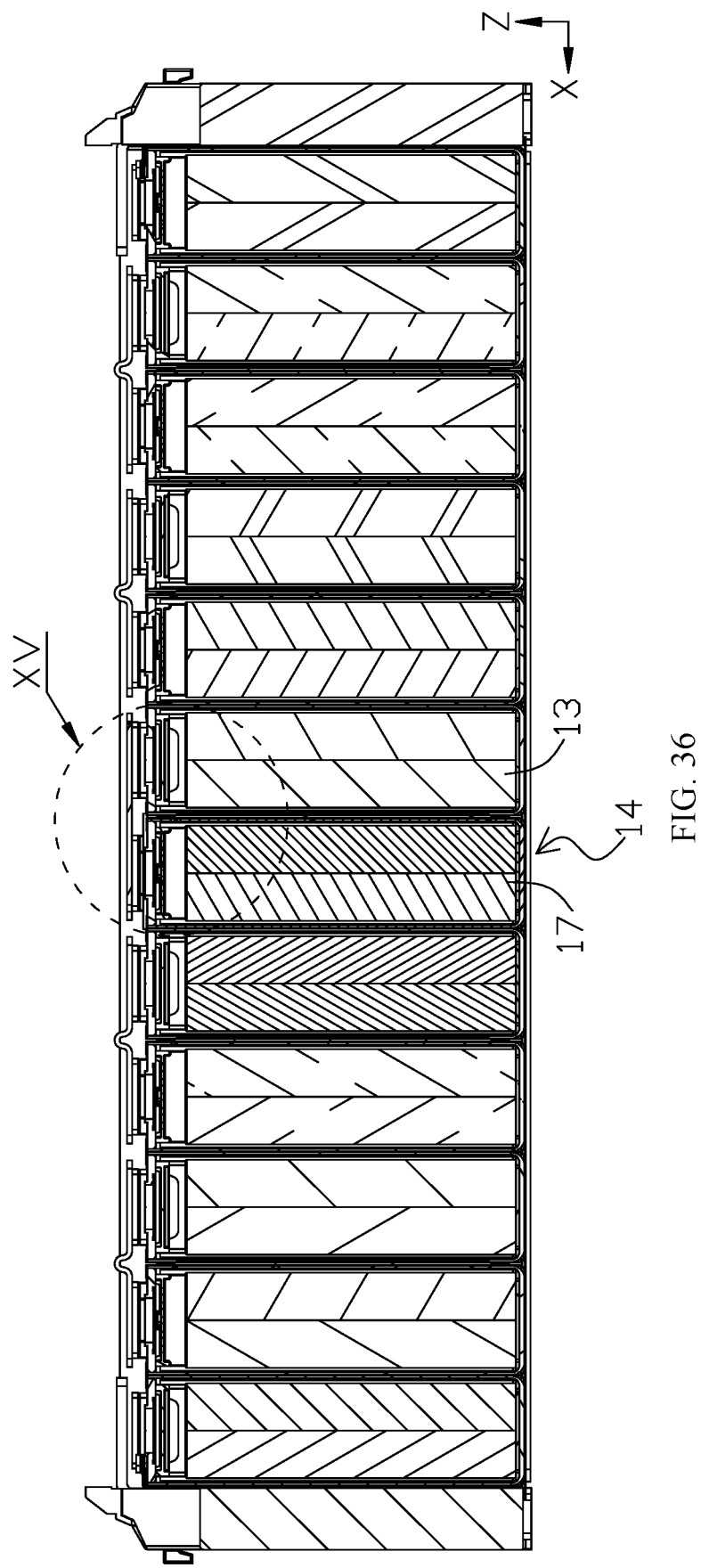
FIG. 36 is a longitudinal sectional view of FIG. 27.

In a possible design, as shown in FIG. 35, the battery module M2 further includes a connector 5. The connector 5 is configured to output electric energy of the battery module M2. The connector 5 may be installed on an end plate of the battery module M2. The connector 5 is connected to the connecting plate 2 adjacent to the connector 5. In a case that the failed battery unit 13 is located at the end of the battery module M2 along the length direction X, that is, in a case that the failed battery unit 13 is adjacent to the end plate 6 of the battery module M2, a non-failed battery unit 14 exists upstream of the failed battery unit 13, and no non-failed battery unit exists downstream of the failed battery unit 13. Therefore, in this embodiment, the battery module M2 includes only one target battery unit 12.

In this embodiment, the connecting plate 2 connected to the failed battery unit 13 is connected to the connector 5, one end of the conductive part 3 is connected to the connecting plate 2 that is connected to the target battery unit 12, and the other end is connected to the connector 5. Through the conductive part 3, a current of each non-failed battery unit 14 upstream of the failed battery unit 13 is transmitted to the connector 5, thereby enabling the battery module M2 to resume working and output electric energy normally.

Figure 37:
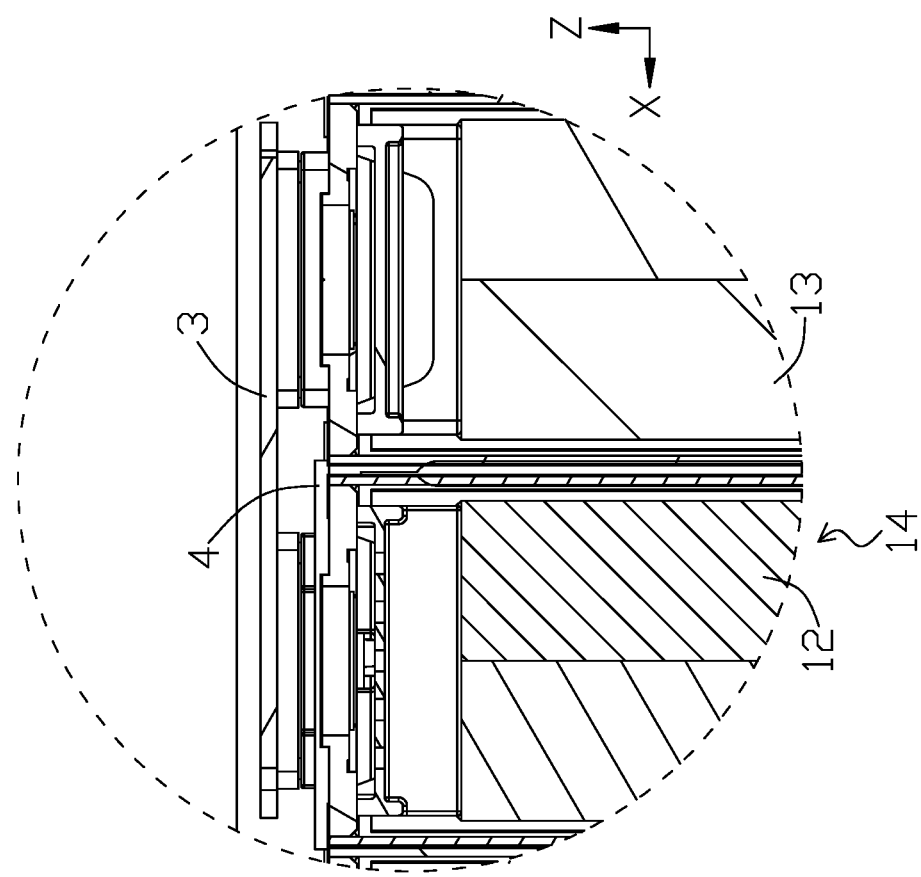
FIG. 37 is a local detailed view of part XV of FIG. 36.

Specifically, as shown in FIG. 37, the end of the sheet-shaped structure of the conductive part 3 may partly overlap the connecting plates 2. Specifically, the end of the conductive part 3 is lap-jointed to the connecting plates 2 to implement mutual connection. Alternatively, the end of the sheet-shaped structure of the conductive part 3 may overlap nothing of the connecting plates 2, and the conductive part 3 is interconnected to the connecting plates 2 (specifically, interconnected in a way such as butt-welding) to implement mutual connection.

On the other hand, in the above embodiments, as shown in FIG. 37, before the conductive part 3 is electrically connected to a connecting plate 2 (specifically, by welding or other means), a heat insulation part 4 is placed under the connecting plate 2 connected to the conductive part 3. That is, the heat insulation part 4 may be located between the connecting plate 2 and the top cover 16 of the battery unit 1. Specifically, the heat insulation part 4 may be made of a high-temperature-resistant material such as a ceramic sheet or a mica sheet. During the welding between the conductive part 3 and the connecting plate 2, the heat insulation part 4 can serve a function of protecting the top cover 16, prevent the top cover 16 from being burnt during the welding, and increase the service life of the battery module. Alternatively, the heat insulation part 4 may also be a metal sheet as long as the metal sheet can prevent a laser beam from penetrating the top cover 16 during the welding between the conductive part 3 and the connecting plate 2.

Specifically, the heat insulation part 4 needs to be able to cover a weld between the conductive part 3 and the connecting plate 2. That is, a length of the heat insulation part 4 needs to be not less than a length of the weld, and a width of the heat insulation part 4 needs to be not less than a width of the weld. In addition, a shape of the heat insulation part 4 is not limited, and may be a square, circle, or another shape. Further, to enable the heat insulation part 4 to fit in between the connecting plate 2 and the top cover 16, a thickness of the heat insulation part 4 needs to be less than a distance between the top cover 16 and the connecting plate 2.

In addition, the heat insulation part 4 is only placed between the top cover 16 and the connecting plate 2. The heat insulation part 4 is not fixed to the top cover 16 or the connecting plate 2. That is, the heat insulation part 4 is in a free state. Therefore, after completion of welding the connecting plate 2 to the conductive part 3, the unfixed heat insulation part 4 is removed to prevent the heat insulation part 4 from colliding with other structures during working of the battery module, thereby increasing the service life of the battery module.

Figure 38:
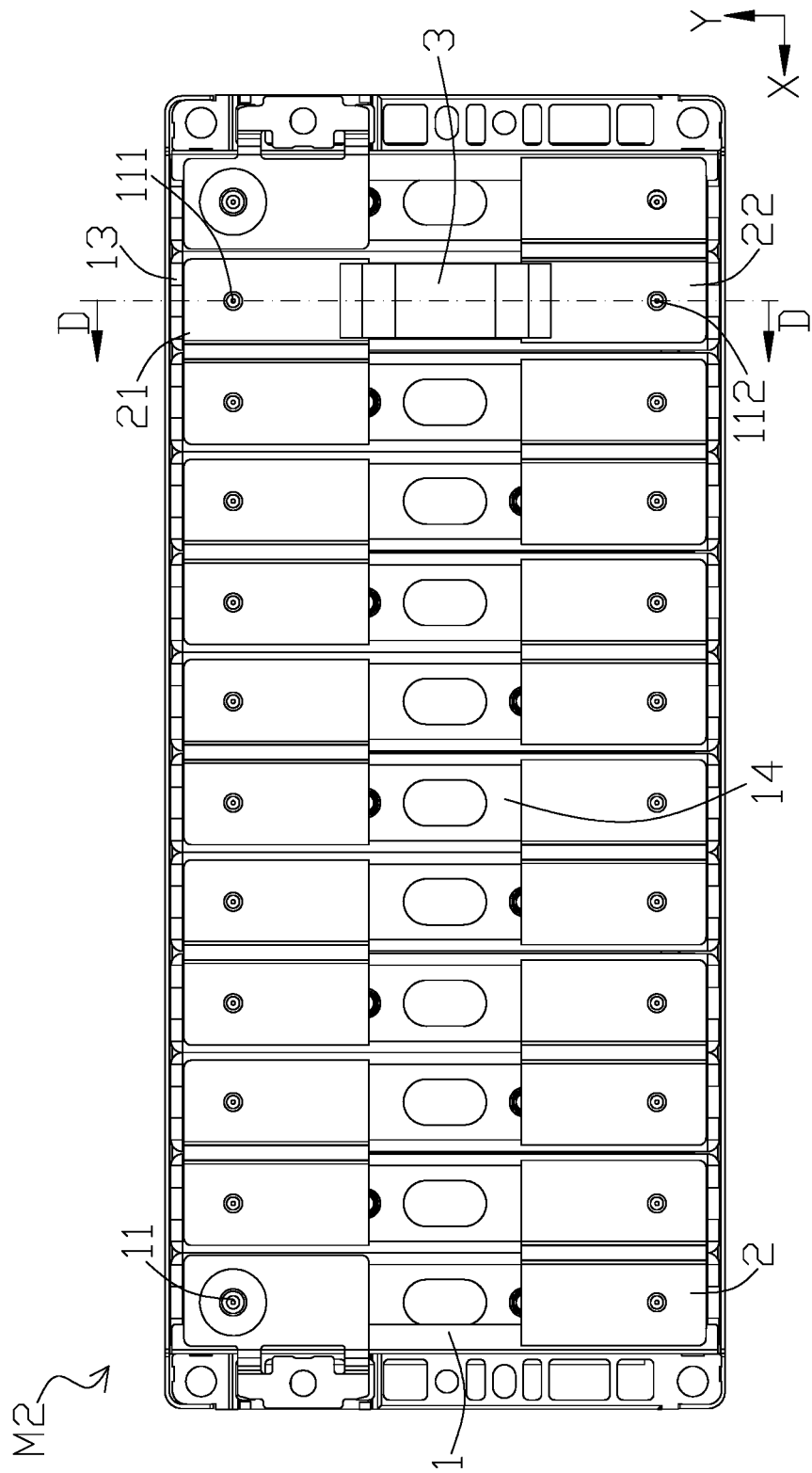
FIG. 38 is a top view of a battery module in FIG. 2 according to a thirteenth specific embodiment.
Figure 39:
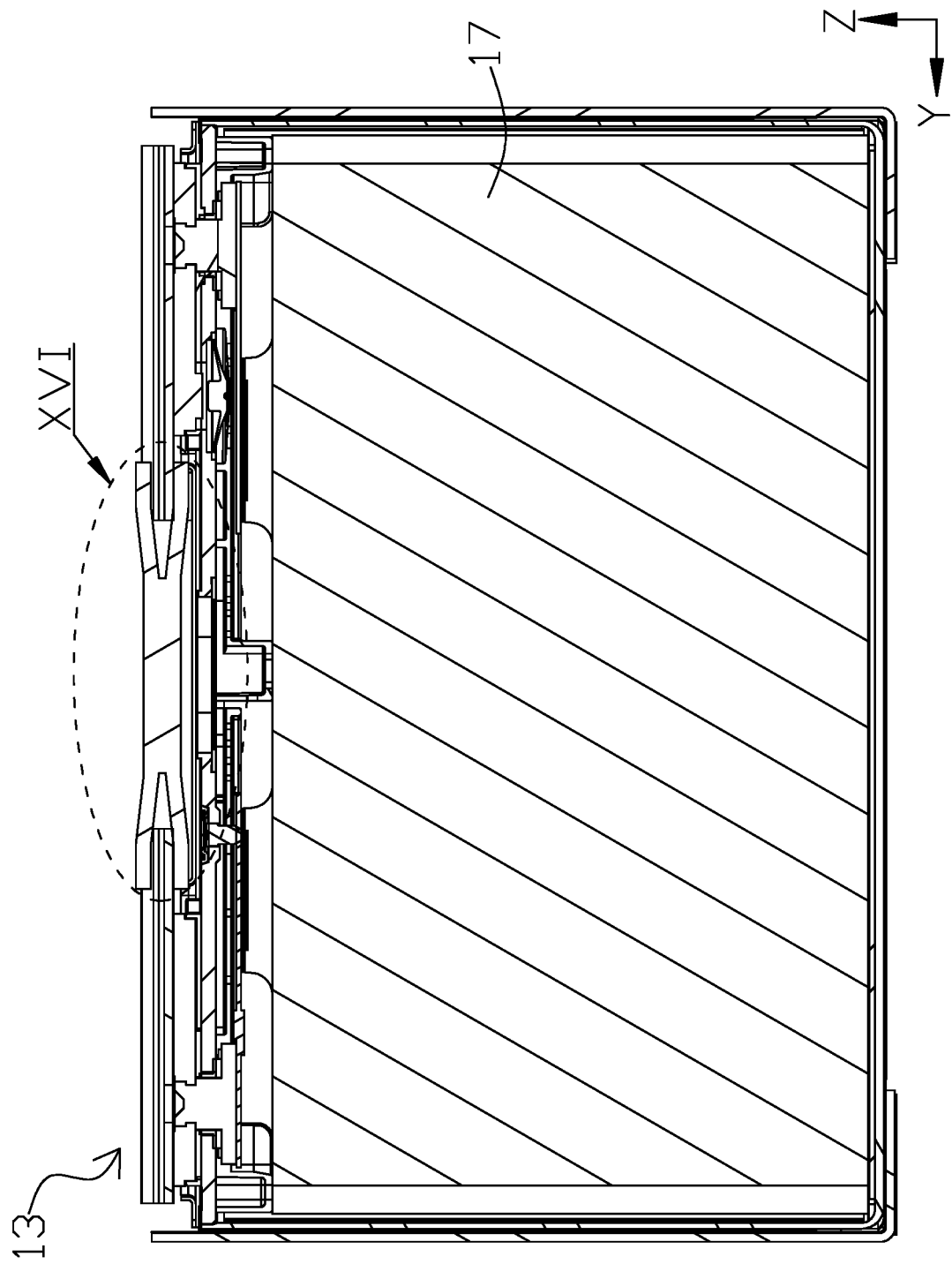
FIG. 39 is a sectional view in a D-D direction of FIG. 38.
Figure 40:
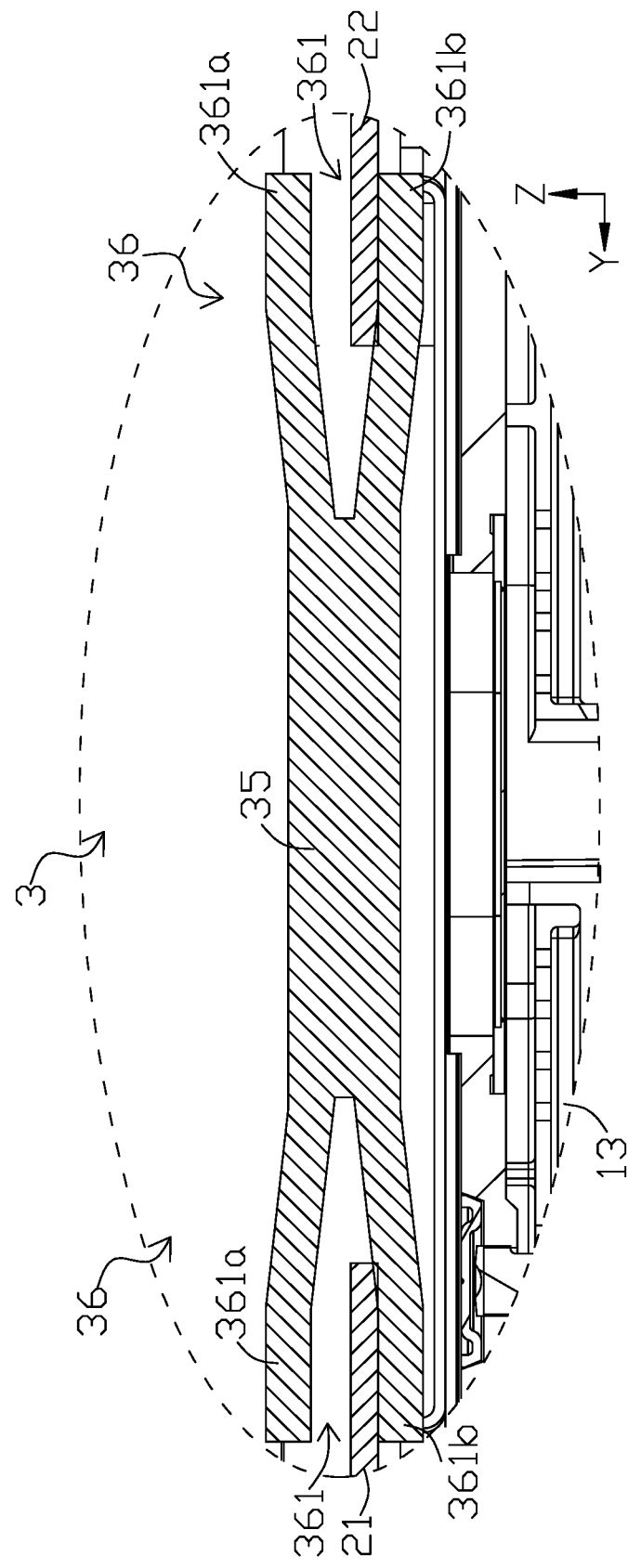
FIG. 40 is a local detailed view of part XVI of FIG. 39.

In the above embodiments, as shown in FIG. 38 to FIG. 40, a clamping part 36 may be further disposed at the end of the conductive part 3. The clamping part 36 is configured to clamp the connecting plate 2 so that the conductive part 3 is interconnected to the connecting plate 2. The connecting plate 2 clamped by the clamping part 36 may be the connecting plate 2 connected to the electrode terminals 11 of the failed battery unit 13 and/or the connecting plate 2 connected to the electrode terminals 11 of the target battery unit 12. In this way, repair efficiency is improved, and connection strength is effectively improved.

Specifically, in the embodiment shown in FIG. 40, the conductive part 3 is configured to connect the connecting plate 2 connected to the electrode terminals 11 of the failed battery unit 13. Along the length direction X, the clamping part 36 is disposed at both ends of the conductive part 3. The clamping part 36 has an accommodation space 361. Specifically, a part of the first connecting plate 21 and the second connecting plate 22 is embedded into the conductive part 3 and connected to the conductive part 3.

In this embodiment, in a case that the first connecting plate 21 and the second connecting plate 22 are embedded into the conductive part 3, the junction area between the conductive part 3 and the two connecting plates 2 is increased, thereby improving connection reliability between the conductive part 3 and the connecting plates 2, increasing a passage area between the conductive part 3 and the connecting plates 2, and reducing over temperature risks of the conductive part 3 and the connecting plates 2. In addition, in a case that the connecting plate 2 are embedded into the conductive part 3, the size of the battery module along a height direction Z (a thickness direction of the connecting plates 2) is reduced, and the risk of conduction between the conductive component 3 and other parts of the battery module is reduced.

Figure 41:
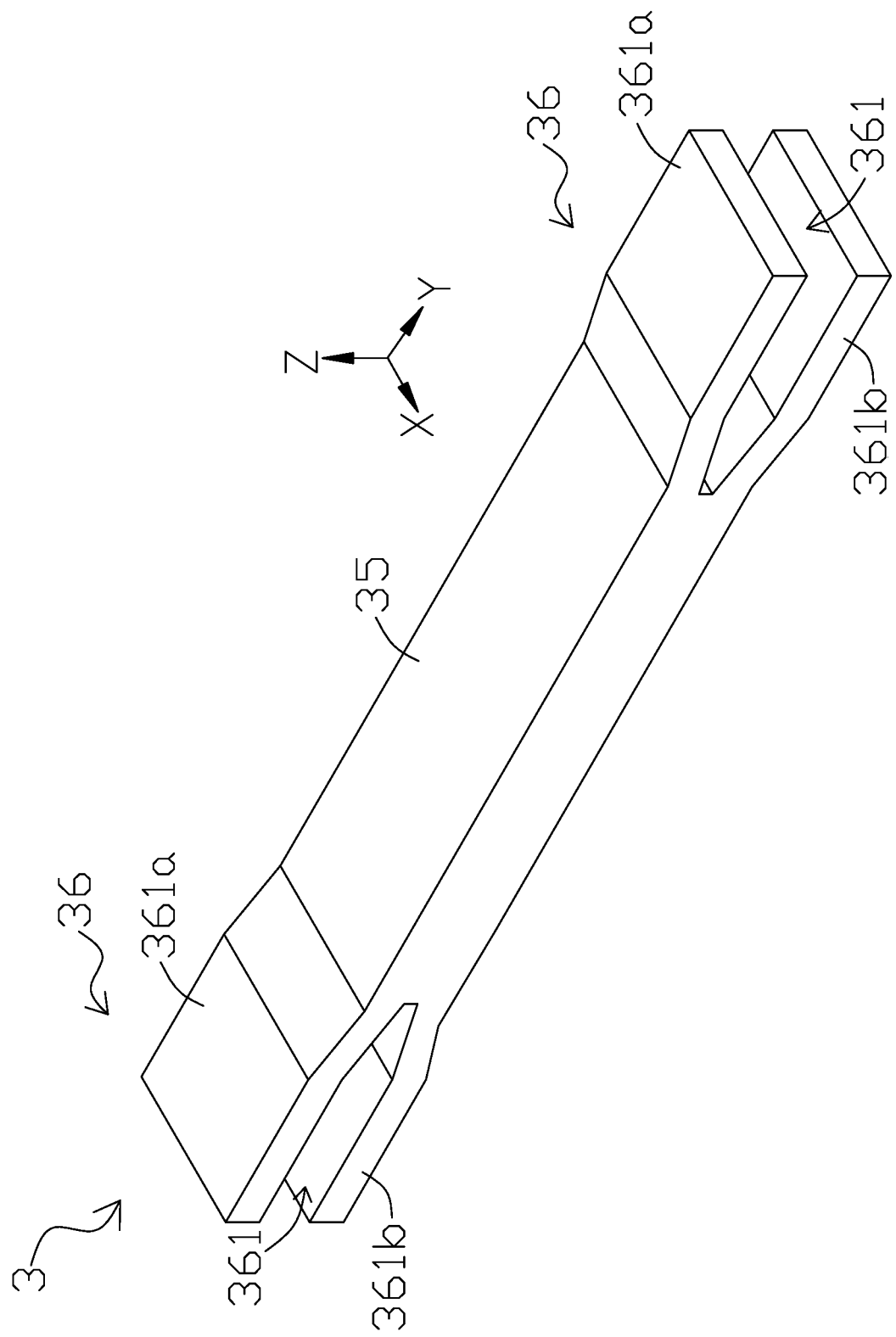
FIG. 41 is a schematic structural diagram of a conductive part in FIG. 40 according to a specific embodiment.

More specifically, as shown in FIG. 38 and FIG. 39, in a case that the conductive part 3 is configured to connect the connecting plate 2 connected to the electrode terminals 11 of the failed battery unit 13, as shown in FIG. 40 and FIG. 41, the two clamping parts 36 are located at two ends of the body part 35 along the width direction Yin the conductive part 3. That is, the conductive part 3 may be a structure shown in FIG. 40. Alternatively, the two clamping parts 36 of the conductive part 3 may bend against the body part 35 while ensuring that the two clamping parts 36 can be connected to the connecting plate 2 connected to the electrode terminals 11 of the failed battery unit 13.

In a specific embodiment, as shown in FIG. 40, the clamping part 36 includes a first arm 361a and a second arm 361b. The first arm 361a and the second arm 361b are respectively disposed on two sides of the connecting plate 2 along a thickness direction of the connecting plate to clamp the connecting plate 2.

More specifically, the first arm 361a and the second arm 361b of the conductive part 3 overlap each other and are located on the two sides of the connecting plate 2, or the first arm 361a and the second arm 361b are disposed in a staggered way on the two sides of the connecting plate 2. In this embodiment, regardless of whether the first arm 361a is overlapped or staggered, both arms can be used to clamp the connecting plate 2 to implement the connection between the conductive part 3 and the connecting plate 2.

In a possible design, the connecting plate 2 may be connected to the first arm 361a and/or the second arm 361b, so as to implement the connection between the conductive part 3 and a corresponding connecting plate 2. In this embodiment, in a case that the connecting plate 2 is connected to the first arm 361a and/or the second arm 361b, the junction area between the connecting plate 2 and the conductive part 3 is relatively large, thereby increasing connection reliability and a passage area between the connecting plate 2 and the conductive part 3.

In the first specific embodiment, along the height direction Z, a thickness of the connecting plate 2 is approximately equal to (or slightly greater than) a distance between the first arm 361a and the second arm 362b. In this way, the connecting plate 2 is contiguous to both the first arm 361a and the second arm 361b, and the connecting plate 2 can be compacted by the first arm 361a and the second arm 361b. This can further increase the junction area between the connecting plate 2 and the conductive part 3, so as to further improve the connection reliability and the passage area between the connecting plate 2 and the conductive part 3.

In a second specific embodiment, as shown in FIG. 40, along the height direction Z (the thickness direction of the connecting plate 2), there is a first preset gap between the connecting plate 2 and the corresponding first arm 361a, and/or, there is a second preset gap between the connecting plate 2 and the corresponding second arm 361b. In this case, the connecting plate 2 and the conductive part 3 are unable to be connected by compacting, and may be connected by welding or by conductive adhesive tape.

Specifically, the connecting plate 2 is spaced apart from the corresponding first arm 361a by a first preset gap, and is contiguous to the corresponding second arm 361b. In addition, the first arm 361a is located above the second arm 361b. Therefore, in a case that a part of the connecting plate 2 extends into the accommodation space 361, contiguity between the connecting plate 2 and the second arm 361b can be implemented without a clamp. In this case, a welding part 321d is formed between the connecting plate 2 and the first arm 361a. Within the welding part 321d, the connecting plate 2 may be connected to the first arm 361a by filler wire welding.

Alternatively, there is a first preset gap between the connecting plate 2 and the corresponding first arm 361a, and there is a second preset gap between the connecting plate 2 and the corresponding second arm 361b. Both the first preset gap and the second preset gap are filled with conductive adhesive tape, so that the connecting plate 2 is connected to both the first arm 361a and the second arm 361b by the conductive adhesive tape. During operation, both an upper surface and a lower surface of the connecting plate 2 are coated with the conductive adhesive tape first, and then a part of the coated connecting plate 2 is extended into the accommodation space 361. In this way, the first arm 361a is connected to the upper surface of the connecting plate 2 by the conductive adhesive tape, and the second arm 361b is connected to the lower surface of the connecting plate 2 by the conductive adhesive tape.

Figure 42:
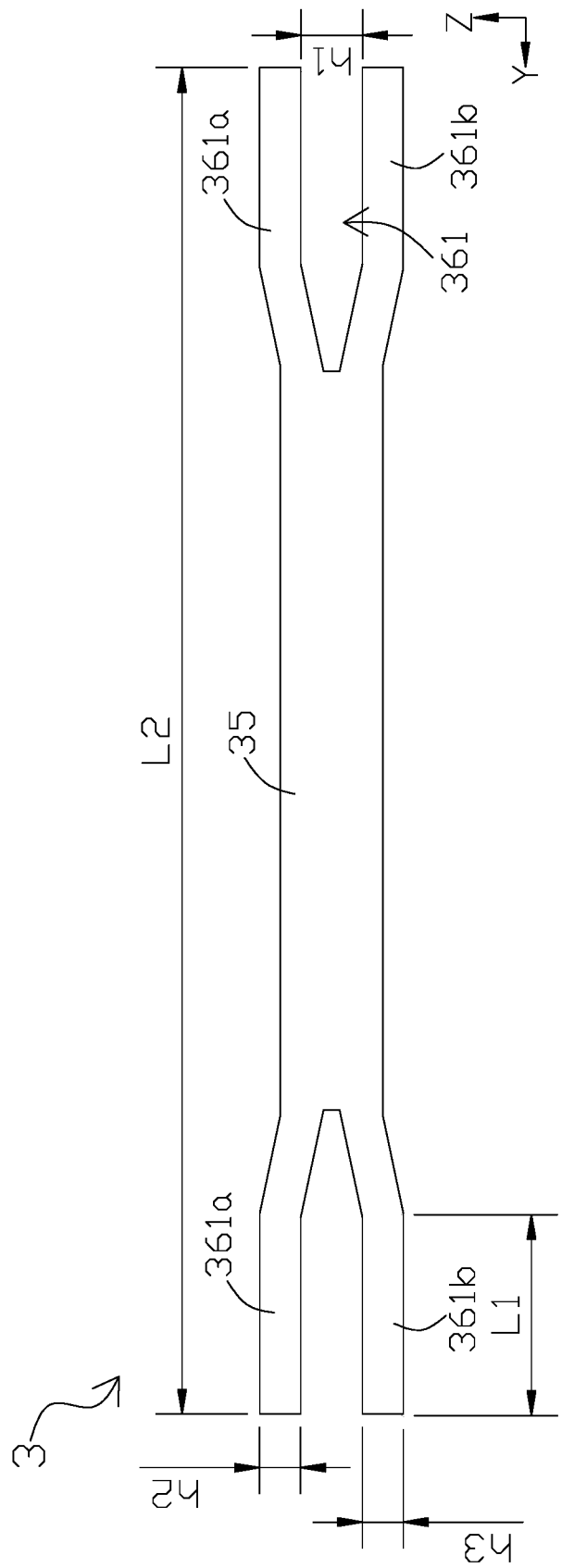
FIG. 42 is a front view of FIG. 40.

More specifically, as shown in FIG. 42, along the width direction Y, a length L1 of the first arm 361a and the second arm 361b is 2 mm-10 mm, such as 4 mm or 6 mm. As described above, in a case that a part of the connecting plate 2 extends into the accommodation space 361, the length L1 denotes the length by which the connecting plate 2 extends into the accommodation space 361 and also denotes a junction length between the connecting plate 2 and the conductive part 3. Therefore, a too small length L1 of the first arm 361a and the second arm 361b needs to be avoided to achieve a relatively high connection reliability between the connecting plate 2 and the conductive part 3 and a relatively large passage area. However, an excessive length L1 of the first arm 361a and the second arm 361b also needs to be avoided. An excessive length L1 leads to an excessive length L2 of the conductive part 3 and affects an energy density of the battery module M2. Correspondingly, an excessive or too small length L2 of the conductive part 3 needs to be avoided, and the length may be specifically set according to a distance between the first connecting plate 21 and the second connecting plate 22.

In addition, as shown in FIG. 42, along the height direction Z, a height h1 of the accommodation space 361 (a distance between the first arm 361a and the second arm 361b) is 2 mm-4 mm. For example, the height h1 may be specifically 2.5 mm, 3 mm, or the like. In a case that the connecting plate 2 is contiguous to both the first arm 361a and the second arm 361b of the accommodation space 321, the height h1 is equal to a thickness of the connecting plate 2, or slightly smaller than the thickness of the connecting plate 2, thereby improving the connection reliability between the connecting plate 2 and the conductive part 3. In a case that the connecting plate 2 is connected to the first arm 361a and/or the second arm 361b by welding or by conductive adhesive tape, the height h1 needs to be enough to allow for the welding connection or the conductive adhesive tape connection between the connecting plate 2 and the first arm 361a and/or the second arm 361b.

On the other hand, as shown in FIG. 42, along a third direction Z (a thickness direction of the connecting plate 2), a thickness h2 of the first arm 361a is 0.5 mm-2 mm, such as 1 mm and 1.5 mm, and/or, the thickness h3 of the second arm 361b is 0.5 mm-2 mm, such as 1.2 mm, 1.8 mm, or the like. The thickness h2 of the first arm 361a may be the same as or different from the thickness h3 of the second arm 361b. The thickness of the two arms may be any value that meets a strength requirement of the conductive part 3.

Figure 43:
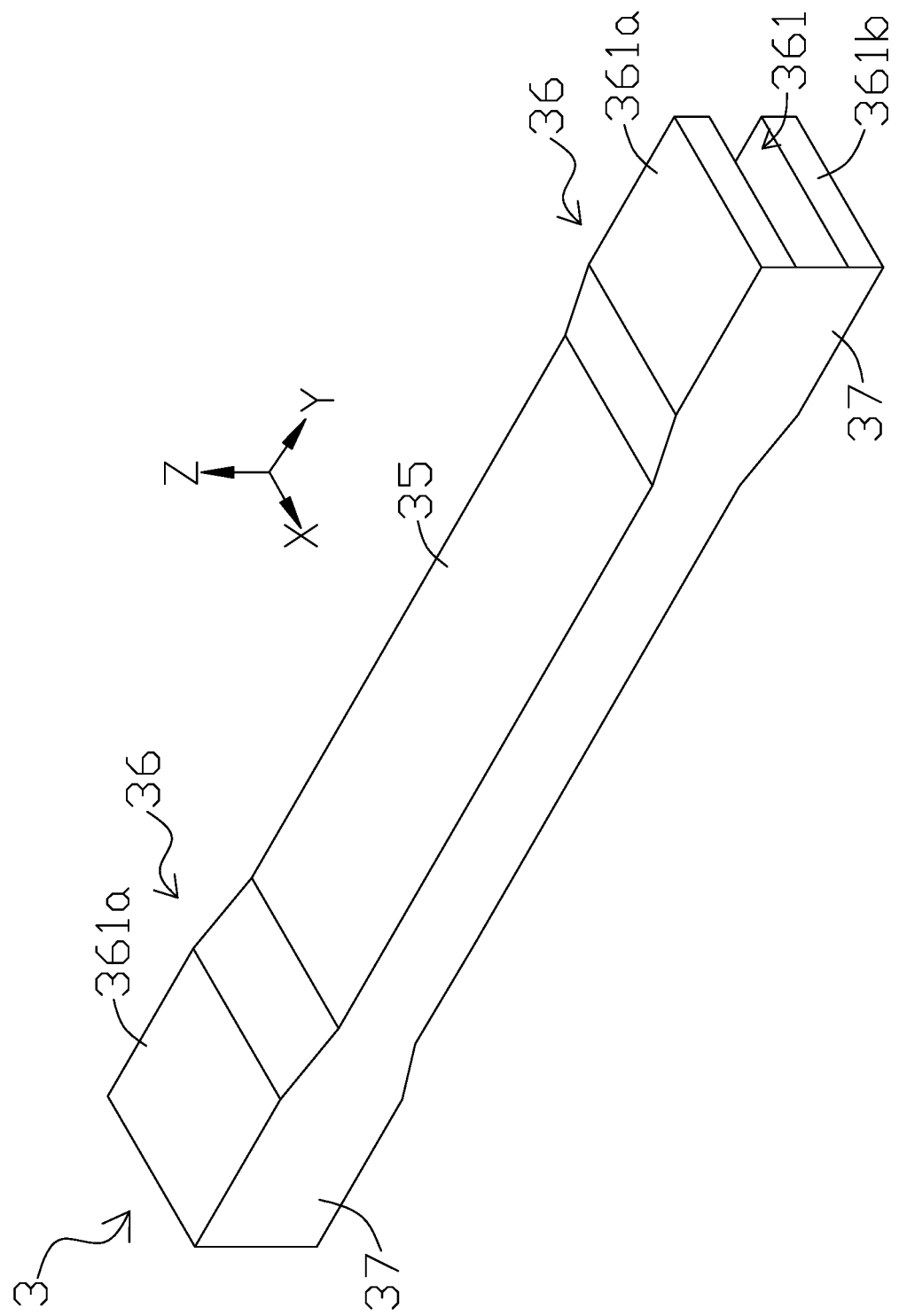
FIG. 43 is a schematic structural diagram of a conductive part in FIG. 40 according to another specific embodiment.
Figure 44:
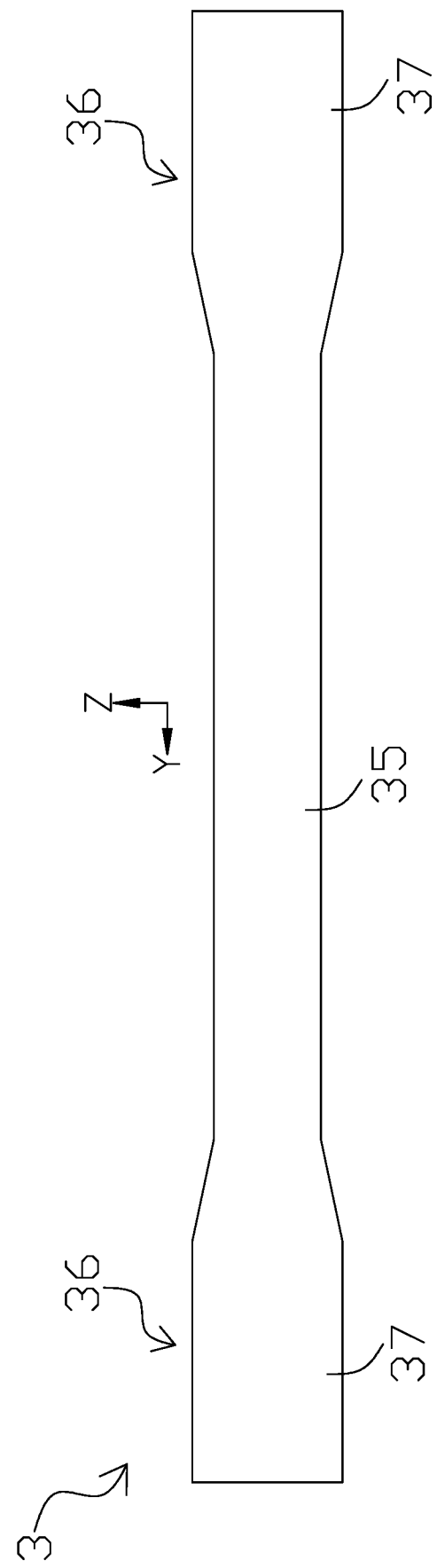
FIG. 44 is a front view of FIG. 43.
Figure 45:
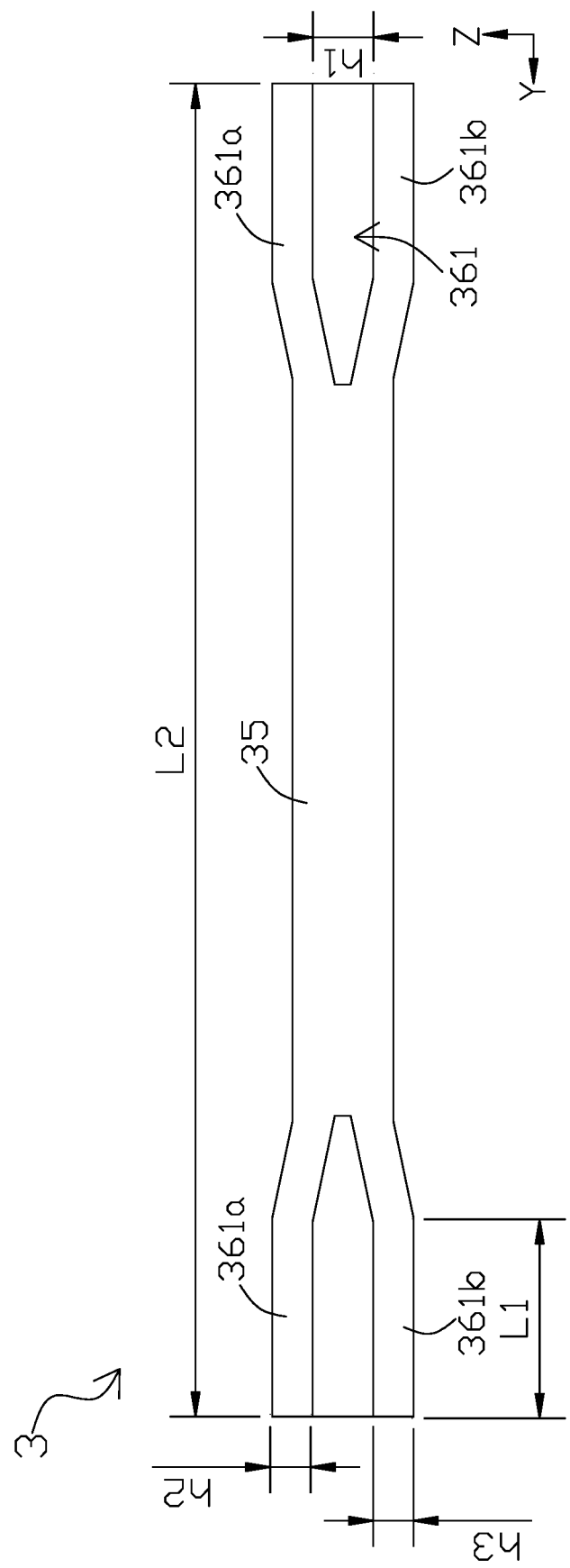
FIG. 45 is a back view of FIG. 43.

In another specific embodiment, as shown in FIG. 43 to FIG. 45, to prevent a movement of the conductive part 3 relative to the connecting plate 2 from affecting the connection reliability between the conductive part 3 and the connecting plate 2, the clamping part 36 of the conductive part 3 further includes a position limiting part 37.

Specifically, in the conductive part 3, the position limiting part 37 may be disposed inside the clamping space 361 or may be located outside the clamping space 361. The position limiting part 37 may also participate in bounding the clamping space 361 to an extent that can limit the movement of the conductive part 3 relative to the connecting plate 2. In addition, the position limiting part 37 may be a structure protruding against the first arm 361a and/or the second arm 361b. The protruding structure can be contiguous to the connecting plate 2 so as to limit the movement of the conductive part 3 relative to the connecting plate 2. The position limiting part 37 may also be a buckle structure disposed at the clamping part 36. The buckle structure can clamp the connecting plate 2, thereby limiting the movement of the conductive part 3 relative to the connecting plate 2.

Therefore, the location and the specific structure of the position limiting part 37 are not limited herein as long as the position limiting part 37 can restrict the movement of the conductive part 3 relative to the connecting plate 2.

In a specific embodiment, the position limiting part 37 is connected to at least one of the first arm 361a or the second arm 361b. In the embodiments shown in FIG. 43 to FIG. 45, the position limiting part 37 is connected to both the first arm 361a and the second arm 361b. In this way, at least one opening between the first arm 361a and the second arm 361b is closed off by the position limiting part 37. In a case that at least a part of the connecting plate 2 is located in the clamping space 361, the position limiting part 37 is contiguous to a sidewall of the connecting plate 2. In this way, the movement of the conductive part 3 relative to the connecting plate 2 is limited by the position limiting part 37, the connection reliability between the connecting plate 2 and the conductive part 3 is improved, and the passage area between the connecting plate 2 and the conductive part 3 is increased.

Figure 46:
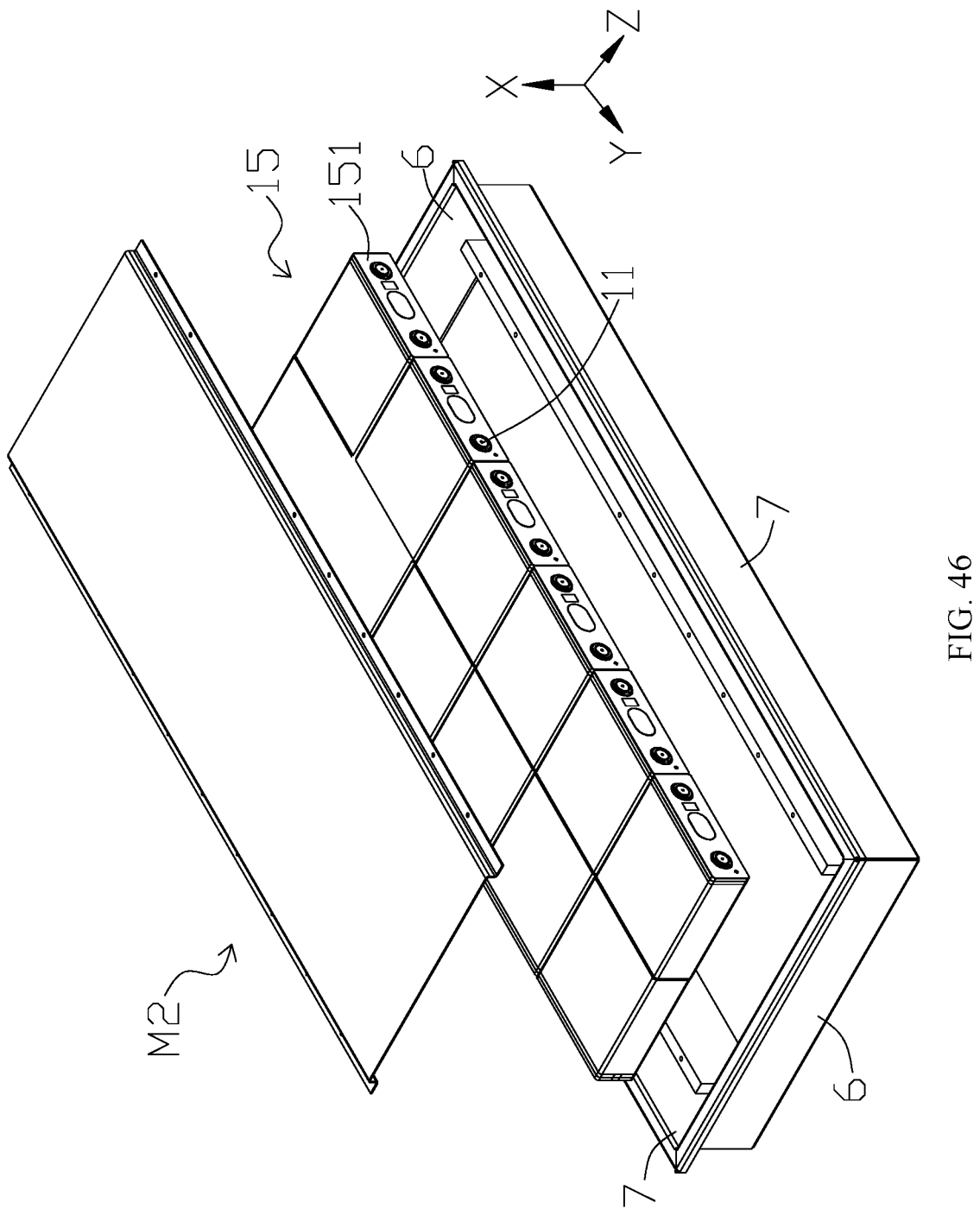
FIG. 46 is a top view of a battery module in FIG. 2 according to a fourteenth specific embodiment.
Figure 47:
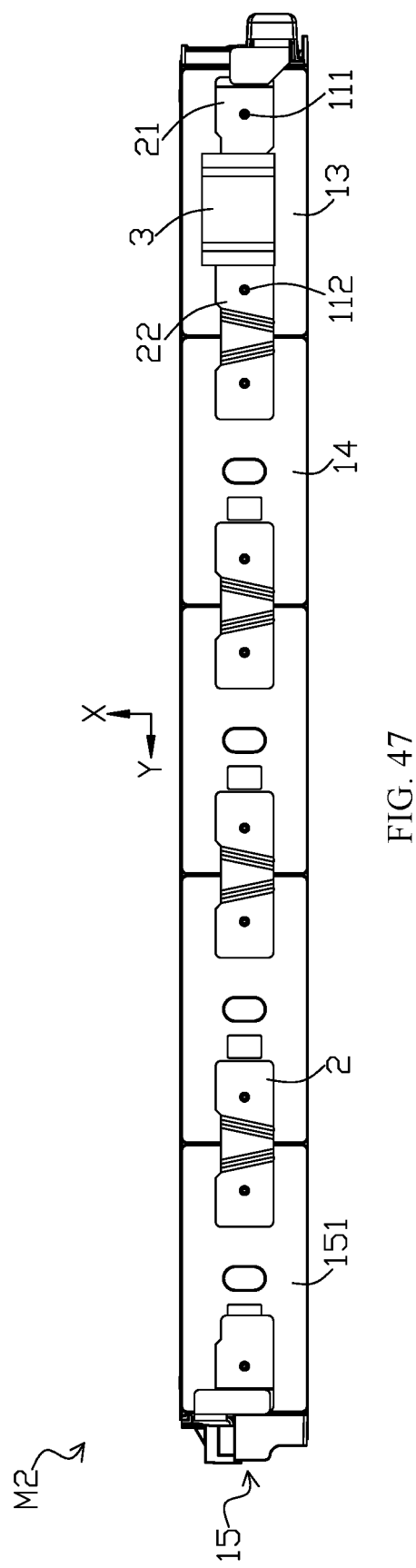
FIG. 47 is a front view of a battery cell array in FIG. 46 according to a specific embodiment.
Figure 48:
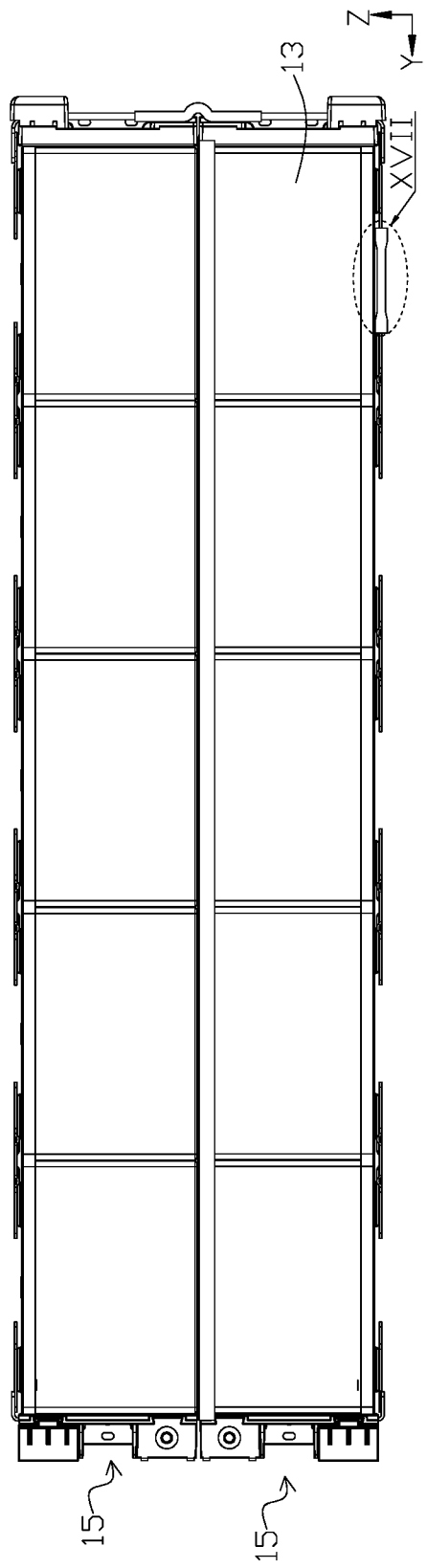
FIG. 48 is a front view of a battery cell array in FIG. 46 according to another specific embodiment.

In a possible design, as shown in FIG. 46 to FIG. 48, the battery module M2 includes a plurality of battery units 1. The battery units 1 may specifically include at least one battery cell 151. The battery cells 151 are arranged one by one consecutively along the width direction Y. Lateral parts of the battery cells 151 are contiguous to each other to form a battery cell array 15. Specifically, in the battery module M2, each battery cell 151 is in a flat lying state. In this case, electrode terminals 11 of the battery cell 151 are oriented toward a side plate 7. In this case, with the conductive part 3 being connected to the connecting plate 2 that is connected to the failed battery unit 13, the connecting plate 2 is at risk of being detached from the accommodation space 361 due to a downward movement under gravity.

Figure 49:
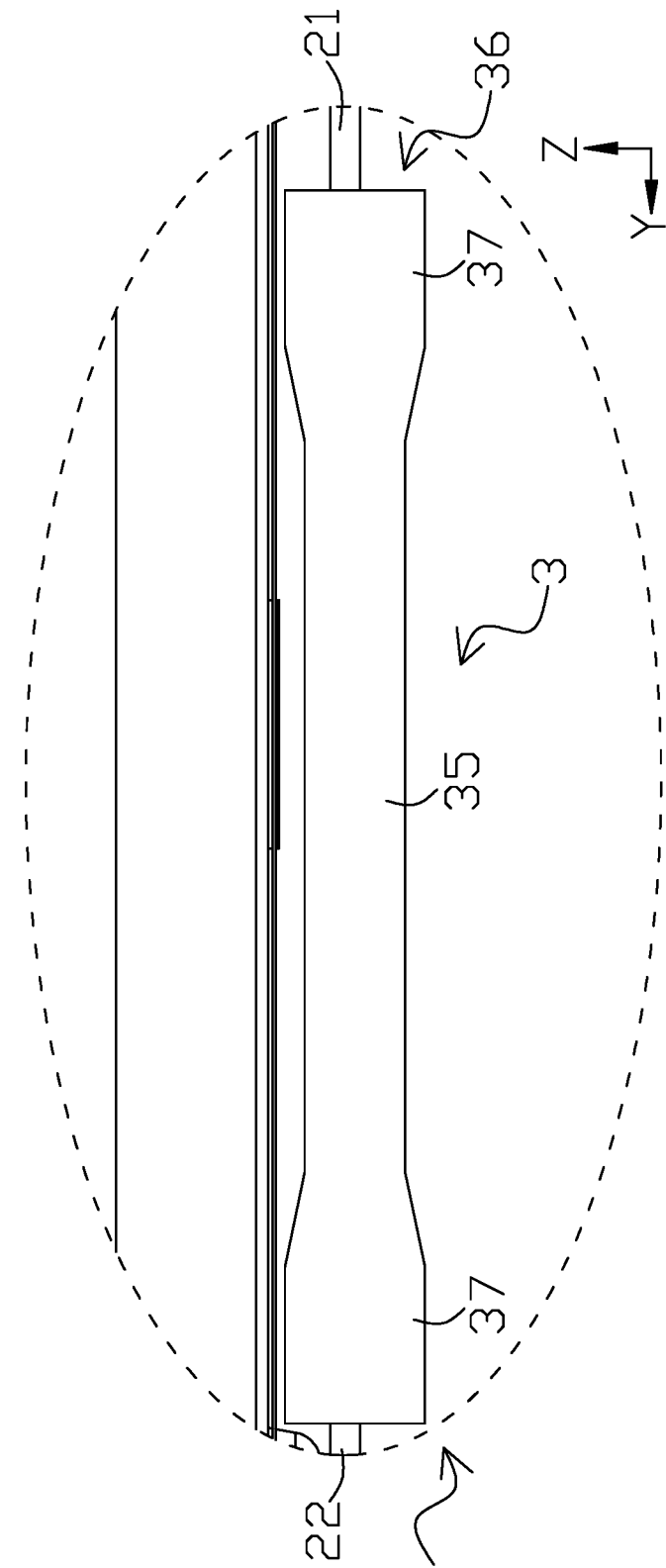
FIG. 49 is a detailed view of part XVII of FIG. 48.

In this case, as shown in FIG. 49, the position limiting part 37 of the conductive part 3 can restrict the conductive part 3 from being detached out of the clamping part 36 under gravity, thereby improving the connection reliability between the conductive part 3 and the connecting plate 2. At the same time, the conductive part 3 is hung from the connecting plate 2 through the position limiting part 37. Therefore, the position limiting part 37 can not only limit the movement of the connecting plate 2 relative to the conductive part 3, but also increase the connection reliability and the passage area between the connecting plate 2 and the conductive part 3.

Figure 50:
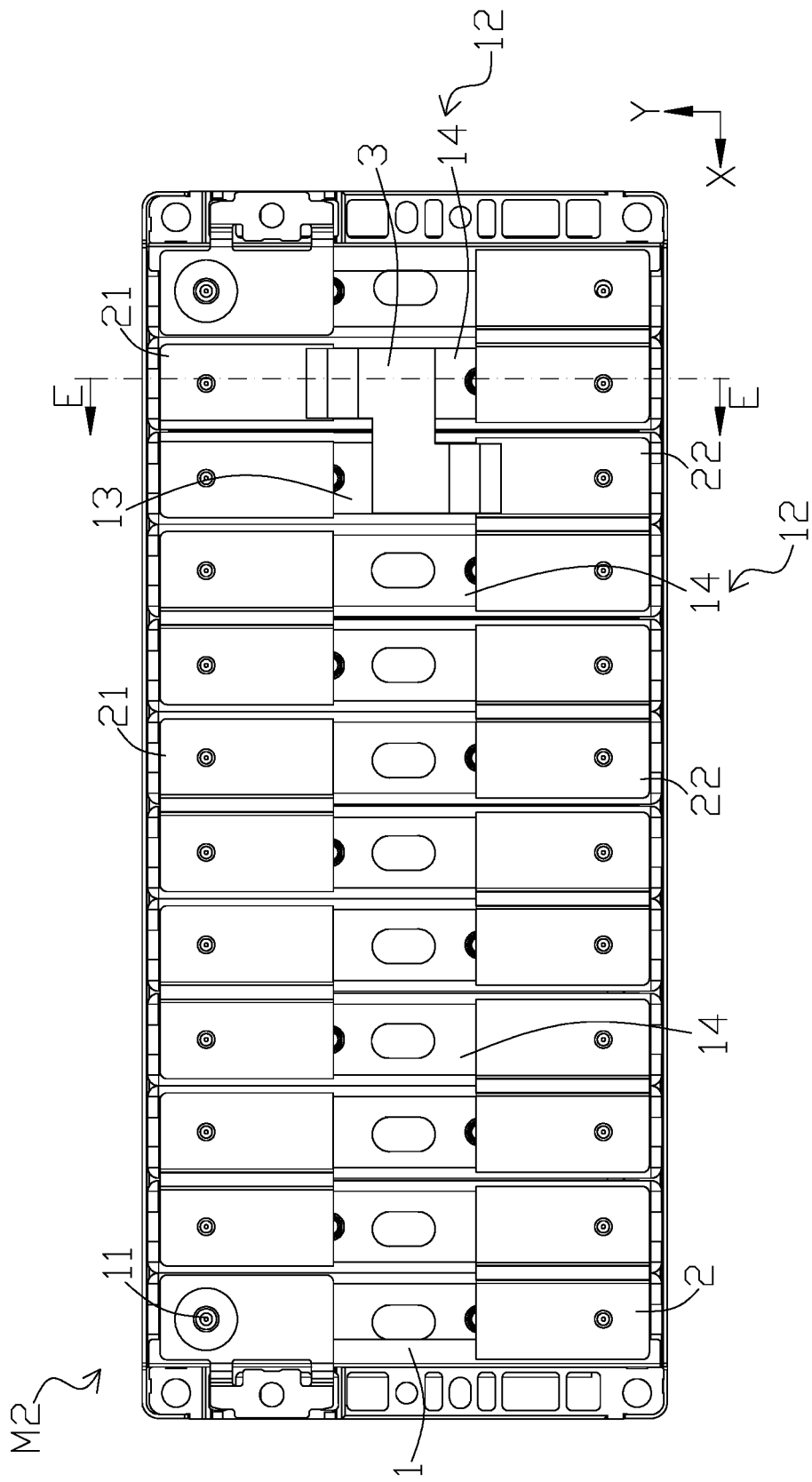
FIG. 50 is a schematic structural diagram of a battery module in FIG. 2 according to a fifteenth specific embodiment.
Figure 51:
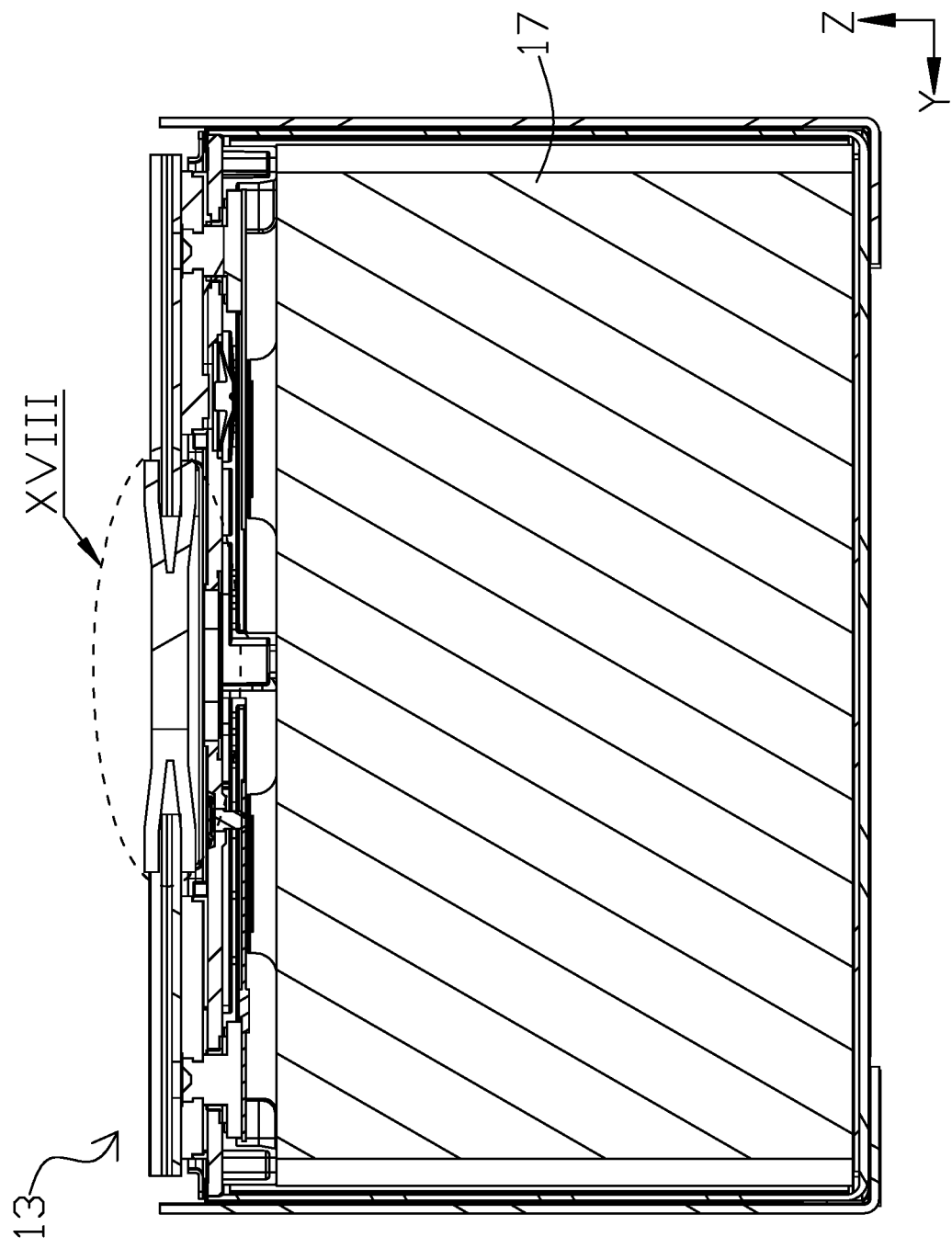
FIG. 51 is a sectional view in an E-E direction of FIG. 50.
Figure 52:
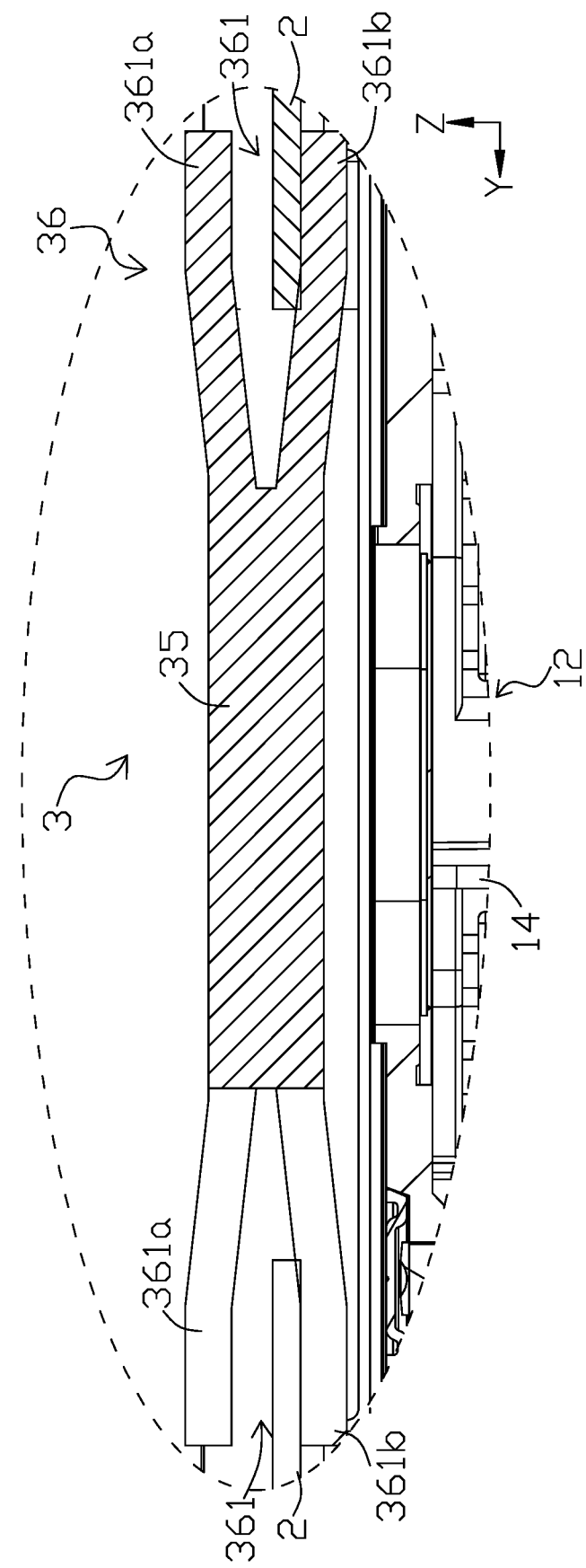
FIG. 52 is a local detailed view of part XVIII of FIG. 51.
Figure 53:
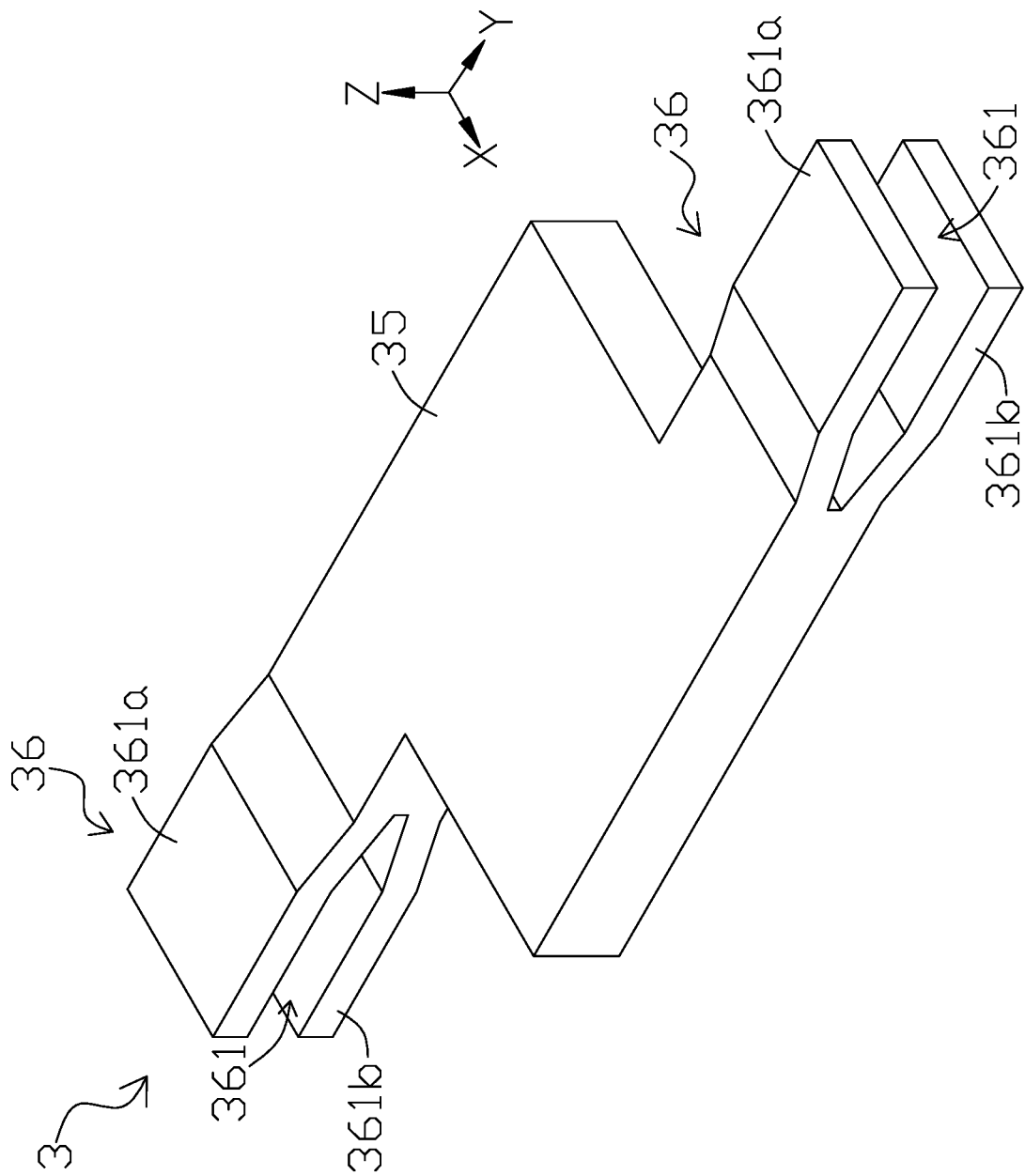
FIG. 53 is a schematic structural diagram of a conductive part in FIG. 52 according to a specific embodiment.
Figure 54:
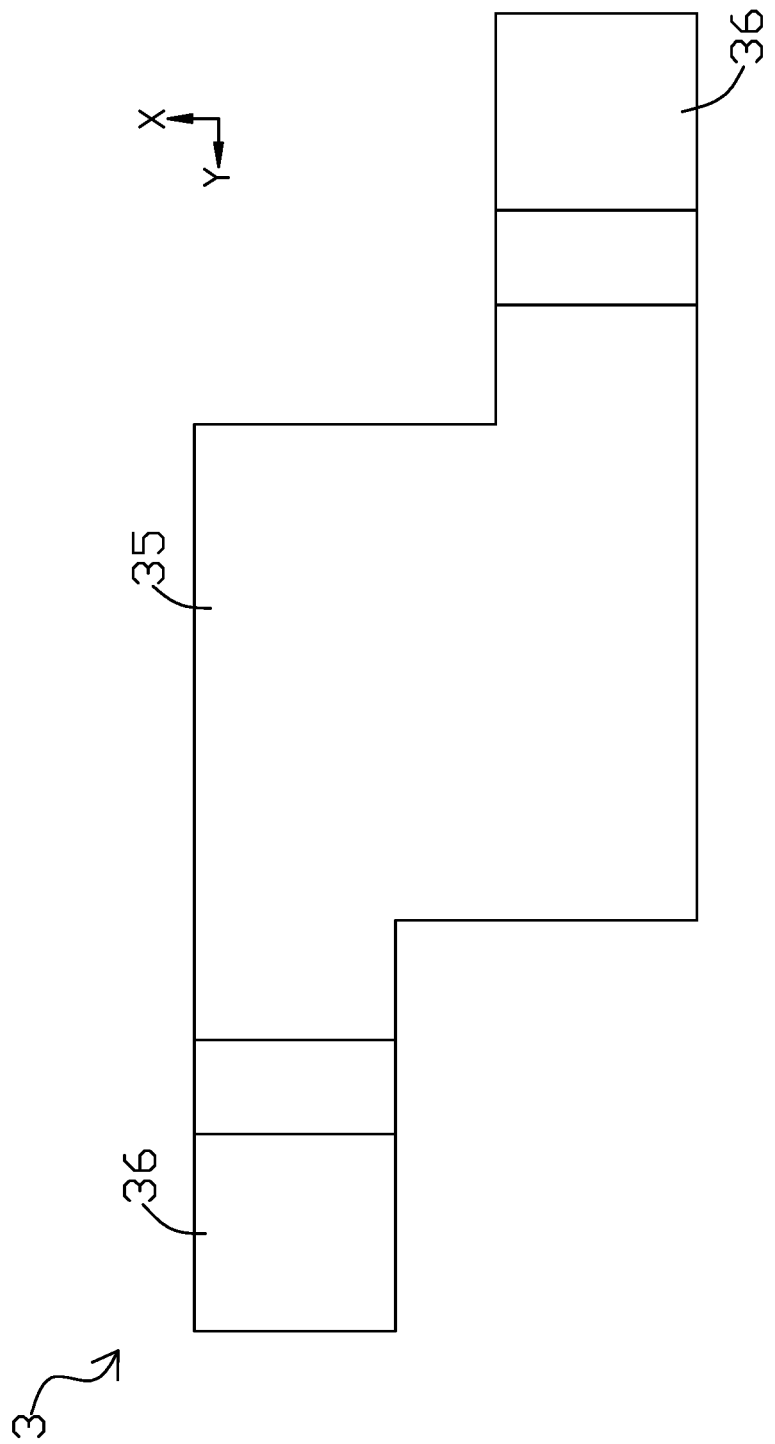
FIG. 54 is a front view of FIG. 53.
Figure 55:
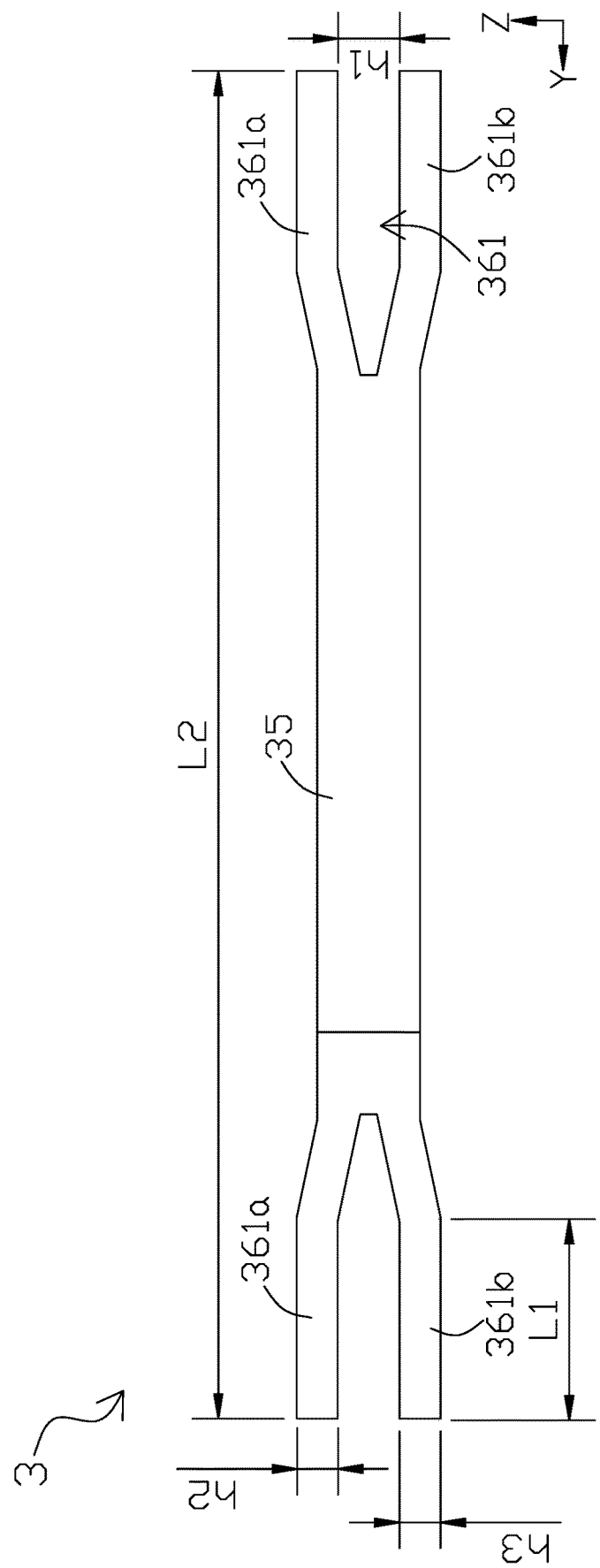
FIG. 55 is a back view of FIG. 53.

In the embodiments shown in FIG. 50 to FIG. 52, the first connecting plate 21 and the second connecting plate 22 are respectively connected to two different target battery units 12. Therefore, the first connecting plate 21 and the second connecting plate 22 are disposed along the length direction X. In addition, an accommodation space 361 is disposed at an end that is of the conductive part 3 and that is oriented toward the first connecting plate 21. A part of the first connecting plate 21 extends into the accommodation space 361. That is, a part of the first connecting plate 21 is embedded into the conductive part 3 and connected to the conductive part 3. An accommodation space 361 is disposed at an end that is of the conductive part 3 and that is oriented toward the second connecting plate 22. A part of the second connecting plate 22 extends into the accommodation space 361. That is, a part of the second connecting plate 22 is embedded into the conductive part 3 and connected to the conductive part 3.

In this embodiment, in a case that the conductive part 3 is connected to the first connecting plate 21 and the second connecting plate 22, the first connecting plate 21 and the second connecting plate 22 are embedded into the conductive part 3. Therefore, a junction area between the conductive part 3 and the two connecting plates 2 is increased, thereby improving connection reliability between the conductive part 3 and the connecting plates 2, increasing a passage area between the conductive part 3 and the connecting plates 2, and reducing over temperature risks of the conductive part 3 and the connecting plates 2.

In addition, in this embodiment, the two clamping parts 36 of the conductive part 3 are respectively connected to the first connecting plate 21 and the second connecting plate 22, and the first connecting plate 21 and the second connecting plate 22 are respectively connected to electrode terminals 11 of two different non-failed battery units 14. That is, the first connecting plate 21 and the second connecting plate 22 are disposed along the length direction X. Therefore, the two clamping parts 36 are located at two ends of the body part 35 in the conductive part 3 along the width direction Y.

Specifically, as shown in FIG. 52 to FIG. 55, the clamping part 36 includes a first arm 361a and a second arm 361b. The first arm 361a and the second arm 361b are respectively disposed on two sides of the connecting plate 2 along a thickness direction of the connecting plate to clamp the connecting plate 2.

Further, an embodiment of this application provides a failure handling method, configured to handle a failed battery unit 13 of a battery module M2. After failing, the battery module M2 includes the failed battery unit 13 and at least one non-failed battery unit 14. The failure handling method includes:

S1: electrically connecting a conductive part 3 to the at least one non-failed battery unit 14, and making a current bypass an electrode assembly 17 of the failed battery unit 13 so that the battery module M2 resumes working.

In this embodiment, by connecting the conductive part 3 to at least one non-failed battery unit 14, the failed battery unit 13 can be removed from a circuit of the battery module M2, so that the failed battery unit 13 no longer participates in a charging and discharging process of the battery module M2. Specifically, the failed battery unit 13 does not affect the circuit of the battery module M2, and the failed battery unit 13 is not in the circuit at all, thereby improving safety of the battery module M2.

In a specific embodiment, the failed battery unit 13 includes two opposite-polarity electrode terminals 11, and step S1 may specifically include:

S11: electrically connecting the conductive part 3 to the two electrode terminals 11 of the failed battery unit 13.

In this embodiment, the conductive part 3 may be directly connected to the two electrode terminals 11 of the failed battery unit 13, or may be indirectly connected to the two electrode terminals 11 of the failed battery unit 13 (as shown in FIG. 3).

Further, the electrode terminals 11 of the failed battery unit 13 are connected to connecting plates 2. Therefore, step S11 above may specifically be: electrically connecting the conductive part 3 to the connecting plates 2 connected to the two electrode terminals 11 of the failed battery unit 13.

In the embodiment shown in FIG. 3, the conductive part 3 is electrically connected to the connecting plates 2 that are connected to the electrode terminals 11 of the failed battery unit 13, and the conductive part 3 may be connected to the connecting plates 2 by means of welding, bonding, riveting, or the like as long as the electrical connection between the conductive part 3 and the connecting plates 2 is implemented and reliable. In this embodiment, each connecting plate 2 is larger than the electrode terminal 11 in size. Therefore, in connecting the conductive part 3 to the connecting plates 2, due to a relatively large junction area between the parts, processing difficulty is reduced, connection reliability is improved, and a service life of the battery module M2 is increased. In addition, the connecting plates 2 are superimposed on the electrode terminals 11 of the failed battery unit 13. In connecting the conductive part 3 to the connecting plates 2, the two connecting plates 2 do not need to be removed for the sole purpose of exposing the electrode terminals 11 of the failed battery unit 13, thereby reducing processing steps, simplifying a failure handling process, and improving efficiency.

In a specific embodiment, ends of the conductive part 3 are sheet-shaped. In the embodiment in which the conductive part 3 is electrically connected to the electrode terminals 11 of the failed battery unit 13, the two ends of the conductive part 3 are respectively connected to the connecting plates 2 connected to the electrode terminals 11 of the failed battery unit 13. In electrically connecting the connecting plates 2 to the conductive part 3, the failure handling method includes:

S12: connecting the end of the conductive part 3 to the connecting plate 2 by partly overlapping, or interconnecting the end of the conductive part 3 to the connecting plate 2 by no overlapping.

Specifically, the conductive part 3 may be connected to the connecting plates 2 by welding, bonding, clamping or other means, and the means of connection is not limited herein.

In a specific embodiment, in a case that the conductive part 3 is connected to the connecting plates 2 by bonding, step S12 above may specifically include:

S121: determining a first connecting region 211 on the first connecting plate 21, and determining a second connecting region 221 on the second connecting plate 22; and S123: bonding the conductive part 3 to the first connecting plate 21 in the first connecting region 211, and bonding the conductive part 3 to the second connecting plate 22 in the second connecting region 221.

In addition, the following steps may be included between step S121 and step S123:

S122: cleaning up the first connecting region 211 and the second connecting region 221.

In this embodiment, impurities in the first connecting region 211 and the second connecting region 221 can be cleaned away through step S122, thereby making it convenient to implement bonding and improving the connection reliability between the bonded parts.

In the above embodiments, before step S123, the failure handling method may further include: determining a quantity N and a sectional area S of metal straps 38 included in the conductive part 3 according to the following formula: $A = \mu \times N \times S$, where $\mu$ denotes a passage coefficient of the metal straps 38, and A denotes a persistent current that passes through the battery unit 1 when the battery pack M is working normally.

Therefore, according to the above formula, a relationship between the quantity N and the sectional area S of the metal straps 38 can be obtained, a value of N×S can be obtained. Therefore, possible combinations of the quantity N and the sectional area S of the metal straps 38 can be determined according to the relationship between the quantity N and the sectional area S of the metal strips 38. On the other hand, the failed battery unit 13 includes a top cover 16, and step S11 above may specifically include: S13: electrically connecting the conductive part 3 to the top cover 16 of the failed battery unit 13.

In this embodiment, the conductive part 3 may be electrically connected to the two electrode terminals 11 of the failed battery unit 13, and may also be electrically connected to the top cover 16 of the failed battery unit 13 concurrently. In this case, the failed battery unit 13 serves an only function of a conductor without participating in a charging and discharging process of the battery module. Therefore, the charging and discharging circuit of the battery module can be reconnected through the conductive part 3 and the top cover 16 of the failed battery unit 13 to make the battery module resume working. The means of connection in this embodiment increases a conductive area between the conductive part 3 and the non-failed battery units 14, thereby increasing the passage area and improving safety of the battery module and the battery pack. In addition, the means of connection in this embodiment also improves connection reliability between the conductive part 3 and the parts in the battery module, thereby further improving the safety of the battery module and the battery pack.

In a specific embodiment, in a case that the conductive part 3 is an integrated structure, step 13 above may be specifically:

S131: electrically connecting the conductive part 3 to the two electrode terminals 11 of the failed battery unit 13 (directly or indirectly), and electrically connecting the conductive part 3 to the top cover 16 of the failed battery unit 13.

In another specific embodiment, the conductive part 3 includes a first conductive part 31 and a second conductive part 32 that are discretely disposed, and step 13 above may specifically include:

S132: electrically connecting one end of the first conductive part 31 to one electrode terminal 11 of the failed battery unit 13 (directly or indirectly), electrically connecting the other end to the top cover 16 of the failed battery unit 13, electrically connecting one end of the second conductive part 32 to the other electrode terminal 11 of the failed battery unit 13 (directly or indirectly), and electrically connecting the other end to the top cover 16 of the failed battery unit 13.

Specifically, as shown in FIG. 13, one end of the first conductive part 31 is connected to the top cover 16 of the failed battery unit 13, and the other end is connected to the first connecting plate 21. Specifically, the first conductive part 31 may be connected to the first connecting plate 21 and the top cover 16 by bonding. The specific bonding connection means is the same as the foregoing bonding connection means applied between the conductive part 3 and the first connecting plate 21 and the second connecting plate 22, description of which is omitted here. Certainly, the parts may also be connected by other means such as welding and clamping.

In another specific embodiment, the at least one non-failed battery unit 14 includes two non-failed battery units 14 located upstream and downstream of the failed battery unit 13, and step S1 may specifically include:

S14: electrically connecting the conductive part 3 to the two non-failed battery units 14, so that two non-failed battery units 14 are serially-connected.

In this embodiment, as shown in FIG. 20 and FIG. 21, when one or more failed battery units 13 exist in the battery module M2 (the failed battery units 13 may be adjacent to each other or not, that is, a non-failed battery unit 14 may exist between the adjacent failed battery units 13), the target battery units 12 (the target battery units 12 are non-failed battery units 14) are electrically connected by the conductive part 3, thereby parallel-connecting each failed battery unit 13 to the conductive part 3. Because a resistance of the conductive part 3 is lower than a resistance of each battery unit 1 (including the failed battery unit 13, and possibly including a few non-failed battery units 14) located between the two target battery units 12, a current that passes through the conductive part 3 is larger than a current that passes through each failed battery unit 13. In this way, the circuit of the battery module M2 is reconnected. In the circuit, the current flowing through each failed battery unit 13 is small, and an impact thereby caused onto the circuit of the battery module M2 is small.

In a specific embodiment, the non-failed battery unit 14 includes two opposite-polarity electrode terminals 11, and step S14 may specifically include:

S141: electrically connecting the conductive part 3 to the two non-failed battery units 14, and the two ends of the conductive part 3 are respectively connected to the two opposite-polarity electrode terminals 11 of the two non-failed battery units 14.

In this embodiment, the opposite-polarity electrode terminals 11 are connected through the conductive part 3, so that the two non-failed battery units 14 can be serially-connected. The conductive part 3 may be connected directly or indirectly to the two opposite-polarity electrode terminals 11.

Specifically, the battery module M2 further includes a connecting plate 2, and step S14 may specifically include:

S141: electrically connecting at least one of the connecting plate 2 or the electrode terminals 11 to the conductive part 3.

In this embodiment, the conductive part 3 is configured to connect two target battery units 12. In a specific embodiment, the conductive part 3 may be connected to the connecting plates 2 that are connected to the two target battery units 12, thereby implementing indirect connection to the electrode terminals 11 of the target battery units 12. The conductive part 3 may be connected to the connecting plates 2 by means of welding, bonding, riveting, or the like as long as the electrical connection between the conductive part 3 and the connecting plates 2 is implemented and reliable. In this embodiment, each connecting plate 2 is larger than the electrode terminal 11 in size. Therefore, in connecting the conductive part 3 to the connecting plates 2, due to a relatively large junction area between the parts, processing difficulty is reduced, connection reliability is improved, and a service life of the battery module M2 is increased. In addition, the connecting plates 2 are superimposed on the electrode terminals 11 of the failed battery unit 13. In connecting the conductive part 3 to the connecting plates 2, the two connecting plates 2 do not need to be removed for the sole purpose of exposing the electrode terminals 11 of the failed battery unit 13, thereby reducing processing steps, simplifying a failure handling process, and improving efficiency.

Further, the failed battery unit 13 includes a top cover 16, and the failure handling method may specifically include:

S15: electrically connecting the conductive part 3 to the electrode terminals 11 of the two non-failed battery units 14, and electrically connecting the conductive part 3 to the top cover 16 of the failed battery unit 13.

In this case, the failed battery unit 13 does not participate in the charging and discharging process of the battery module, and a charging and discharging circuit of the battery module can be reconnected through the conductive part 3 and the top cover 16 of the failed battery unit 13 to make the battery module resume working. Compared with a solution in which the conductive part 3 is electrically connected to the electrode terminals 11 of only two non-failed battery units 14, the means of connection in this embodiment increases a conductive area between the conductive part 3 and the non-failed battery units 14, thereby increasing the passage area and improving safety of the battery module and the battery pack. In addition, the means of connection in this embodiment also improves connection reliability between the conductive part 3 and the parts in the battery module, thereby further improving the safety of the battery module and the battery pack.

In a specific embodiment, in a case that the conductive part 3 is an integrated structure, step S15 above may be specifically:

S151: electrically connecting the conductive part 3 to the electrode terminals 11 of the two non-failed battery units 14 (directly or indirectly), and electrically connecting the conductive part 3 to the top cover 16 of the failed battery unit 13.

In another specific embodiment, the conductive part 3 includes a third conductive part and a fourth conductive part that are discretely disposed, and step S15 above may specifically include:

S152: electrically connecting one end of the third conductive part to the electrode terminals 11 of one non-failed battery unit 14 (directly or indirectly), electrically connecting the other end to the top cover 16 of the failed battery unit 13, electrically connecting one end of the fourth conductive part to the electrode terminals 11 of the other non-failed battery unit 14 (directly or indirectly), and electrically connecting the other end to the top cover 16 of the failed battery unit 13.

In a specific embodiment, an end of the conductive part 3 is sheet-shaped. In electrically connecting the connecting plate 2 to the conductive part 3, the failure handling method includes:

S16: connecting the end to the connecting plate 2 by partly overlapping, or interconnecting the end to the connecting plate 2 by no overlapping.

Specifically, the conductive part 3 may be connected to the connecting plates 2 by welding, bonding, clamping or other means, and the means of connection is not limited herein.

More specifically, the failure handling method may further include:

S17: disconnecting the connecting plate 2 between the two non-failed battery units 14.

Specifically, as shown in FIG. 20, to further reduce the impact caused by the failed battery unit 13 onto the charging and discharging circuit of the battery module and reduce safety hazards of the failed battery unit 13 that is electrified, the current passing through the failed battery unit 13 may be minimized, and the current passing through the failed battery unit 13 may be reduced to zero as far as possible. To achieve this purpose, the at least two battery units 1 located between the two target battery units 12 may be electrically disconnected.

In this embodiment, at least one connecting plate 2 among the connecting plates 2 that connect adjacent battery units 1 located between two target battery units 12 is disconnected, so as to electrically disconnect the adjacent battery units 1 that are connected to the connecting plate 2. In this way, an open-circuit point is formed between the two target battery units 12. When the open-circuit point is formed by disconnecting the connecting plate 2, it is convenient to perform a disconnection operation due to a relatively large area of the connecting plate 2.

The operation of disconnecting the connecting plate 2 may be specifically performed by cutting off or by other means.

Specifically, step S17 may specifically include:

S171: electrically disconnecting both target battery units 12 from the adjacent failed battery unit 13 along the length direction X, and electrically connecting, by using the conductive part 3, the connecting plates 2 connected to the target battery units 12. In this case, at least two open-circuit points exist between the two target battery units 12.

The conductive part 3 may be connected to the connecting plate 2 (connected to the electrode terminals 11 of the target battery units 12) by butt-welding. During the welding, the conductive part 3 and the connecting plate 2 may be located at the same altitude, and a preset gap exists between the conductive part 3 and the connecting plate 2 along an arrangement direction thereof. The preset gap needs to be neither too small nor too large. If the preset gap is too small, solder cannot reach between the conductive part 3 and the connecting plate 2, and the connection reliability between the conductive part 3 and the connecting plate 2 is relatively low. If the preset gap is too large, welding between the conductive part 3 and the connecting plate 2 is impracticable or poorly reliable. Therefore, in this embodiment, the preset gap may be specifically 0-0.2 mm.

In addition, after the conductive part 3 is welded to the connecting plate 2, an effective welding area between the conductive part 3 and the connecting plate 2 becomes a passage area between the conductive part 3 and the connecting plate 2. Therefore, the effective welding area needs to be not too small, so as to avoid over temperature of the battery module during working. A minimum passage area may be determined according to a persistent current of the battery module during working. The effective welding area between the conductive part 3 and the connecting plate 2 needs to be not less than the minimum passage area.

However, the conductive part 3 is not necessarily connected to the connecting plate 2 by butt-welding, but may be connected by other means of connection commonly used in the field such as welding, bonding, and riveting. In this embodiment, in a case that the conductive part 3 is connected to the connecting plate 2 by butt-welding, a penetration size required during the welding is smaller than a penetration size required in lap-joint welding. Lap-joint welding needs to penetrate a thickness of both the conductive part 3 and the connecting plate 2. Therefore, the means of connection between the conductive part 3 and the connecting plate 2 in this embodiment can improve welding reliability.

In a specific embodiment, step S171 above may specifically include:

S1711: cutting off a connecting plate 2 connected to the failed battery unit 13, and cutting off the connecting plate 2 connected to the target battery unit 12 adjacent to the failed battery unit 13, so as to form two broken connecting plates 23. Each broken connecting plate 23 includes a first part 231 and a second part 232 that are disconnected from each other along the length direction X. The first part 231 is connected to the electrode terminal 11 of each target battery unit 12, the second part 232 is connected to the electrode terminal 11 of the failed battery unit 13, and the first parts 231 of the two broken connecting plates 23 are electrically connected by the conductive part 3.

In this embodiment, in cutting off the connecting plate 2 connected to the failed battery unit 13 and cutting off the connecting plate 2 connected to the target battery unit 12 adjacent to the failed battery unit 13, each connecting plate 2 is cut off in the middle thereof (for example, cut off by pliers) to form the first part 231 and the second part 232. The cutting process is easy to implement, thereby further improving the efficiency of failure handling. In addition, the area of the connecting plate 2 is relatively large, and can reduce risks of damaging other parts in the cutting process.

In another specific embodiment, step S1711 above may further include:

S1711a: removing the first part 231 connected to the electrode terminal 11 of the target battery unit 12 to expose the electrode terminal 11 of the target battery unit 12 while retaining the second part 232 connected to the electrode terminal 11 of the failed battery unit 13, where the electrode terminal 11 of the failed battery unit 13 is covered by the second part 232; and connecting the second part 232 to the exposed electrode terminal 11 of the target battery unit 12 through the conductive part 3.

In this embodiment, in cutting off the connecting plate 2 connected to the failed battery unit 13 and cutting off the connecting plate 2 connected to the target battery unit 12 adjacent to the failed battery unit 13, the cutting may be implemented by removing the first part 231 connected to the electrode terminal 11 of the target battery unit 12, and the removal operation may be performed using a tool such as pliers. After the first part 231 is removed, the conductive part 3 can be directly connected to the electrode terminals 11 of the target battery unit 12, and may be specifically connected by welding. After the welding, a passage area between the conductive part 3 and the electrode terminals 11 of the target battery unit 12 is relatively large, thereby reducing over temperature risks of the battery module during working. In addition, the direct connection between the conductive part 3 and the electrode terminals 11 of the target battery unit 12 can also improve connection reliability and reduce risks of disconnection between the conductive part 3 and the electrode terminals 11 when the battery module vibrates. In addition, after the first part 231 is removed, a weight of the battery module can be reduced, and an energy density can be increased.

In still another specific embodiment, step S1711 above may further include:

S1711b: removing the first part 231 connected to the electrode terminal 11 of the target battery unit 12 to expose the electrode terminal 11 of the target battery unit 12, and removing the second part 232 connected to the electrode terminal 11 of the failed battery unit 13 to expose the electrode terminal of the failed battery unit 13; and connecting the electrode terminals 11 of the target battery unit 12 and the electrode terminals 11 of the failed battery unit 13 through the conductive part 3.

In this embodiment, in cutting off the connecting plate 2 connected to the failed battery unit 13 and cutting off the connecting plate 2 connected to the target battery unit 12 adjacent to the failed battery unit 13, the cutting may be implemented by removing the first part 231 connected to the electrode terminal 11 of the target battery unit 12 and removing the second part 232 connected to the electrode terminal 11 of the failed battery unit 13, and the removal operations may be performed using a tool such as pliers. After the first part 231 is removed, the conductive part 3 can be directly connected to the electrode terminals 11 of the target battery unit 12. Because the second part 232 does not participate in forming the battery module, the second part 232 may be removed, thereby reducing the weight of the battery module.

In addition, the connecting plates 2 connected to all battery units 1 located between the target battery units 12 may be removed to further reduce the weight of the battery module.

In another possible design, step S17 above may further include:

S172: electrically disconnecting one target battery unit 12 from the adjacent failed battery unit 13 along the length direction X; and connecting, by using the conductive part 3, the connecting plate 2 connected to the target battery unit 12 and the connecting plate 2 connected to the failed battery unit 13 adjacent to the other target battery unit 12.

In this embodiment, one open-circuit point exists on each battery unit 1 between the two target battery units 12. The open-circuit point is formed by electrically disconnecting the target battery units 12 from the adjacent failed battery unit 13. The failed battery unit 13 connected to the target battery units 12 serves a function of conducting a current, thereby reducing the size of the conductive part 3, saving material and cost, and reducing the size of the battery module.

The conductive part 3 may be connected to the connecting plate 2 (connected to the electrode terminals 11 of the target battery units 12) by butt-welding. During the welding, the conductive part 3 and the connecting plate 2 may be located at the same altitude, and a preset gap exists between the conductive part 3 and the connecting plate 2 along an arrangement direction thereof. The preset gap may be specifically 0-0.2 mm.

In addition, after the conductive part 3 is welded to the connecting plate 2, an effective welding area between the conductive part 3 and the connecting plate 2 becomes a passage area between the conductive part 3 and the connecting plate 2. Therefore, the effective welding area needs to be not too small, so as to avoid over temperature of the battery module during working. A minimum passage area may be determined according to a persistent current of the battery module during working. The effective welding area between the conductive part 3 and the connecting plate 2 needs to be not less than the minimum passage area.

However, the conductive part 3 is not necessarily connected to the connecting plate 2 by butt-welding, but may be connected by other means of connection commonly used in the field such as welding, bonding, and riveting. In this embodiment, in a case that the conductive part 3 is connected to the connecting plate 2 by butt-welding, a penetration size required during the welding is smaller than a penetration size required in lap-joint welding. Lap-joint welding needs to penetrate a thickness of both the conductive part 3 and the connecting plate 2. Therefore, the means of connection between the conductive part 3 and the connecting plate 2 in this embodiment can improve welding reliability.

In a specific embodiment, step S172 above may specifically include:

S1721: cutting off, along the length direction X, one of the two connecting plates 2 connected to the failed battery unit 13 to form a broken connecting plate 23, and keeping the other connecting plate 2 as an unbroken connecting plate 24. The broken connecting plate 23 includes a first part 231 and a second part 232 that are disconnected from each other along the length direction X. The first part 231 is connected to the electrode terminal 11 of the target battery unit 12, and the second part 232 is connected to the electrode terminal 11 of the failed battery unit 13. The conductive part 3 connects the unbroken connecting plate 24 and the first part 231 to electrically connect the target battery unit 12.

In this embodiment, in cutting off the connecting plate 2 connected to the failed battery unit 13 and cutting off the connecting plate 2 connected to the target battery unit 12 adjacent to the failed battery unit 13, each connecting plate 2 is cut off in the middle thereof (for example, cut off by pliers) to form the first part 231 and the second part 232. The cutting process is easy to implement, thereby further improving the efficiency of failure handling. In addition, the area of the connecting plate 2 is relatively large, and can reduce risks of damaging other parts in the cutting process.

In another specific embodiment, step S1721 above may further include:

S1721a: cutting off, along the length direction X, one of the two connecting plates 2 connected to the failed battery unit 13 to form a broken connecting plate 23, and keeping the other connecting plate 2 as an unbroken connecting plate 24, where the broken connecting plate 23 includes a first part 231 and a second part 232 that are disconnected from each other along the length direction X, the first part 231 is connected to the electrode terminal 11 of the target battery unit 12, and the second part 232 is connected to the electrode terminal 11 of the failed battery unit 13; removing the first part 231 connected to the electrode terminal 11 of the target battery unit 12 to expose the electrode terminal 11 of the target battery unit 12; and connecting, by using the conductive part 3, the electrode terminal 11 of the target battery unit 12 and the unbroken connecting plate 24.

In this embodiment, the connecting plate 23 is cut off by removing the first part 231 connected to the electrode terminal 11 of the target battery unit 12, and the removal operation may be performed using a tool such as pliers. After the first part 231 is removed, the conductive part 3 can be directly connected to the electrode terminals 11 of the target battery unit 12, thereby reducing energy loss of the battery module. After the welding, a passage area between the conductive part 3 and the electrode terminals 11 of the target battery unit 12 is relatively large, thereby reducing over temperature risks of the battery module during working. In addition, the direct connection between the conductive part 3 and the electrode terminals 11 of the target battery unit 12 can also improve connection reliability and reduce risks of disconnection between the conductive part 3 and the electrode terminals 11 when the battery module vibrates. In addition, after the first part 231 is removed, a weight of the battery module can be reduced.

In another specific embodiment, step S1721 above may further include:

S1721b: removing one of the two connecting plates 2 connected to the failed battery unit 13 along the length direction X to expose the electrode terminals 11 of the target battery unit 12 connected to the connecting plate 2 and expose the electrode terminals 11 of the failed battery unit 13 connected to the connecting plate 2, where the other of the two connecting plates 2 connected to the failed battery unit 13 is an unbroken connecting plate 24; connecting, by using the conductive part 3, the electrode terminals 11 of the target battery unit 12 and the electrode terminals 11 of the failed battery unit 13.

In this embodiment, in cutting off the connecting plate 2 connected to the failed battery unit 13 and cutting off the connecting plate 2 connected to the target battery unit 12 adjacent to the failed battery unit 13, the cutting may be implemented by removing the first part 231 connected to the electrode terminal 11 of the target battery unit 12 and removing the second part 232 connected to the electrode terminal 11 of the failed battery unit 13, and the removal operations may be performed using a tool such as pliers. After the first part 231 is removed, the conductive part 3 can be directly connected to the electrode terminals 11 of the target battery unit 12. Because the second part 232 does not participate in forming the battery module, the second part 232 may be removed, thereby reducing the weight of the battery module.

In addition, the connecting plates 2 connected to all battery units 1 located between the target battery units 12 may be removed to further reduce the weight of the battery module.

In the above embodiments, the conductive part 3 may be connected to the exposed electrode terminal 11 of the target battery unit 12 in a plurality of ways such as penetration welding or laser welding. After the welding, the conductive part 3 is superimposed on the electrode terminal 11.

In this embodiment, after the connecting plate 2 connected to the target battery unit 12 is removed, the conductive part 3 can be located above the electrode terminal 11, thereby facilitating the welding between the conductive part 3 and the electrode terminal 11 and helping increase a welding area between the conductive part 3 and the electrode terminal 11 and increase a passage area. In addition, this can prevent the conductive part 3 from interfering with the upper cover of the battery module.

In a possible design, before electrically connecting the conductive part 3 to the connecting plate 2 connected to the electrode terminals 11 of the two non-failed battery units 14, the failure handling method may further include:

S18: placing a heat insulation part 4 under the connecting plate 2 connected to the conductive part 3.

In this case, the conductive part 3 may be specifically connected to the connecting plate 2 by welding. The heat insulation part 4 may be located between the connecting plate 2 and the top cover of the battery unit 1. Specifically, the heat insulation part 4 may be made of a high-temperature-resistant material such as a ceramic sheet or a mica sheet. During the welding between the conductive part 3 and the connecting plate 2, the heat insulation part 4 can serve a function of protecting the top cover of the battery unit 1, prevent the top cover from being burnt during the welding, and increase the service life of the battery unit 1.

More specifically, after electrically connecting the conductive part 3 to the connecting plate 2 connected to the electrode terminals 11 of the two non-failed battery units 14, the failure handling method may further include the following step:

S19: removing the heat insulation part 4.

In step S18, the heat insulation part 4 is only placed between the top cover 16 and the connecting plate 2. The heat insulation part 4 is not fixed to the top cover 16 or the connecting plate 2. That is, the heat insulation part 4 is in a free state. In this embodiment, the unfixed heat insulation part 4 is removed after completion of the welding to prevent the heat insulation part 4 from colliding with other structures during working of the battery module, thereby increasing the service life of the battery module.

In addition, in the above embodiments, before the welding, the failure handling method may further include: cleaning away impurities in a position to be welded, thereby ensuring welding reliability and increasing the service life of the battery module.

In addition, after completion of the welding, the failure handling method may further include: cleaning away impurities such as metal particles generated during the welding, so as to prevent a short circuit of the battery unit caused by the metal particles and improve reliability of the battery module.

In another specific embodiment, a clamping part 36 is disposed at an end of the conductive part 3. In electrically connecting the connecting plate 2 to the conductive part 3, the failure handling method may further include:

S2: extending a part of the connecting plate 2 into the clamping part 36, so that the connecting plate 2 is clamped by the clamping part 36.

In this embodiment, a part of the connecting plate 2 is embedded into the conductive part 3 and connected to the conductive part 3 to increase a junction area between the conductive part 3 and the two connecting plates 2, thereby improving connection reliability between the conductive part 3 and the connecting plates 2, increasing a passage area between the conductive part 3 and the connecting plates 2, and reducing over temperature risks of the conductive part 3 and the connecting plates 2. In addition, in a case that the connecting plate 2 are embedded into the conductive part 3, the size of the battery module along a height direction Z (a thickness direction of the connecting plates 2) is reduced, and the risk of conduction between the conductive component 3 and other parts of the battery module is reduced.

In a first specific embodiment, the conductive part 3 is connected to the connecting plate 2 connected to the two electrode terminals 11 of the failed battery unit 13. In another specific embodiment, the conductive part 3 is connected to the connecting plate 2 connected to the electrode terminals 11 of the two non-failed battery units 14.

Specifically, the clamping part 36 includes a first arm 361a and a second arm 361b, and step S2 above may specifically include:

S21: extending a part of the connecting plate 2 until between the first arm 361a and second arm 361b so that the connecting plate 2 is clamped by the first arm 361a and the second arm 361b.

In this embodiment, the connecting plate 2 may also be connected to the first arm 361a and/or the second arm 361b, so as to implement the connection between the conductive part 3 and a corresponding connecting plate 2.

More specifically, the clamping part 36 further includes a position limiting part 37. The position limiting part 37 is connected to at least one of the first arm 361a or the second arm 361b, and step S21 above may further include:

S211: causing a sidewall of the connecting plate 2 to be contiguous to the position limiting part 37.

In this embodiment, the position limiting part 37 is disposed to prevent a movement of the conductive part 3 relative to the connecting plate 2 and improve connection reliability between the conductive part 3 and the connecting plate 2. In addition, the conductive part 3 may also be hung from the connecting plating 2 through the position limiting part 37.

It needs to be noted that the conductive part 3 that contains the clamping part 36 and the position limiting part 37 is applicable to any of the above embodiments. That is, the conductive part 3 may be configured to connect the two connecting plates 2 connected to the two electrode terminals 11 of the failed battery unit 13, and may be configured to connect the two connecting plates 2 connected to the electrode terminals 11 of the two non-failed battery units 14. When the conductive part 3 is applied in different circumstances, the body part 35 of the conductive part 3 may have different structures, and/or the two clamping parts 36 of the conductive part 3 may be located in different positions.

The foregoing descriptions are merely exemplary embodiments of this application, but are not intended to limit this application. A person skilled in the art understands that this application may have various modifications and variations. Any modification, equivalent replacement, improvement, and the like made without departing from the spirit and principles of this application shall fall within the protection scope of this application.

What is claimed is:

1. A battery module, wherein the battery module comprises:
   a plurality of battery units configured to be serial-connected, wherein the plurality of battery units comprise a failed battery unit and at least one non-failed battery unit after the battery module fails, each battery unit comprises two electrode terminals and a top cover;
   a first conductive part comprising a first connecting section, and a second connecting section, wherein the first connecting section is electrically connected to one of the two electrode terminals of the failed battery unit, the second connecting section is electrically connected to the top cover between the two electrode terminals of the failed battery unit; and a second conductive part comprising a third connecting section, and a fourth connecting section, wherein the third connecting section is electrically connected to the other one of the two electrode terminals of the failed battery unit, the fourth connecting section is electrically connected to the top cover between the two electrode terminals of the failed battery unit;

wherein the first conductive part, the second conductive part, and the top cover make a current bypass an electrode assembly of the failed battery unit so that the battery module resumes working;

wherein the at least one non-failed battery unit comprises two non-failed battery units that are located upstream and downstream of the failed battery unit respectively, and the first conductive part and the second conductive part serial-connect the two non-failed battery units;

wherein the battery module further comprises:

a plurality of connecting plates, configured to serial-connect the electrode terminals of the plurality of battery units; and the first conductive part and the second conductive part serial-connect the two non-failed battery units through at least one of:

the connecting plate connecting to at least one of the two electrode terminals of the failed battery unit, or at least one of the two electrode terminals of the failed battery unit;

wherein at least one of the first connecting section, the second connecting section, the third connecting section, and the fourth connection section comprises a plurality of metal straps connected to the at least one of the two electrode terminals of the failed battery unit or the connecting plate that connects to the at least one of the two electrode terminals of the failed battery unit.

2. The battery module according to claim 1, wherein an end of the first conductive part is sheet-shaped, and the end is interconnected to the connecting plate by partly overlapping or by no overlapping, so that the first conductive part is interconnected to the connecting plate.

3. The battery module according to claim 1, wherein a clamping part is disposed at an end of the first conductive part, and the clamping part is configured to clamp the first connecting plate, so that the first conductive part is interconnected to the connecting plate.

4. The battery module according to claim 3, wherein the clamping part comprises a first arm and a second arm that are respectively disposed on two sides of the connecting plate to clamp the connecting plate.

5. The battery module according to claim 4, wherein the first arm and the second arm are disposed on two sides of the connecting plate in an overlapped or staggered manner.

6. The battery module according to claim 4, wherein the clamping part comprises a position limiting part configured to prevent a relative movement of the first conductive part in relation to the connecting plate.

7. The battery module according to claim 6, wherein the position limiting part is connected to at least one of the first arm or the second arm, and the position limiting part is contiguous to a sidewall of the connecting plate.

8. A battery pack, wherein the battery pack comprises:
a container, having an accommodation cavity; and
the battery module according to claim 1, wherein the battery module is accommodated in the accommodation cavity.

9. An apparatus, comprising:
the battery pack according to claim 8, wherein the battery pack is configured to provide electrical energy.

10. The battery module according to claim 1, wherein the first conductive part and the second conductive part are discretely disposed.

11. The battery module according to claim 1, wherein the first conductive part further comprises a first transition section interconnecting the first connecting section and the second connecting section, the first transition section is in arc shape and at a preset distance from the top cover, and the first transition section is configured to be deformed under an external force, so as to buffer an impact received by the first conductive part.

12. The battery module according to claim 11, wherein the first transition section is disposed obliquely along a height direction of the battery module.

13. The battery module according to claim 1, wherein the second conductive part further comprises a second transition section interconnecting the third connecting section and the fourth connecting section, the second transition section is in arc shape and at a preset distance from the top cover, and the second transition section is configured to be deformed under an external force, so as to buffer an impact received by the first conductive part.

14. The battery module according to claim 13, wherein the second transition section is disposed obliquely along a height direction of the battery module.

15. A failure handling method, configured to handle a failed battery unit of a battery module, wherein after failing, the battery module comprises the failed battery unit and two non-failed battery units respectively located upstream and downstream of the failed battery unit, the failed battery unit comprises two electrode terminals and a top cover, and the failure handling method comprises:

providing a first conductive part, wherein the first conductive part comprises a first connecting section, and a second connecting section, providing a second conductive part, wherein the second conductive part comprises a third connecting section, and a fourth connecting section welding the first connecting section to one of the two electrode terminals of the failed battery unit, welding the second connecting section to the top cover between the two electrode terminals, welding the third connecting section to the other one of the two electrode terminals of the failed battery unit, welding the fourth connecting section to the top cover between the two electrode terminals, and making a current bypass an electrode assembly of the failed battery unit so that the battery module resumes working.

16. The failure handling method according to claim 15, wherein welding the first connecting section to the one of the two electrode terminals of the failed battery unit further comprises welding the first connecting section to a connecting plate electrically connected to the one of the two electrode terminals.

17. The failure handling method according to claim 15, wherein the first conductive part further comprises a first transition section interconnecting the first connecting section and the second connecting section, the first transition section is in arc shape and at a preset distance from the top cover after the first connecting section and the second connecting section are welded on the failed battery unit, and the first transition section is configured to be deformed under an external force, so as to buffer an impact received by the first conductive part.

18. The failure handling method according to claim 15, the second conductive part further comprises a second transition section interconnecting the third connecting section and the fourth connecting section, the second transition section is in arc shape and at a preset distance from the top cover after the third connecting section and the fourth connecting section are welded on the failed battery unit, and the second transition section is configured to be deformed under an external force, so as to buffer an impact received by the second conductive part.

\* \* \* \* \*